(12) United States Patent
Yeon et al.

(10) Patent No.: US 11,115,929 B2
(45) Date of Patent: Sep. 7, 2021

(54) METHOD AND DEVICE FOR OPERATING OPERATION MODE OF ELECTRONIC DEVICE

(71) Applicant: Samsung Electronics Co., Ltd., Gyeonggi-do (KR)

(72) Inventors: Jihyun Yeon, Gyeonggi-do (KR); Kyungmin Park, Seoul (KR); Han-Jib Kim, Gyeonggi-do (KR); Sun-Kee Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/652,153

(22) PCT Filed: Sep. 28, 2018

(86) PCT No.: PCT/KR2018/011572
§ 371 (c)(1),
(2) Date: Mar. 30, 2020

(87) PCT Pub. No.: WO2019/066582
PCT Pub. Date: Apr. 4, 2019

(65) Prior Publication Data
US 2020/0252876 A1   Aug. 6, 2020

(30) Foreign Application Priority Data

Sep. 29, 2017 (KR) .................. 10-2017-0128226
Sep. 28, 2018 (KR) .................. 10-2018-0116210

(51) Int. Cl.
*H04W 52/02* (2009.01)
*H04W 4/02* (2018.01)
*H04W 4/021* (2018.01)

(52) U.S. Cl.
CPC ....... *H04W 52/0254* (2013.01); *H04W 4/021* (2013.01); *H04W 52/0216* (2013.01)

(58) Field of Classification Search
CPC ....... H04W 4/02; H04W 4/025; H04W 4/029; H04W 4/027; H04W 4/30; H04W 4/38;
(Continued)

(56) References Cited

U.S. PATENT DOCUMENTS 8,868,254 B2 * 10/2014 Louboutin .............. H04W 4/02
455/456.6
9,451,403 B2 * 9/2016 Lyman .................. H04W 4/021
(Continued)

FOREIGN PATENT DOCUMENTS

KR   1020130128518   11/2013
KR   1020140134562   11/2014
(Continued)

OTHER PUBLICATIONS

PCT/ISA/210 Search Report dated Jan. 11, 2019 issued on PCT/KR2018/011572, pp. 5.
(Continued)

*Primary Examiner* — Quochien B Vuong
(74) *Attorney, Agent, or Firm* — The Farrell Law Firm, P.C.

(57) ABSTRACT

Various embodiments of the present invention disclose a method and a device for managing an operation mode of an electronic device which uses a low power wide area network (LPWAN). According to various embodiments of the present invention, the electronic device comprises: a communication circuit for providing wireless communication by means of LPWAN; a state detection circuit for monitoring the movement of the electronic device; a location measuring circuit for detecting the location of the electronic device; a processor electrically connected to the communication circuit, the state detection circuit and the location measuring circuit; a memory electrically connected to the processor and storing instructions enabling the processor to transmit, using the
(Continued)

communication circuit, at least one message including the location; and a battery for supplying power to the communication circuit, the state detection circuit, the location measuring circuit, the processor and the memory, wherein the electronic device may be configured so as to operate in one state among a first state or a second state on the basis of the monitored movement, wherein, in the first state, the electronic device transmits the message in intervals of a first time, and maintains the processor in a low-power or sleep mode during all other times, and in the second state, the processor is in the low-power or sleep mode, and after the monitored movement exceeds a threshold value during a first selected duration, the processor wakes up and transmits the message. In addition, various embodiments are possible.

18 Claims, 34 Drawing Sheets

(58) Field of Classification Search
CPC ... H04W 4/80; H04W 12/1004; H04W 36/32; H04W 48/04; H04W 52/00; H04W 52/0209; H04W 64/00; H04W 64/003; H04W 84/18; H04W 88/02; H04W 4/021; H04W 52/0216; H04W 52/0254; H04M 1/7253; H04M 1/72572; H04M 1/73; H04M 2250/10; H04M 2250/12; H04B 1/3827; G08B 21/02; G08B 21/0205; G08B 21/0261; G08B 21/0269; G08B 21/0446; G08B 25/10
See application file for complete search history.

(56) References Cited

U.S. PATENT DOCUMENTS

| | | | |
|---|---|---|---|
| 9,794,942 B1* | 10/2017 | Arrakoski | H04W 4/02 |
| 9,801,017 B2* | 10/2017 | Choi | H04W 4/023 |
| 9,967,823 B2* | 5/2018 | Basehore | H04W 48/16 |
| 10,405,147 B1* | 9/2019 | Mahmoud | H04W 4/023 |
| 10,672,242 B2* | 6/2020 | Jenkins | G08B 21/0244 |
| 2012/0008526 A1 | 1/2012 | Borghei | |
| 2013/0308512 A1 | 11/2013 | Jeong | |
| 2014/0342671 A1 | 11/2014 | Kim et al. | |
| 2017/0048666 A1 | 2/2017 | Choi et al. | |

FOREIGN PATENT DOCUMENTS

| | | |
|---|---|---|
| KR | 1020170018704 | 2/2017 |
| KR | 1020170066111 | 6/2017 |

OTHER PUBLICATIONS

PCT/ISA/237 Written Opinion dated Jan. 11, 2019 issued on PCT/KR2018/011572, pp. 8.
"LP-WUR (Low-Power Wake-Up Receiver) Follow-Up", doc.: IEEE 802.11-16/0341r0, Mar. 2016, pp. 9.

* cited by examiner

METHOD AND DEVICE FOR OPERATING OPERATION MODE OF ELECTRONIC DEVICE

PRIORITY

This application is a National Phase Entry of PCT International Application No. PCT/KR2018/011572, which was filed on Sep. 28, 2018, and claims priority to Korean Patent Application Nos. 10-2017-0128226 and 10-2018-0116210, which were filed on Sep. 29, 2017 and Sep. 28, 2018, respectively, the content of each of which are incorporated herein by reference.

TECHNICAL FIELD

Various embodiments of the present invention relate to a method and an apparatus for managing an operation mode of an electronic device.

BACKGROUND ART

With development of digital technology, an electronic device of various types such as a mobile communication terminal, a smart phone, a tablet personal computer (PC), a notebook, a personal digital assistant (PDA), a wearable device, a digital camera or a personal computer are widely used.

Recently, a service using positioning based technology (e.g., geofence) which detects entry/exit of the electronic device with respect to an area defined by virtual boundaries is activated. For example, the geofence represents a virtual perimeter defined on a real geographical area, and may be generated if necessary (e.g., promotion material distribution over a space of a radius 100 m around a particular store) on each occasion, and a predefined area (e.g., a school zone around an elementary school or an administrative district of a particular region) may function as the geofence.

According to an embodiment, the geofence may be a virtual fence installed in a particular geographical area using a location based service (LBS) in an application. A user may identify an access status of the geofence, by designating the geofence in a circular or rectangular shape in a specific area. For example, if a child leaves a geofence which is set by a parent to protect the child, it may be informed immediately to the parent. For such a service, a first user (e.g., the child) may enter/exit the geofence with a first electronic device (e.g., a location tracker device), and a second user (e.g., the parent) may identify a location of the first user based on a location of the first electronic device through a second electronic device (e.g., a smart phone, a tablet PC, etc.).

Meanwhile, in the positioning based services, a technique for reducing power consumption of the electronic device (e.g., the location tracker device) may be one of big issues. Hence, the electronic device used for the positioning based service is designed and researched for the purpose of low power.

DISCLOSURE OF INVENTION

Technical Problem

Although an electronic device is implemented for the sake of low power consumption, needs for increasing use time of the electronic device are still demanded. For example, power consumption of a battery becomes huge issues in the electronic device due to continuous use such as global positioning system (GPS) for continuous location information acquisition, and continuous communication with a server to provide the location information to other electronic device.

In various embodiments, an apparatus and a method for minimizing power consumption of an electronic device for a location based service may be disclosed.

In various embodiments, an apparatus and a method for minimizing power consumption of an electronic device, by adaptively switching an operation mode of the electronic device based on whether the electronic device moves may be disclosed.

In various embodiments, an apparatus and a method for implementing a low power mode based at least on stopping (or deactivating) various states related to communication based on whether the electronic device moves may be disclosed.

In various embodiments, an apparatus and a method for providing location information by activating various states which are stopped in relation to communication based on whether the electronic device moves in a low power mode of the electronic device may be disclosed.

In various embodiments, an apparatus and a method for providing location information of an electronic device to other electronic device, even in a low power mode of the electronic device may be disclosed.

Solution to Problem

An electronic device according to various embodiments of the present invention, may include a communication circuit configured to provide wireless communication using a low power wide area network (LPWAN), a state sensing circuit for monitoring movement of the electronic device, a positioning circuit for detecting a location of the electronic device, a processor electrically connected to the communication circuit, the state sensing circuit, and the positioning circuit, a memory electrically connected to the processor, and storing instructions which cause the processor to transmit at least one message including the location using the communication circuit, and a battery for supplying power to the communication circuit, the state sensing circuit, the positioning circuit, the processor, and the memory, wherein the electronic device may be configured to operate in one of a first state or a second state based on the monitored movement, wherein, in the first state, the electronic device may transmit a message at first intervals, and maintain the processor in a low power or sleep mode during other times, and in the second state, the processor may be in the low power or sleep mode, and wake up and transmit the message after the monitored movement exceeds a threshold for a first selected period of time.

An electronic device according to various embodiments of the present invention may include a communication circuit configured to provide wireless communication using an LPWAN, a state sensing circuit for monitoring movement of the electronic device, a positioning circuit for detecting a location of the electronic device, and a processor, wherein the processor may be configured to obtain sensor information based on the state sensing circuit, in response to the sensor information being stationary information, transmit location information of the electronic device and geofence information to a server, and then process low power mode entry, wake up, in response to obtaining the sensor information based on the state sensing circuit in the low power mode, determine an operation mode of the electronic device, based at least on the sensor information, and process a related operation based on the determined operation mode.

An operating method of an electronic device according to various embodiments of the present invention may include monitoring movement of the electronic device, determining a first state or a second state of the electronic device, based on the monitored movement, and performing one of the first state or the second state determined based on the monitored movement, wherein, in the first state, the electronic device may transmit a message at first intervals, and maintain the processor in a low power or sleep mode during other times, and in the second state, the processor may be in the low power or sleep mode, and wake up and transmit the message after the monitored movement exceeds a threshold for a first selected period of time.

Advantageous Effects of Invention

According to an electronic device and its operating method according to various embodiments, in the electronic device (e.g., a location tracker device) of considerable power consumption, the power consumption may be reduced to maximum, and a geofence service based on positioning may be provided smoothly.

BEST MODE FOR CARRYING OUT THE INVENTION

Figure 1:
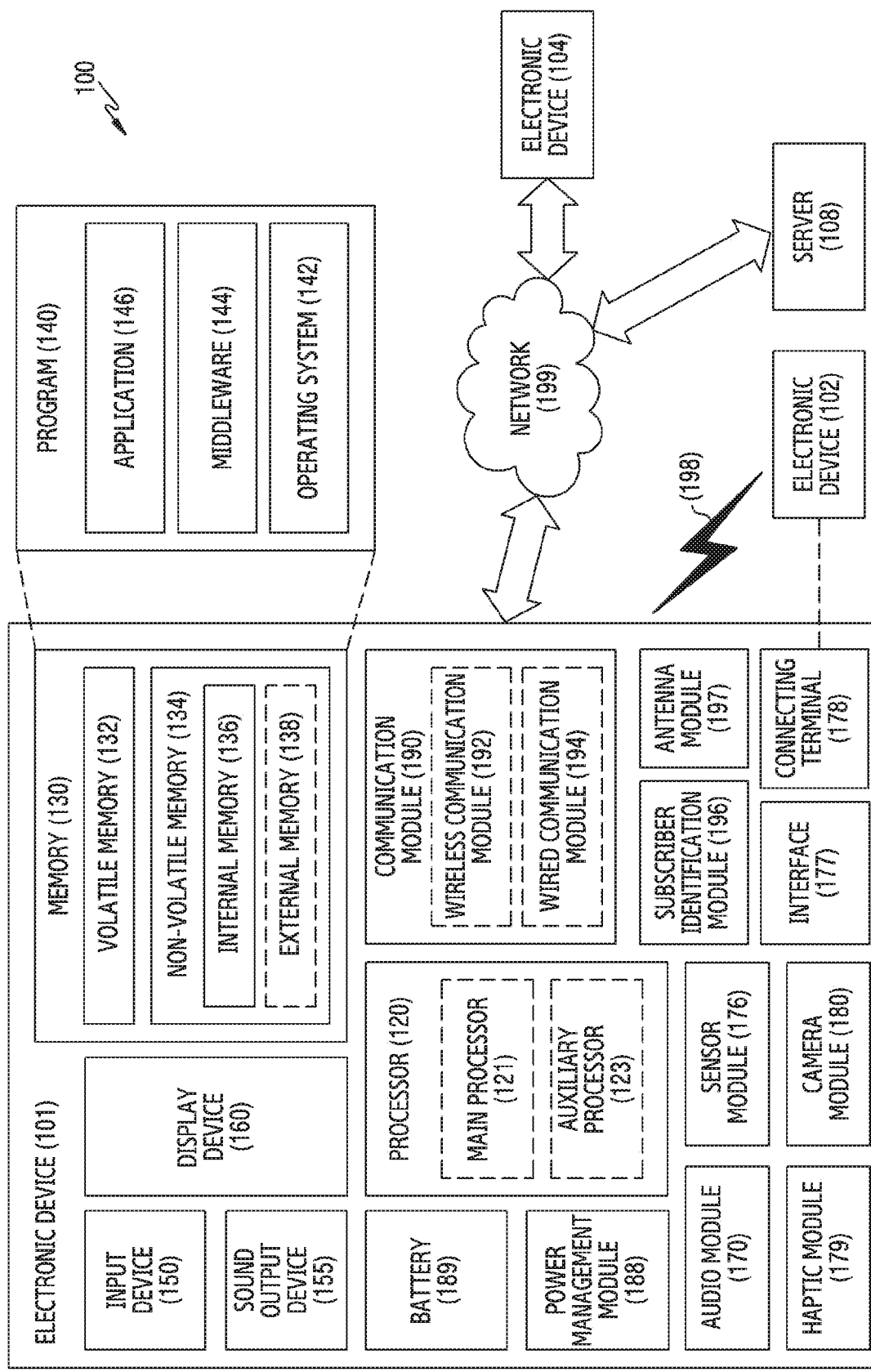
FIG. 1 is a block diagram of a first electronic device in a network environment which provides a positioning based service according to various embodiments.

Hereinafter, various embodiments of the present disclosure are described with reference to the accompanying drawings. It should be understood that the embodiment and terms used therein are not to limit the technique disclosed in the present disclosure to particular forms, and but to include various modifications, equivalents, and/or alternatives of corresponding embodiments. In describing the drawings, similar reference numerals may be used for similar constituent elements. Embodiments disclosed in the present invention are provided merely to describe and understand technical details, and are not intended to limit the scope of the technique disclosed in the present invention. Accordingly, the scope of the present invention should be construed as including all modifications or various other embodiments based on the technical idea of the present invention.

FIG. 1 is a block diagram of a first electronic device 101 in a network environment 100 which provides a positioning based service according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may include at least one antenna to transmit or receive a signal or power to or from the outside. According to an embodiment, the communication module 190 (e.g., the wireless communication module 192) may transmit or receive signal to or from an external electronic device through an antenna appropriate to communication scheme among the at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
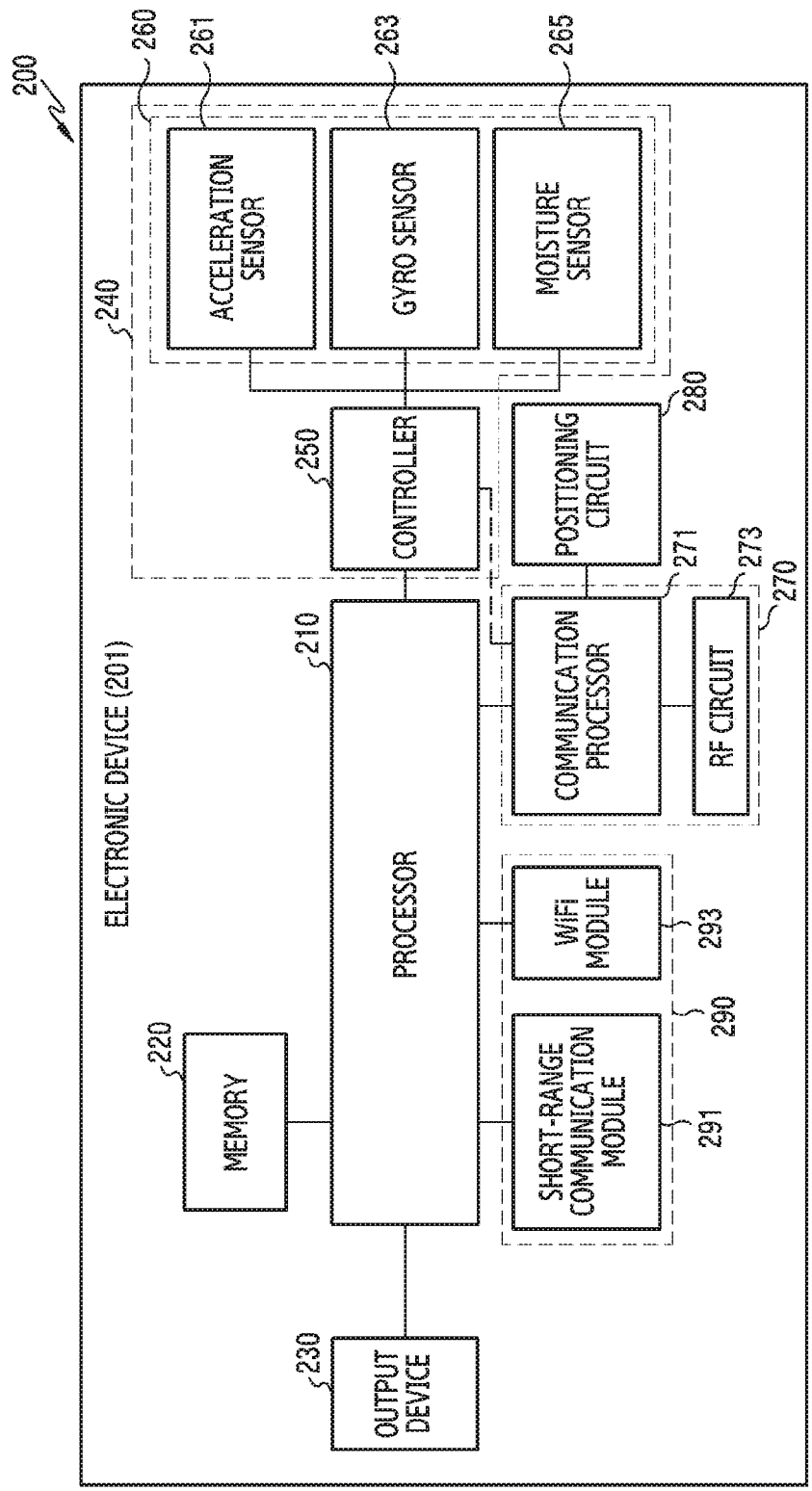
FIG. 2A is a block diagram of a second electronic device in a network environment which provides a positioning based service according to various embodiments.

FIG. 2A is a block diagram 200 of an electronic device 201 in a network environment 100 which provides a positioning based service according to various embodiments.

Referring to FIG. 2A, the electronic device 201 in the network environment 100 may communicate with an electronic device (e.g., the electronic device 101 of FIG. 1) over a first network (e.g., the network 198 of FIG. 1) (e.g., short range wireless communication), or may communicate with the electronic device 101, the electronic device 401 or a geofence server (e.g., the server 108 of FIG. 1) over a second network (e.g., the network 199 of FIG. 1) (e.g., long range wireless communication). According to an embodiment, the electronic device 201 may communicate with the electronic device 101 via the server 108.

According to an embodiment, the electronic device 201 may include a processor 210 (e.g., an application processor (AP)), a memory 220, an output device 230, a state sensing circuit 240, a communication circuit 270, a positioning circuit 280, and a communication module 290. Although not depicted in FIG. 2A, the electronic device 201 may further include a battery, a power management module, an input device, or a connecting terminal. In some embodiment, the electronic device 201 may omit at least one of the components or add other component.

The processor 210 may control at least one other component (e.g., a hardware or software component) of the electronic device 201 connected to the processor 210 by, for example, driving software (e.g., the program 140 of FIG. 1), and perform various data processing and calculations. The processor 210 may store command or data received from other component (e.g., the state sensing circuit 240, the communication circuit 270, or the communication module 290) in the memory 220.

According to an embodiment, the processor 210 may include an application processor which operates as a main processor in the electronic device 201. According to an embodiment, the processor 210 may determine a location of the electronic device 201, and notify a determination result to a server (e.g., a geofence server). For example, the processor 210 may connect and maintain a session with the server, and receive and store a geofence list from the server. The processor 210 may acquire the location of the electronic device 201, and determine geofence entry or exit (hereafter, referred to as the entry/exit) of the electronic device 201 based on the geofence list. According to an embodiment, the processor 210 may transmit information (or a message) related to the geofence entry/exit to the server.

According to an embodiment, the processor 210 may perform operations related to the output device 230 (e.g., a light emitting diode (LED)) and an input device (e.g., a button (not shown)) of the electronic device 201, a power management operation, an operation for receiving information from the state sensing circuit 240, or an operation for managing the communication circuit 270 (e.g., a communication processor (CP)). According to embodiments, the processor 210 may operate using a plurality of applications (or programs, modules), to perform (or process) the various operations.

According to an embodiment, in performing the above operations, the processor 210 may store a status related to the operations if the electronic device 201 switches to a low power mode, and pause (or stop) an application process related to the operations. According to an embodiment, the processor 210 may not switch to the low power mode if the electronic device 201 is with power to be discharged (e.g., the power close to the discharge), or may switch to a normal mode in case of the low power mode.

According to an embodiment, in relation to the low power mode operation of the electronic device 201, the processor 210 may transmit a relevant signal for pausing the application processes to a corresponding component (e.g., a related application, related hardware) and determine a resultant state, in response to receiving a signal (e.g., stationary information) related to a stationary state of the electronic device 201 from the state sensing circuit 240.

According to an embodiment, the processor 210 may receive information (e.g., stationary information) indicating that the electronic device 201 does not move for a long term, from the state sensing circuit 240. In response to receiving the stationary information, additionally or alternatively, the processor 210 may identify whether the electronic device 201 moves, or is currently stationary by identifying an actual current location of the electronic device 201. According to an embodiment, according to the result of determining that the electronic device 201 is stationary, the processor 210 may transmit a signal (e.g., a stop signal) to stop the operation to at least one element (e.g., an application (or software) and/or hardware) related to the low power mode (or a sleep mode). According to an embodiment, at least one element may stop a corresponding operation, based on the signal of the processor 210

According to an embodiment, the at least one element may transmit a time for performing the stop to the processor 210, and if the corresponding time ends (e.g., the stop ready is over), notify to the processor 210. In various embodiments, if entering the low power mode, the processor 210 may notify the entry of the low power mode to the server, and then terminate the connection session with the server. For example, by notifying the entry of the low power mode of the electronic device 201 to the server, the processor 210 may control the server to process a keep alive signal requested from a companion device (e.g., the electronic device 101), and/or to transmit location information for an on demand location information request.

According to an embodiment, if determining that the preparation of all the elements (related to the low power mode) finishes, the processor 210 may transmit the low power mode entry to the communication circuit 270 (e.g., the communication processor 271). According to an embodiment, since the elements stop their operation state, the processor 210 may switch to a low power mode in that the processor 210 does not perform any operation except for an operation of receiving information from the state sensing circuit 240, and a basic operation of the processor 210. According to an embodiment, the processor 210 may further perform an additional low power mode operation such as adjusting clock, which may differ according to the type of the electronic device 201.

According to various embodiments, if receiving at least one of movement information from the state sensing circuit 240, button information inputted by the user, and discharge warning information from a power management module (not shown), the processor 210 may switch from the low power mode to the normal mode. According to an embodiment, if receiving the button information inputted by the user, and/or the discharge warning information from the power management module, the processor 210 may switch both of the processor 210 and the communication circuit 270 (e.g., the communication processor 271) to the normal mode, and update the location information after connecting the session with the server. According to an embodiment, if operating based on only the movement information of the electronic device 201, the processor 210 may switch only the processor 210 to the normal mode. After the processor 210 switches to the normal mode, if determining that the electronic device 201 moves over a specific distance, based on sensor information of the state sensing circuit 240, the processor 210 may switch the communication circuit 270 (e.g., the communication processor 271) to the normal mode. Next, the processor 210 may connect the session with the server based on the communication circuit 270, and then acquire the location of the electronic device 201 and notify the location of the electronic device 201 to the server.

According to various embodiments, if the low power mode of the electronic device 201 is released, the processor 210 may receive various settings transmitted from the companion device (e.g., the electronic device 101) to the server, through the communication circuit 270. According to an embodiment, with the electronic device 201 in the low power mode, the companion device may update (or register) to the server setting values related to the operations for changing a location information transmission cycle value of the electronic device 201, and/or resetting (e.g., adding, deleting, changing, etc.) the geofence. The setting values updated to the server may be received at the electronic device 201 through the communication circuit 270, based on the release of the low power mode of the electronic device 201.

According to various embodiments, the electronic device 201 includes an assistant processor 210 which is operated independently of the processor 210, and additionally or alternatively, uses lower power than the processor 210, or is specialized for a designated function. According to an embodiment, the assistant processor may include a controller 250 (e.g., a sensor hub, a micro controller unit (MPU), etc.) of the state sensing circuit 240, and a communication processor (CP) of the communication circuit 270. In various embodiments, at least part of the assistant processor may be operated separately from or embedded in the processor 210.

According to an embodiment, the assistant processor (e.g., the controller 250, the communication processor 271) may control at least part of functions or states related to at least one component (e.g., the sensor module 260, a radio frequency (RF) circuit 273, or the communication module 290) of the components of the electronic device 201, in lieu of a main processor while the main processor (e.g., the application processor 210) is inactive (e.g., sleeps), or together with the main processor while the main processor is active (e.g., executes an application). According to an embodiment, the assistant processor may be implemented as a partial component of other component (e.g., the sensor module 260, the RF circuit 273, or the communication module 290) functionally related.

The memory 220 may store various data used by at least one component (e.g., the processor 210 or the state sensing circuit 240) of the electronic device 201, for example, software (or a program) and input data or output data of its related command. The memory 220 may include a volatile memory or a nonvolatile memory.

The output device 230 is a device for visually providing information to the user of the electronic device 201, and may include, for example, a light emitting device (e.g., an LED) and a control circuit for controlling the corresponding light emitting device.

The state sensing circuit 240 may generate an electrical signal or a data value corresponding to an internal state (e.g., moisture (moisture invasion) or temperature), or an external environmental state (e.g., a movement state or a stationary state) of the electronic device 201. According to an embodiment, the state sensing circuit 240 may include a controller 250 and a sensor module 260. According to an embodiment, the controller 250 may be referred to as the sensor hub or the MPU. According to an embodiment, the sensor module 260 may include an acceleration sensor 261, a gyro sensor 263, or a moisture sensor 265. According to various embodiments, a motion sensing circuit for monitoring the movement of the electronic device 201 may be configured, by including the controller 250 and part (e.g., the acceleration sensor 261 and/or the gyro sensor 263) of the sensor module 260 of the state sensing circuit 240. The operations of the state sensing circuit 240 (or the motion sensing circuit) according to various embodiments are elucidated by referring to the drawings to be explained.

The communication circuit 270 may perform wireless communication with the server using a low power wide area network (LPWAN) which is one of mobile communication networks. According to an embodiment, most wireless wide area networks currently used may indicate mobile communication networks (e.g., a 3G network, a 4G network, etc.) for the user to exchange voice, video, or data based on the electronic device (e.g., electronic device 101). The LPWAN according to various embodiments may indicate a mobile communication network for internet of things (IoT) devices. The LPWAN may have ultra low power, compared with a wide area network and a low power local area network (e.g., Bluetooth low energy (BLE), Zigbee, etc.). The LPWAN may be a wireless wide area network which has a quite wide service range (or coverage) over 10 Km, and provides a communication rate below up to hundreds of Kbps with less power consumption. Technologies for the LPWAN may include, for example, LoRaWAN using an unlicensed mobile communication band, SIGFOX, LTE machine-type communication (LTE-MTC) using a licensed mobile communication band, narrow band (NB)-IoT, 3rd generation partnership project (3GPP) Cat.M1 or extended coverage global system for mobile communications (GSM) for IoT (EC-GSM) technology.

According to an embodiment, the communication circuit 270 may include the communication processor 271 and the RF circuit 273. According to an embodiment, the communication circuit 270 may operate in the low power mode (or a power sleep mode (PSM)) or in the normal mode, based on control of the processor 210 electrically connected (accessed). According to an embodiment, the communication circuit 270 may wake up, in response to signal reception from the processor 210 and/or the state sensing circuit 240 (e.g., the controller 250) in the low power mode. According to an embodiment, if switching from the normal mode to the low power mode, the communication circuit 270 may turn off the RF circuit 273 by the communication processor 271, and then switch to the sleep state. According to an embodiment, the communication circuit 270 may wake up the communications processor 271 if switching from the low power mode to the normal mode, and perform the session connection with the server by turning on the RF circuit 273 by the communication processor 271.

The positioning circuit 280, which is a module for measuring (obtaining) the location of the electronic device 201, may include, for example, a GNSS module or a GPS module. According to an embodiment, the positioning circuit 280 may measure the location of the electronic device 201 using a triangulation principle.

According to various embodiments, in the low power mode or the sleep mode, as the processor 210 (e.g., the application processor) wakes up based on information of the state sensing circuit 240 (e.g., the controller 250) and obtains GPS information through the positioning circuit 280, the electronic device 201 may determine whether the electronic device 201 moves (or migrates). According to an embodiment, the positioning in the electronic device 201 may support a hybrid scheme (e.g., GPS+WiFi positioning system (WPS)). For example, if not acquiring the GPS information, such as the location (or existence) indoors, the electronic device 201 may determine whether the electronic device 201 moves (or migrates) based on the WPS information. According to an embodiment, the electronic device 201 may obtain the WPS information based on a WiFi module 293, and determine whether the electronic device 201 moves based on the acquired WPS information.

According to an embodiment, the WPS may indicate a service (or a system) for acquiring a location value using information of a wireless access point (AP) received via WiFi. According to an embodiment, the WPS may largely include a technique for acquiring wireless AP information (or data), a technique for building a database by optimizing the acquired wireless AP information, a technique for acquiring necessary information of the electronic device 201, a technique for acquiring the location by comparing the acquired wireless AP information with information in the built database, and so on.

According to various embodiments, the electronic device 201 may be configured by connecting the positioning circuit 280 to the communication processor 271 and the controller 250. According to an embodiment, as shown in FIG. 2A, the controller 250 and the positioning circuit 280 are not connected, but the communication processor 271 may be configured to transmit the location information acquired through the positioning circuit 280 to the controller 250.

According to various embodiments, as shown in FIG. 2A, the electronic device 201 may include a structure where the positioning circuit 280 and the controller 250 are connected to the communication processor 271 respectively. In this structure, the electronic device 201 may directly acquire the location information through the communication processor 271 based on the controller 250, and to determine whether the electronic device 201 moves. For example, if a stationary movement occurs by the sensor module 260, the controller 250 may acquire location information through the positioning circuit 280, and transmit the location information to the processor 210 with other sensor information. Thus, the processor 210 may determine how long the electronic device 201 moves based on the location information, and release the low power mode of the electronic device 201 based on its result.

According to an embodiment, based at least on the positioning through the positioning circuit 280 and the movement information of the electronic device 201 through the sensor module 260, the processor 210 may determine whether the electronic device 201 is located in a geofence currently set. If the electronic device 201 exists in the geofence, the processor 210 may determine whether the electronic device 201 leaves the geofence based at least on the positioning through the positioning circuit 280 and the movement information of the electronic device 201 through the sensor module 260, and release the low power mode only if the electronic device 201 leaves the geofence.

According to various embodiments, in the low power mode or the sleep mode, the electronic device 101 may wake up based on a first operation or a second operation, according to the subject (e.g., the processor 210 or the communication processor 271) which determines the movement of the electronic device 201. According to an embodiment, the first operation may include an operation for waking up the processor 210 (e.g., the application processor) by the state sensing circuit 240 (e.g., the controller 250), an operation for waking up the communication processor 271 based on the wake-up of the processor 210, and an operation for identifying the GPS information through the positioning circuit 280 by the communication processor 271 and an operation for activating the RF circuit 273. According to another embodiment, the second operation may include an operation for waking up the communication processor 271 by the state sensing circuit 240 (e.g., the controller 250), an operation for identifying the GPS information through the positioning circuit 280 by the communication processor 271 and an operation for activating the RF circuit 273. According to various embodiments, determining the movement of the electronic device 201 may be performed by at least one processor of the processor 210 or the communication processor 271.

The communication module 290 may support establishment of a radio communication channel between the electronic device 201 and an external electronic device (e.g., the electronic device 101, or the server 108), and the communication over the established communication channel. According to an embodiment, the communication module 290 includes, for example, a short-range communication module 291 (e.g., a BT module, a BLE module, etc.) for short range wireless communication, and the WiFi module 293 for wireless Internet communication, and may communicate with an external device (e.g., the electronic device 101) over the first network 198 (e.g., a local area communication network such as Bluetooth, WiFi direct or infrared data association (IrDA)) using a corresponding communication module. The communication module 290 of various types as mentioned above may be implemented as a single chip or as separate chips.

According to various embodiments, the communication module 290 may include one or more antennas for transmitting or receiving a signal or power to or from outside. According to an embodiment, the communication module 290 may transmit a signal to the external device over the antenna which is adequate for each communication scheme, and receive from the external device.

Some of the components may be connected and exchange signals (e.g., commands or data) using a communication scheme between peripherals (e.g., a bus, general purpose input/output (GPIO), serial peripheral interface (SPI), or mobile industry processor interface (MIPI), etc.).

According to an embodiment, the command or the data may be transmitted or received between the electronic device 201 and the external electronic device 101 via the server 108 connected to the second network 199.

According to an embodiment, all or part of the operations executed at the electronic device 201 may be fulfilled at one or more other external devices (e.g., the electronic device 101, the server 108). According to an embodiment, if the electronic device 201 is to perform a function or a service automatically or at a request, the electronic device 201 may request at least part of the function associated thereto from the external device, alternatively or additionally to executing the function or the service. According to an embodiment, the external device (e.g., the electronic device 101, or the server 108) receiving the request from the electronic device 201 may execute the requested function or an additional function, and transmit its result to the electronic device 201. The electronic device 201 may provide the requested function or service by processing the received result as it is or additionally.

Figure 2B:
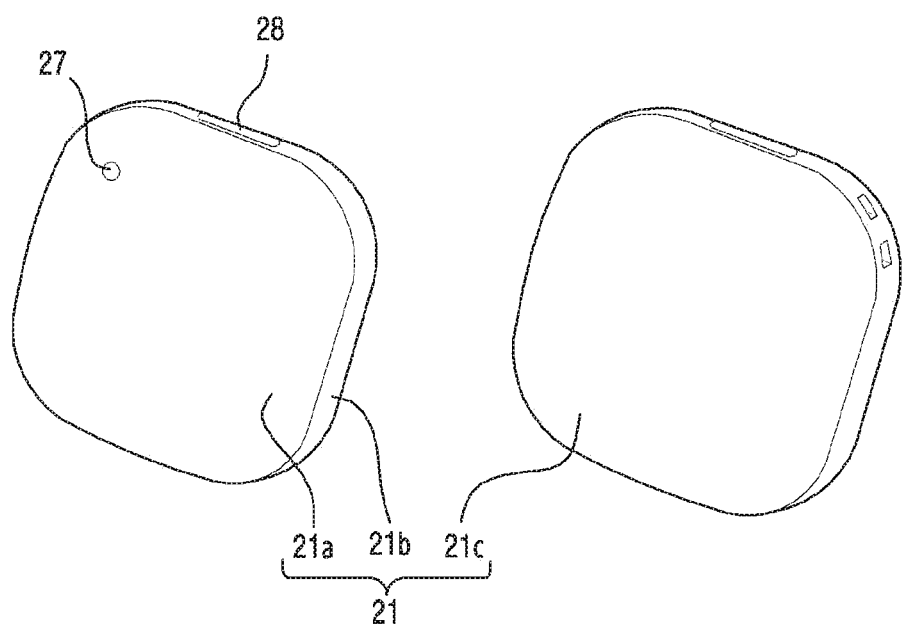
FIG. 2B is a diagram illustrating an exterior of a second electronic device according to various embodiments.
Figure 2C:
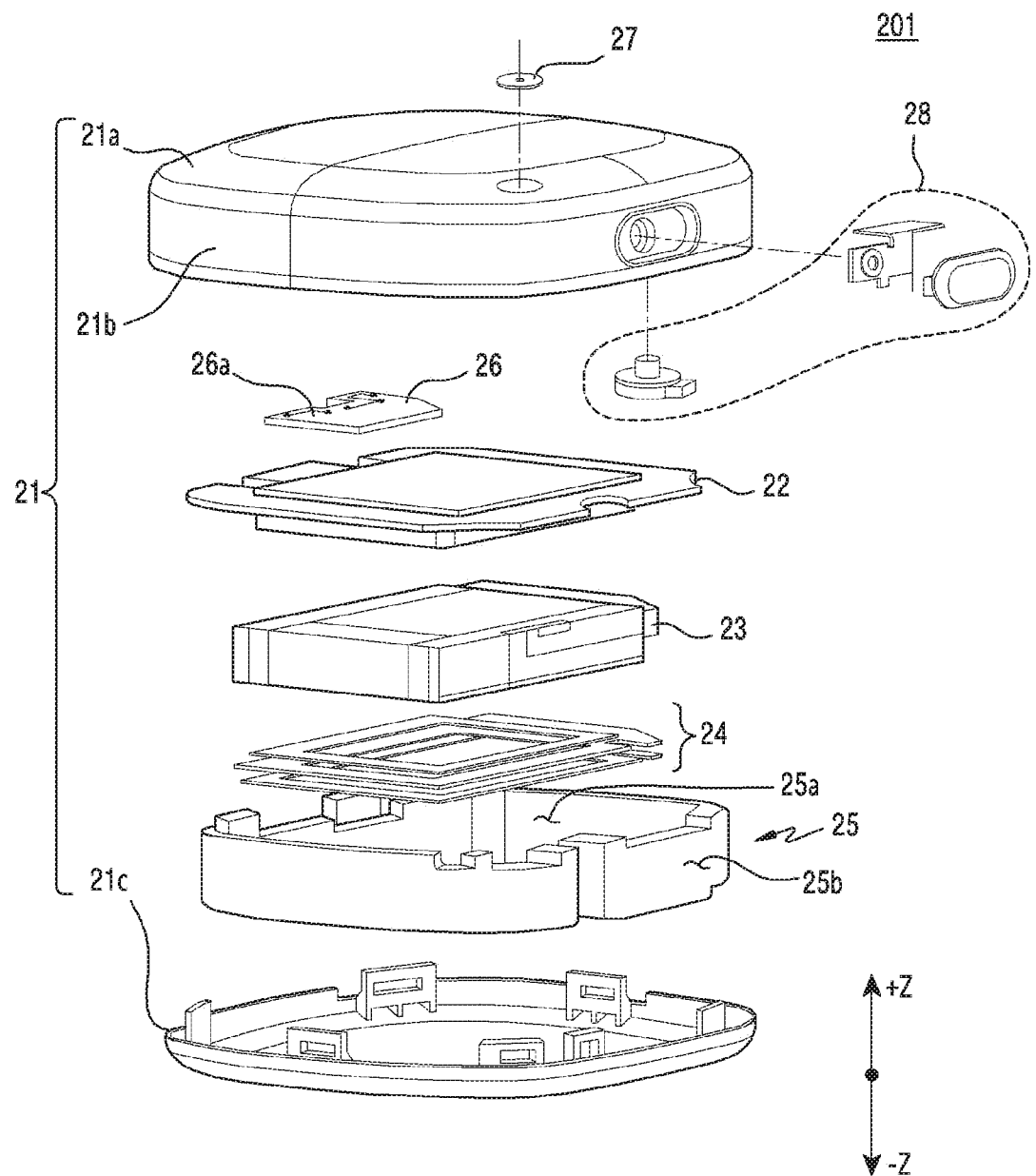
FIG. 2C is an exploded perspective view showing a second electronic device according to various embodiments.

FIG. 2B is a diagram illustrating an exterior of the electronic device 201 according to various embodiments, and FIG. 2C is an exploded perspective view of the electronic device 201 according to various embodiments.

Referring to FIG. 2B and FIG. 2C, the electronic device 201 according to various embodiments may include a housing 21, a printed circuit board 22, a battery 23, an elastic member 24, a bracket 25, a radiation structure 26, an output device 27 and an input device 28.

According to various embodiments, the housing 21 may include a first plate 21a disposed to face a front direction (e.g., a first direction +Z), a second plate 21c disposed to face a back direction (e.g., a second direction −Z) corresponding to the opposite direction of the front direction and a side member 21b disposed between the first plate 21a and the second plate 21c.

According to some embodiment, the housing 21 may include an upper structure and a lower structure, and the upper structure and the lower structure may be coupled to each other to define an inner space. The upper structure may include a plate (e.g., the first plate 21a) facing the first direction +Z and a side surface (e.g., the side member 21b) extending from the plate, and the lower structure may include a plate (e.g., the second plate 21c) facing the second direction −Z and a side surface extending from the plate.

According to various embodiments, the first plate 21a may form a front cover of the electronic device 201, and the second plate 21c may form a rear cover of the electronic device 201. The side member 21b may be configured to surround at least part of the space formed between the first plate 21a and the second plate 21c.

According to various embodiments, the second plate 21c may be disposed on the second direction −Z of the electronic device 201, and form the exterior of the electronic device 201 together with the side member 21b and the first plate 21a. According to some embodiment, the second plate 21c may be coupled detachably. The user may replace a storage medium (e.g., a subscriber identity module (SIM card) or an SD card) or the battery 23 with the second plate 21c detached.

According to various embodiments, the first plate 21a and the second plate 21c may be formed in a flat plate shape and besides include at least one of a curved shape or a flexible shape. As another example, at least part of an outer surface of the side member 21b may be formed in at least one of a curved shape or a flexible shape. As at least part of the housing 21 of the electronic device 201 has the curved shape or the flexible shape, the user may easily hold (or grip) the electronic device 201 and easily click at least one button 28.

According to various embodiments, the housing 21 may accommodate various electronic parts. At least part (e.g., a region of the first plate 21a, the second plate 21c or the side member 21b) of the housing 21 may be formed with a conductive material. For example, at least part of the housing 21 forming the exterior of the electronic device 201 may be formed with a conductive material. According to some embodiment, at least part of the conductive material of the housing 21 (e.g., the side member 21b) may be utilized as an antenna device, for example, a radiation conductor. According to other embodiment, at least part of the housing 21 (e.g., the side member 21b) is insulated with a bracket 25, and may be electrically connected to a communication module (not shown) mounted on the printed circuit board 22 to be used as the antenna device.

According to an embodiment, the housing 21 may accommodate the printed circuit board 22, the battery 23, the elastic member 24, the bracket 25 and/or the radiation structure therein.

According to various embodiments, the printed circuit board 22 may mount a processor (e.g., the processor 210 of FIG. 2A), a memory (e.g., the memory 220 of FIG. 2A), a state sensing circuit (e.g., the controller 250 of FIG. 2A, the sensor module 260), a communication circuit (e.g., the communication processor 271 of FIG. 2A, the RF circuit 273), a positioning circuit (e.g., the positioning circuit 280 of FIG. 2A), various interfaces (not shown), a power management module (not shown), and so on. The printed circuit board 22 may be engaged to the first plate 21a using a screw or a coupling structure.

According to various embodiments, the bracket 25 may be fabricated with a metallic material and/or a non-metallic material (e.g., polymer), and may be interposed between the first plate 21a and the second plate 21c.

According to various embodiments, the bracket 25 may reinforce rigidity of the electronic device 201. For example, the housing 21 may include a plurality of openings or recessed portions according to the arrangement of the electronic parts inside the electronic device 201, which may degrade the rigidity of the housing 21 or the electronic device 201. To prevent (supplement) the degradation of the rigidity, the electronic device 201 may mount and/or fasten the bracket 25 in the housing 21.

According to some embodiments, the bracket 25 may be formed as a uni-body with the second plate 21c, to block the user from arbitrarily separating the bracket 25 and the second plate 21c.

Although not depicted in detail in FIG. 2B and FIG. 2C, according to various embodiments, various structures may be further formed on a surface of the housing 21 and the bracket 25, according to the arrangement of the electronic parts disposed inside the electronic device 201, or the coupling structure between the housing 21 and the bracket 25. For example, a space for accommodating integrated circuit chips mounted on the printed circuit board 22 may be formed in the housing 21 and/or the bracket 25 respectively. The space for accommodating the integrated circuit chips may be formed in a recessed shape or a rib which surrounds the integrated circuit chip. According to various embodiments, a corresponding fastening structure or fastening holes may be formed at the housing 21 and the bracket 25. For example, by fastening a fastening member such as a screw into the fastening hole, the housing 21 and the bracket 25 may be coupled such that the housing 21 and the bracket 25 face each other or the bracket 25 is received in the housing 21.

According to various embodiments, the battery 23 is a device for supplying power to at least one component of the electronic device 201, and may include, for example, a non-rechargeable primary battery, or a rechargeable secondary battery, or a fuel battery. The battery 23 may be integrally disposed inside the electronic device 201, and may be disposed to be detached from the electronic device 201. The battery 23 may be electrically connected to the printed circuit board 22.

According to various embodiments, the battery 23 may be set to be consumed by the RF circuit 273 over a specific threshold. For example, the RF circuit 273 may consume 40% or more of the battery 23. Hence, the state of the battery 23 may be managed (e.g., distribute the power) such that the RF circuit 273 uses the battery 23 over the specific threshold.

According to various embodiments, the elastic member 24 is mounted inside the bracket 25, and may elastically support the battery 23. The elastic member 24 may be disposed to face the printed circuit board 22 based on the battery 23, and may include an adhesive member for bonding the battery 23 and the bracket 25 on both sides.

According to various embodiments, the bracket 25 may include a receiving space 25a for receiving the battery 23. The battery 23 received in the receiving space 25a may be disposed in no contact with and alongside the printed circuit board 22. For example, the battery 23 may be secured in the receiving space 25a of the bracket 25, and a side member 25b (e.g., an edge region) of the bracket 25 may be configured to surround side surfaces of the battery 23. A height of the side member 25b of the bracket 25 (e.g., a length along the Z axis of the side bracket 25) may be greater than the height of the battery 23 (e.g., a length along the Z axis of the side battery 23). The side member 25b of the bracket 25 may be secured on the printed circuit board 22 and/or on a surface of the first plate 21a of the housing 21.

According to various embodiments, the radiation structure 26 may include a conductive pattern 26a, be electrically connected to the printed circuit board 22, and be mounted in the housing 21. For example, the radiation structure 26 may be positioned between the first plate 21a and the bracket 25 or between the second plate 21c and the bracket 25. The conductive pattern 26a may be an antenna for transmitting and receiving radio waves or generating a magnetic field. The radiation structure 26 may be configured to provide the wireless communication using the LPWAN. For example, the LPWAN may include networks such as NB-IoT, LTE-M, LoRa, sigfox or EC-GSM.

According to various embodiments, the conductive pattern 26a may be formed as part of the radiation structure 26 using laser direct structuring (LDS). According to some embodiment, the conductive pattern 26a may be at least part of the metal which forms at least part (e.g., the side member 21b) of the housing 21 of the electronic device 201.

According to various embodiments, the output device 27 may visually provide information to the user of the electronic device 201. For example, the output device 27 may include at least one light emitting device (e.g., an LED) disposed in one side (e.g., the first plate 21a) of the housing 21 and a control circuit for controlling the at least one light emitting device. To provide a notification (alarm) relating to the entry of the geofence, the control circuit may control a color, a light emitting position, and a light emitting cycle of the at least one light emitting device according to set rules. As such, the output device 27 may visually notify the user of the entry (or the exit) to a dangerous area or a dangerous area vicinity. According to some embodiment, the output device 27 may include a speaker (not shown) and/or a vibration motor (not shown), to provide the notification in an audible (e.g., sound) manner or a tactile (e.g., vibration) manner.

According to various embodiments, the input device 28 may be disposed in one side (e.g., the front or the side) of the electronic device 201. The input device 28 may include at least one key button. For example, the at least one key button may include a power key. According to some embodiment, the at least one key button may further include at least one function key for a particular function. For example, the at least one button key may further include a function key for controlling on/off of the alarm function through the output device 27, a function key for requesting to identify an incoming alarm or to end the alarm, and so on. According to some embodiment, the input device 28 may provide a plurality of functions through a single function key. For example, the electronic device 201 may perform a first function (e.g., an alarm identification function) if the function key is inputted one time, may perform a second function (e.g., a power on/off function) if the function key is inputted over a specific time, and may perform a third function (e.g., an alarm on/off function) if the function key is inputted two time within a specific time. As another example, the electronic device 401 may perform a fourth function (e.g., a pairing function with an external electronic device) if the function key is continuously inputted over a specific time.

Referring to FIG. 2A through FIG. 2C, the electronic device 201 according to various embodiments may include a compact unit not including a display. According to an embodiment, the electronic device 201 may be, for example, a device for tracking the location, and may occupy the power consumption of the battery 23 based on the RF circuit 273.

Figure 3:
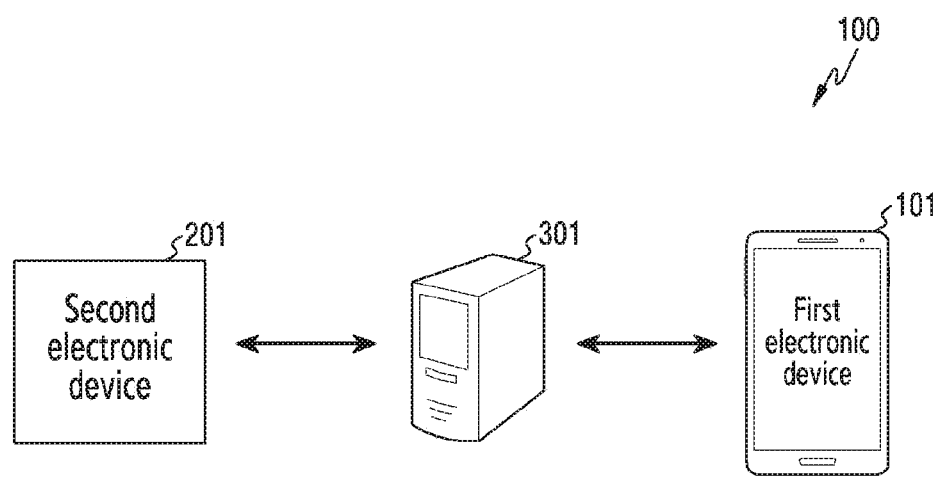
FIG. 3 is a diagram illustrating an example for explaining operations between electronic devices in a network environment which provides a positioning based service according to various embodiments.

FIG. 3 is a diagram illustrating an example for explaining operations between electronic devices in a network environment 100 which provides a positioning based service according to various embodiments.

Referring to FIG. 3, in various embodiments, the network environment 100 may include a first electronic device 101 (e.g., the electronic device 101 of FIG. 1, for example, a smart phone, a tablet PC), a geofence server 301 (e.g., the server 108 of FIG. 1), and a second electronic device 201 (e.g., the electronic device 201 of FIG. 2, for example, a location tracker device).

According to an embodiment, in the network environment 100, the first electronic device 101, the second electronic device 201, and the server 301 (e.g., the geofence server) may perform wireless communication based on different networks. According to an embodiment, the first electronic device 101 in the network environment 100 may wirelessly communicate with the server 301 over a first network (e.g., a mobile communication network). According to an embodiment, the second electronic device 201 in the network environment 100 may wirelessly communicate with the server 301 over a second network (e.g., LPWAN). According to an embodiment, the first electronic device 101 and the second electronic device 201 may communicate with each other via the server 301.

In various embodiments, the server 301 is a server for managing account and control, and may include, for example, a geofence server or a work with smart things (WWST) IoT server. According to an embodiment, the server 301 may operate in association with a plurality of servers. Hereinafter, the server 301 will be described as the geofence server as an example.

In various embodiments, the first electronic device 101 and the second electronic device 201 may be a companion device to each other. For example, the first electronic device 101 may be the companion device of the second electronic device 201, and the second electronic device 201 may be the companion device of the first electronic device 101. In various embodiments, the companion device may be a device which associates at least two devices, and is identified as the associated (or linked) device by the geofence server 301, for the sake of the geofence service. According to an embodiment, the first electronic device 101 and the second electronic device 201 may be registered as the companion device to the geofence server 301 based on identification information (e.g., an account, a device identifier, a telephone number, a device name, etc.) for identifying each other.

According to an embodiment, the first electronic device 101 may be a device which acquires location information of the second electronic device 201 which is the companion device by accessing (or connecting) the geofence server 301, and provides the location information of a user of the second electronic device 201 to a user of the first electronic device 101 through a set interface. According to an embodiment, the first electronic device 101 may include a smart phone, a tablet PC, a computer device, a TV device, and the like including the display device 160 (e.g., a display).

According to an embodiment, the second electronic device 201 may be a device which measures the location of the second electronic device 201, at least on a periodic basis and/or at a request of the first electronic device 101, and provides the location information based on the positioning result to the first electronic device 101 via the geofence server 301. According to an embodiment, the second electronic device 201 may include a location tracker device not including the display device (e.g., a display).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As stated above, an electronic device (e.g., the electronic device 201) according to various embodiments, may include a communication circuit 270 configured to provide wireless communication using an LPWAN, a state sensing circuit 240 for monitoring movement of the electronic device 201, a positioning circuit 280 for detecting a location of the electronic device 201, a 210 processor electrically connected to the communication circuit 270, the state sensing circuit 240, and the positioning circuit 280, a memory 220 electrically connected to the processor 210, and storing instructions which cause the processor 210 to transmit at least one message including the location using the communication circuit 270, and a battery (not shown) for supplying power to the communication circuit 270, the state sensing circuit 240, the positioning circuit 280, the processor 210, and the memory 220, wherein the electronic device 201 may be configured to operate in one of a first state or a second state based on the monitored movement, wherein, in the first state, the electronic device 201 may transmit a message at first intervals, and maintain the processor in a low power or sleep mode during other times, and in the second state, the processor 210 may be in the low power or sleep mode, and wake up and transmit the message after the monitored movement exceeds a threshold for a first selected period of time.

According to various embodiments, if the monitored movement does not exceed the threshold for a second selected period of time, the electronic device 201 may be configured to switch from the first state to the second state.

According to various embodiments, the second selected period of time may be longer than the first selected period of time.

According to various embodiments the first interval may be set to be longer than the length of the second selected period of time.

According to various embodiments, after the monitored movement exceeds the threshold for the first selected period of time, the electronic device may be configured to switch from the second state to the first state.

According to various embodiments, the processor 210 may include an application processor.

According to various embodiments, the communication circuit 270 may include a communication processor 271 and a RF circuit 273, wherein at least part of the communication circuit 270 may be configured to operate in the low power or sleep mode, for the other times of the first state, and/or while the processor 210 electrically connected to the communication circuit 270 is in the low power or sleep mode.

According to various embodiments, the state sensing circuit 240 may include at least one sensor of an acceleration sensor 261, a gyro sensor 263, or a moisture sensor and a controller 250, wherein the controller 250 may be configured to provide at least one signal to the processor 210 to wake up the processor 210 from the low power or sleep mode.

According to various embodiments, the message may include information of a geographical area where the electronic device 201 is located.

According to various embodiments, the information may include geofence information.

As stated above, an electronic device (e.g., the electronic device 101) according to various embodiments may include a communication circuit 270 configured to provide wireless communication using an LPWAN, a state sensing circuit 240 for monitoring movement of the electronic device 201, a positioning circuit 280 for detecting a location of the electronic device 201, and a processor 210, wherein the processor 210 may be configured to obtain sensor information based on the state sensing circuit 240, in response to the sensor information being stationary information, transmit location information of the electronic device 201 and geofence information to a server, and then process low power mode entry, wake up, in response to obtaining the sensor information based on the state sensing circuit 240 in the low power mode, determine an operation mode of the electronic device 201, based at least on the sensor information, and process a related operation based on the determined operation mode.

According to various embodiments, the processor 210 may be configured to, if the sensor information is movement information, determine to switch from the low power mode to a normal mode, wake up the communication circuit by transmitting a normal mode switch command to the communication circuit 270, and transmit the location information of the electronic device 201 to the server through the communication circuit 270, and if the sensor information is stationary information, determine to maintain the low power mode, and process the low power mode re-entry process.

Hereafter, an operating method according to various embodiments of the present invention is explained by referring to the attached drawings. However, various embodiments of the present invention are not restricted by or limited to contents which will be described below and therefore, and it should be noted that they may be applied to various embodiments based on the embodiments to be described below. In various embodiments of the present invention described below, a hardware approach is described as an example. However, since various embodiments of the present invention include a technology using both hardware and software, various embodiments of the present invention do not exclude a software-based approach.

Figure 4:
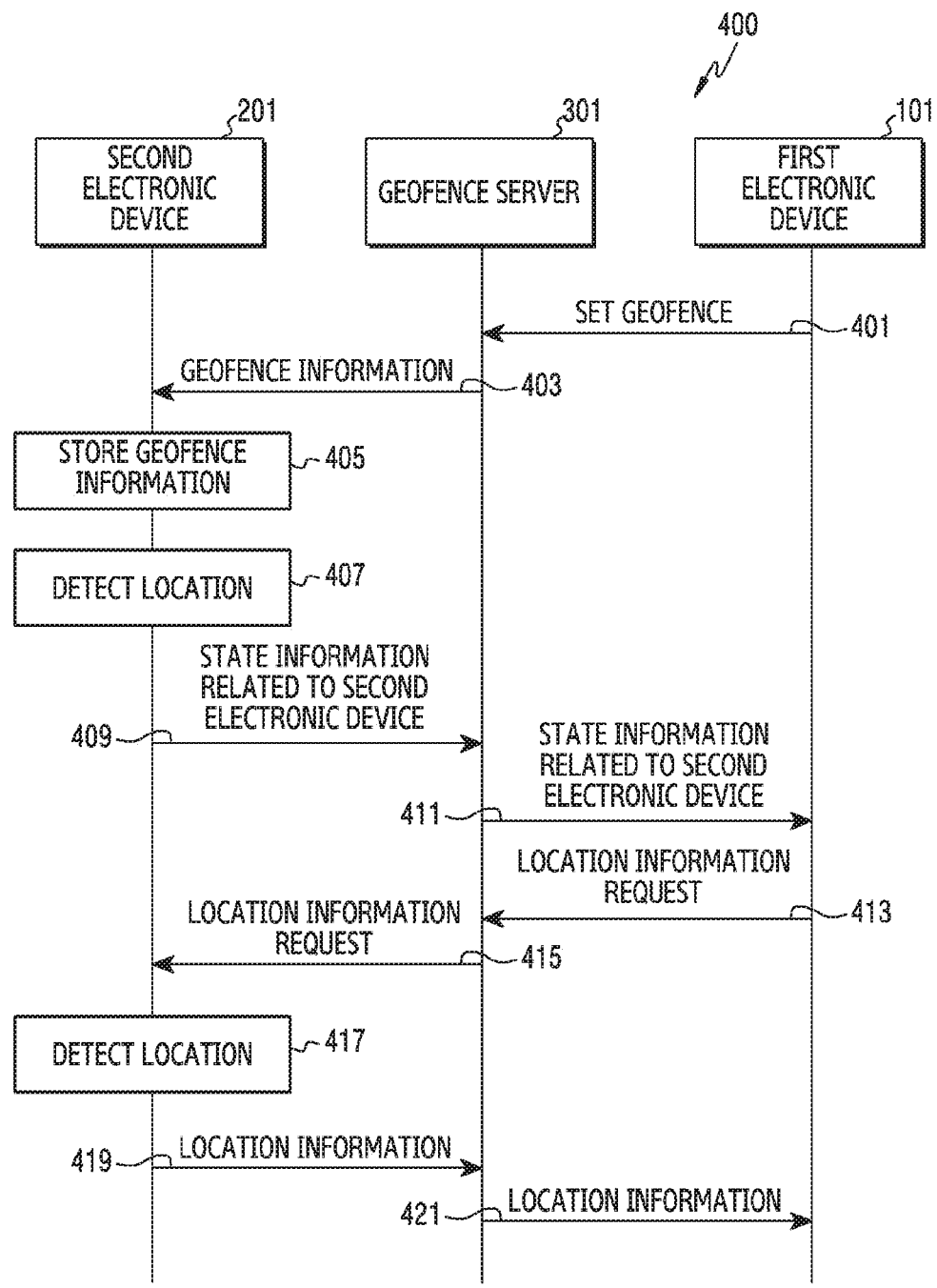
FIG. 4 is a diagram illustrating a communication method between devices in a network environment according to various embodiments.

FIG. 4 is a state diagram 400 illustrating a communication method between devices in a network environment 100 according to various embodiments.

In various embodiments, the network environment 100 may include a first electronic device 101, a second electronic device 201, and a geofence server 301. According to an embodiment, FIG. 4 may depict an operation example for providing location information of the second electronic device 201 based on a normal (or normal mode) operation of the second electronic device 201, in the network environment 100.

Referring to FIG. 4, in operation 401, the first electronic device 101 may set and transmit a geofence related to the second electronic device 201 to the geofence server 301. According to an embodiment, the first electronic device 101 may set and display information corresponding to a user's input (or selection) on a map, based on the map displayed on the display device 160 (e.g., a display). According to an embodiment, the first electronic device 101 may connect (or access) to the geofence server 301, receive and display relevant map data from the geofence server 301, set the geofence according to the user input on the displayed map, and transmit setting information to the geofence server 301.

According to an embodiment, the first electronic device 101 may include (or install) an application for performing a geofence service (e.g., a location tracker application) according to various embodiments. The application for the geofence service may, for example, be downloaded from the geofence server 301 and installed on the first electronic device 101. According to an embodiment, the first electronic device 101 may access the geofence server 301 using the application for the geofence service. The user may set a geofence related to the second electronic device 201, using an application activated (or executed) through the first electronic device 101. According to an embodiment, through a setting screen relating to the geofence setting, a radius (area) of the geofence, information for activating the service (e.g., date, time, etc.), a target electronic device (e.g., the second electronic device 201) for applying the service, identification information (e.g., a device identifier, a unique number, a device name, etc.) related to the target electronic device, and the like may be set. If the geofence setting by the user is finished, the first electronic device 101 may transmit the set geofence information to the geofence server 301.

In operation 403, the geofence server 301 may transmit the geofence information received from the first electronic device 101 to the second electronic device 201. According to an embodiment, if receiving the geofence information from the first electronic device 101, the geofence server 301 may store the geofence information in an internal database (or a memory). According to an embodiment, the geofence server 301 may identify the first electronic device 101 and the second electronic device 201 based at least on part of the geofence information, and map, store and manage the first electronic device 101, the second electronic device 201 and the geofence information. According to an embodiment, the geofence server 301 may transmit setting information of at least part of the geofence information to the second electronic device 201.

In operation 405, the second electronic device 201 may receive the geofence information from the geofence server 301, and store the received geofence information in the memory 220.

In operation 407, the second electronic device 201 may detect a location. According to an embodiment, the positioning operation in operation 407 may be a periodic positioning operation according to a cycle which is set in the second electronic device 201. For example, the second electronic device 201 may periodically perform the positioning function of the second electronic device 201, according to the set cycle. According to an embodiment, the second electronic device 201 may compare with geofence information (e.g., location information of an area corresponding to the geofence) stored in the memory 220, based on a positioning result (e.g., the location information of the second electronic device 201). For example, the second electronic device 201 may determine entry/exit of the set geofence, based on the positioning information (e.g., coordinates, for example, latitude coordinates and longitude coordinates).

In operation 409, the second electronic device 201 may transmit state information related to the second electronic device 201 to the geofence server 301. According to an embodiment, in response to detecting the geofence entry or exit, the second electronic device 201 may transmit to the geofence server 301 geofence information (e.g., notification information related to the geofence entry or the geofence exit) and the state information including the location information of the second electronic device 201.

In operation 411, in response to receiving the state information (e.g., the geofence information and the location information) from the second electronic device 201, the geofence server 301 may transmit the received state information to the first electronic device 101. According to an embodiment, the geofence server 301 may identify the first electronic device 101, based on information (e.g., identification information such as account, device identifier, telephone number, device name) related to a companion device of the second electronic device 201 stored in the database, and provide the state information of the second electronic device 201 to the identified first electronic device 101. According to an embodiment, in response to receiving the state information from the geofence server 301, the first electronic device 101 may feed a relevant notification back to the user based at least in part on seeing, hearing, or touching. For example, the first electronic device 101 may display a screen corresponding to the state information of the second electronic device 201 based on the application for the geofence service, display the state information reception as a popup, or provide a notification of the state information reception based on at least one of vibrations or sound.

In operation 413, the first electronic device 101 may request the location information of the second electronic device 201 from the geofence server 301. According to an embodiment, the user of the first electronic device 101 may execute the application related to the geofence service by manipulating the first electronic device 101, and command to acquire the location information of the second electronic device 201, based on an UI displayed based on the executed application. Based on the user's command, the first electronic device 101 may transmit a command requesting the location of the second electronic device 201 to the geofence server 301.

In operation 415, based on receiving the location information request of the second electronic device 201 from the first electronic device 101, the geofence server 301 may forward the location information request to the second electronic device 201.

In operation 417, the second electronic device 201 may measure its location. According to an embodiment, the positioning operation in operation 417 may be a positioning operation performed based on the order (or the request) of the geofence server 301 (or the first electronic device 101). According to an embodiment, the second electronic device 201 may determine geofence information (e.g., the geofence entry/exit), and further include a result. For example, the second electronic device 201 may configure state information of the second electronic device 201, as shown in operation 407 and operation 409.

In operation 419, the second electronic device 201 may transmit the location information to the geofence server 301. According to an embodiment, the second electronic device 201 may provide the location information by including the state information of the second electronic device 201.

In operation 421, in response to receiving the location information from the second electronic device 201, the geofence server 301 may transmit the received location information to the first electronic device 101. According to an embodiment, in response to receiving the state information from the geofence server 301, the first electronic device 101 may feed a relevant notification back to the user based at least in part on seeing, hearing or touching.

Figure 5:
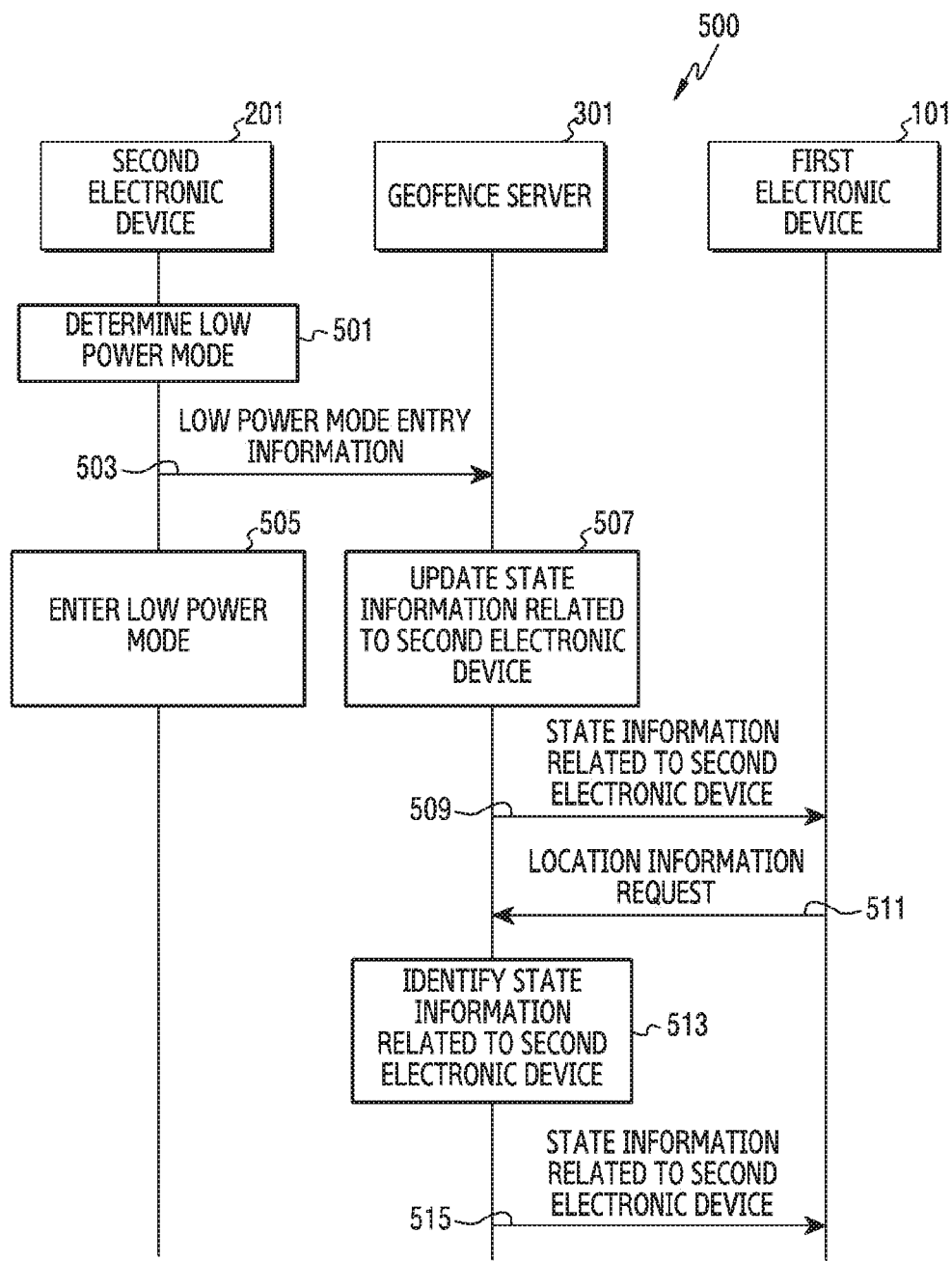
FIG. 5 is a diagram illustrating a communication method between devices in a network environment according to various embodiments.

FIG. 5 is a state diagram 500 illustrating a communication method between devices in a network environment 100 according to various embodiments.

In various embodiments, the network environment 100 may include a first electronic device 101, a second electronic device 201, and a geofence server 301. According to an embodiment, FIG. 5 may depict an operation example for providing location information of the second electronic device 201 based on the low power mode (or the PSM) of the second electronic device 201, in the network environment 100.

Referring to FIG. 5, in operation 501, the second electronic device 201 may determine the low power mode. According to an embodiment, based at least on various sensor data, the second electronic device 201 may detect a movement state (e.g., move detect, stationary detect) of the second electronic device 201. If determining that the second electronic device 201 is stationary according to a monitoring result of the movement (or the stationary), the second electronic device 201 may determine to enter the low power mode. In various embodiments, the operation of the second electronic device 201 for entering or releasing the low power mode will be described in detail by referring to the drawings to be explained.

In operation 503, based on determining the low power mode, the second electronic device 201 may transmit information related to the low power mode entry to the geofence server 301. According to an embodiment, the second electronic device 201 may transmit to the geofence server 301, by including at least part of first information relating to entering the low power mode (e.g., low power mode entry information) of the second electronic device 201, second information relating to a current location of the second electronic device 201 (e.g., location information), and third information relating to the entry/exit of the geofence.

In operation 505, the second electronic device 201 may enter the low power mode. According to an embodiment, based on transmitting the information of the low power mode entry to the geofence server 301, the second electronic device 201 may stop at least part of software and hardware based operations related to the positioning and/or the communication. For example, the second electronic device 201 may transmit the low power mode entry information to the geofence server 301, receive its response, and then stop at least part of the software and hardware based operations related to the positioning and/or the communication. According to various embodiments, operating the second electronic device 201 in the low power mode will be described in detail by referring to the drawings to be explained.

In operation 507, the geofence server 301 may update state information of the second electronic device 201. According to an embodiment, if receiving the low power entry information of the second electronic device 201 from the second electronic device 201, the geofence server 301 may store the state information of the second electronic device 201, based on the low power entry information. According to an embodiment, the geofence server 301 may store stationary information indicating that the second electronic device 201 is stationary, geofence information of the geofence entry/exit, current (or last) location information of the second electronic device 201, or may update existing data.

In operation 509, the geofence server 301 may transmit the state information of the second electronic device 201 to the first electronic device 101. According to an embodiment, in response to receiving the state information from the geofence server 101, the first electronic device 101 may feed a relevant notification back to the user based at least in part on the seeing, the hearing or the touching.

In operation 511, the first electronic device 101 may request location information of the second electronic device 201 from the geofence server 301. According to an embodiment, the user of the first electronic device 101 may request to acquire the location information of the second electronic device 201 based on a geofence service application. Based on the user's request, the first electronic device 101 may transmit a command for requesting the location of the second electronic device 201 to the geofence server 301.

In operation 513, based on receiving the location information request of the second electronic device 201 from the first electronic device 101, the geofence server 301 may identify state information of the second electronic device 201. According to an embodiment, the geofence server 301 may identify the state information of the second electronic device 201 prestored in a database. The geofence server 301 may identify whether the second electronic device 201 is in the low power mode or the normal mode, based at least in part on the state information of the second electronic device 201.

In operation 515, if identifying that the second electronic device 201 is in the low power mode, based at least in part on the state information of the second electronic device 201, the geofence server 301 may transmit the state information of the second electronic device 201 stored in the geofence server 301 to the first electronic device 101. For example, the geofence server 301 may immediately transmit the state information of the second electronic device 201 prestored in the database, without transmitting a location information request to the second electronic device 201.

According to an embodiment, the state information of the second electronic device 201 may include stationary information indicating that the second electronic device 201 is stationary, location information (e.g., last location information before entering the low power mode) of the second electronic device 201, and geofence information of the geofence entry/exit. According to an embodiment, in response to receiving the state information of the second electronic device 201 from the geofence server 301, the first electronic device 101 may feed a relevant notification back to the user based at least in part on the seeing, the hearing or the touching. According to various embodiments, the first electronic device 101 may further include and provide information notifying that the second electronic device 201 is stationary. In this regard, it is described with reference to the drawings to be described.

Figure 6:
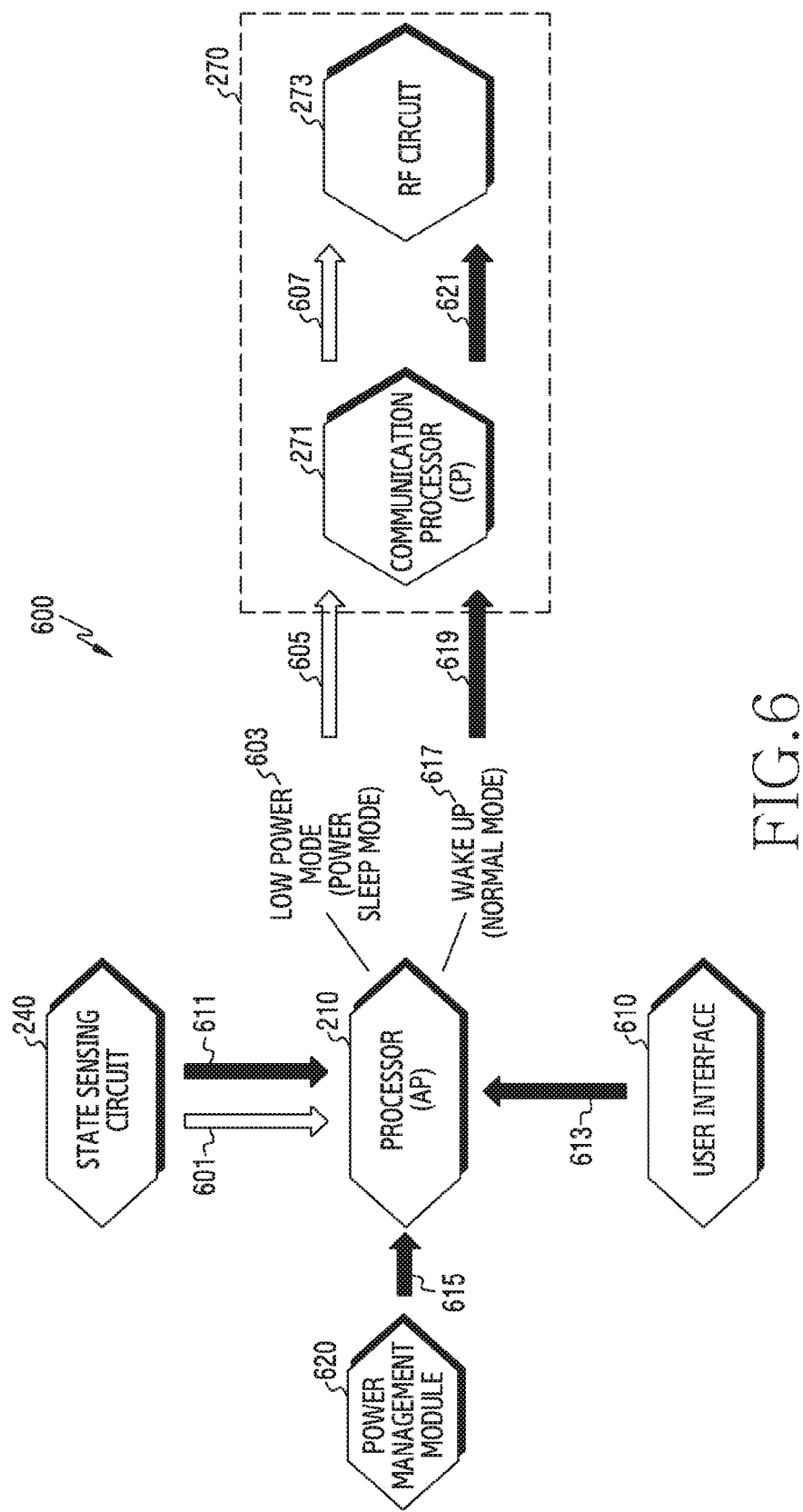
FIG. 6 is a diagram illustrating an example of operating a low power mode in an electronic device according to various embodiments.

FIG. 6 is a state diagram 600 illustrating an example of operating a low power mode in an electronic device 201 according to various embodiments.

As shown in FIG. 6, FIG. 6 may depict a signal processing example between interval components according to an operation mode of the second electronic device 201. For example, FIG. 6 may depict an operation scenario for entering or releasing the low power mode of the electronic device 201.

Referring to FIG. 6, the second electronic device 201 may include a processor 210, a state sensing circuit 240, a communications processor 271, an RF circuit 273, a power management module 620, and a user interface 610.

The processor 210 may detect the stationary state of the electronic device 201 (operation 601), based on sensor information from the state sensing circuit 240 (e.g., the controller 250). According to various embodiments, generating the sensor information according to the movement/stationary state of the electronic device 201 by the state sensing circuit 240 is elucidated with reference to the drawings to be explained.

According to an embodiment, based on detecting the stationary state of the electronic device 201, the processor 210 may determine to enter the low power mode (or the power sleep mode) (operation 603). For example, based on detecting the stationary state of the electronic device 201 from the state sensing circuit 240, the processor 210 may determine that the electronic device 201 is stationary, and determine to enter the low power mode.

According to an embodiment, in response to determining to enter the low power mode, the processor 210 may transmit signals to stop (or pause) the operation to each of the elements (e.g., an application and/or hardware). For example, the processor 210 may pause the operation of each of the elements (e.g., an application and/or hardware) for processing the positioning operation and/or the communication operation. According to an embodiment, the processor 210 may request the communication circuit 270 (e.g., the CP 271) for processing the communication function to enter the low power mode (or the power sleep mode).

According to an embodiment, in response to receiving the low power mode entry request from the processor 210, the communication processor 271 may notify the low power mode entry of the electronic device 201 to the geofence server 301, and terminate a connection session with the geofence server 301. For example, the communication processor 271 may turn off the RF circuit 273 (operation 607). The communications processor 271 may control the turn-off of the RF circuit 273 and then enter (switch to) the low power mode (or the power sleep mode).

According to an embodiment, based on detecting the movement state of the electronic device 201, the processor 210 may determine to switch from the low power mode to the normal mode (operation 611). For example, based on detecting the movement state of the electronic device 201 from the state sensing circuit 240, the processor 210 may determine that the electronic device 201 is moving, and determine to switch from the low power mode to the normal mode. According to an embodiment, the processor 210 may determine to switch from the low power mode to the normal mode (operation 613) based on detecting input information inputted by the user using the user interface 610 (e.g., a button) of the electronic device 101. According to an embodiment, based on detecting an interrupt generated from the power management module 620 of the electronic device 201, the processor 210 may determine to switch from the low power mode to the normal mode (operation 615). For example, based on receiving discharge warning information from the power management module 620, the processor 210 may determine to switch from the low power mode to the normal mode. According to an embodiment, if switching to the normal mode based on the discharge warning information, the processor 210 may transmit a current location (or the last location) of the electronic device 201 and, additionally or alternatively, transmit to the geofence server 301 notification information notifying that the electronic device 101 is terminated (or is to be terminated) due to the discharge and/or notify it to the user of the electronic device 201 through the output device 230. Additionally, the processor 210 may determine to switch from the low power mode to the normal mode, if the operation by the moisture sensor 265 is detected over a specific time from the state sensing circuit 240.

According to an embodiment, based on detecting the movement state of the electronic device 101, or based on detecting a state requiring to switch to the normal mode of the electronic device 201, the processor 210 may determine to switch from the low power mode to the normal mode, and wake up (operation 617).

According to an embodiment, in response to determining to switch to the normal mode switch (or in response to waking up), the processor 210 may transmit signals to the elements (e.g., an application and/or hardware, etc.) to resume their operation. For example, the processor 210 may resume the operations of the elements (e.g., applications and/or hardware) for processing the positioning operation and/or the communication operation. According to an embodiment, the processor 210 may request the normal mode switch (or to wake up) from the communication circuit 270 (e.g., the communication processor 271) which processes the communication function.

According to an embodiment, in response to receiving the normal mode switch request (or the wake-up request) from the processor 210, the communication processor 271 may wake up and process an operation for session connection with the geofence server 301. For example, the communication processor 271 may wake up and then turn on the RF circuit 273 (operation 621). The communication processor 271 may control the turn-on of the RF circuit 273 and then connect the session with the geofence server 301, and then transmit information for updating the location information of the electronic device 201 to the geofence server 301.

Figure 7:
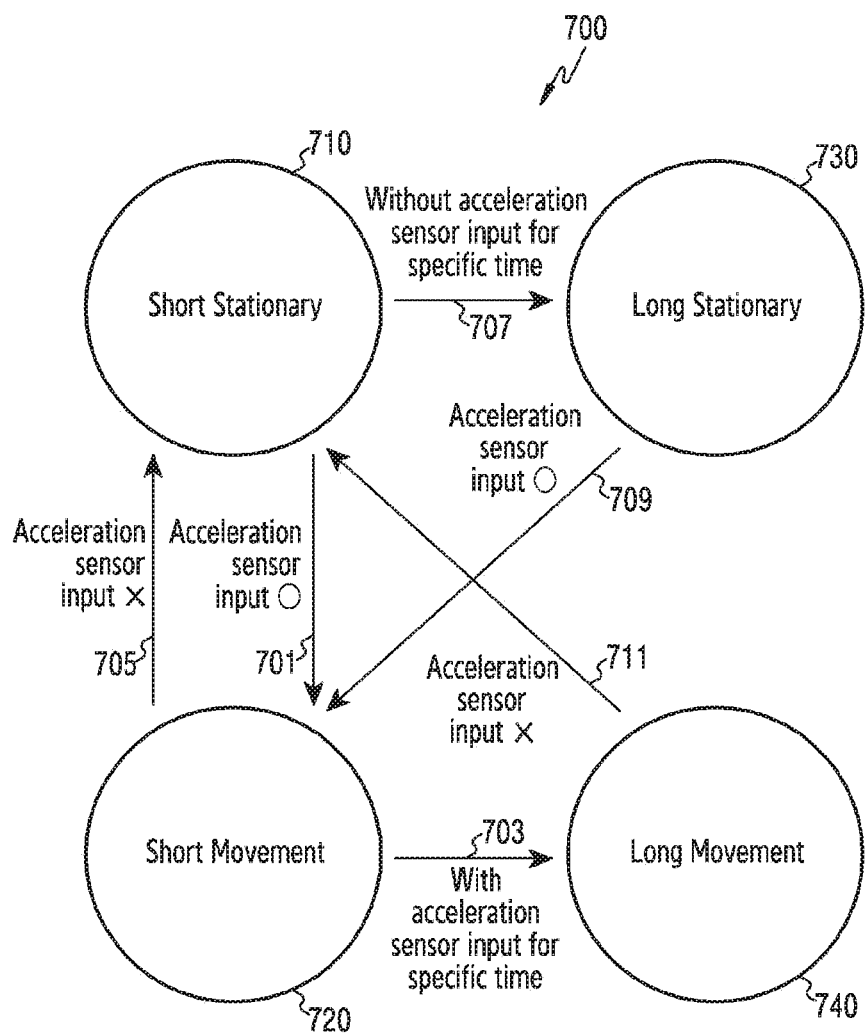
FIG. 7 is a diagram illustrating an operation example of determining a movement/stationary state of an electronic device according to various embodiments.

FIG. 7 is a state diagram 700 illustrating an operation example of determining a movement/stationary state of an electronic device 201 according to various embodiments.

As shown in FIG. 7, FIG. 7 may depict an example of modeling (e.g., state machine models) with respect to movement information determination of the state sensing circuit 240 (e.g., the controller 250).

According to various embodiments, the controller 250 may calculate the movement information using the acceleration sensor 261/gyro sensor 263. The controller 250 is a module including a standalone processor (e.g., a sensor hub or an MPU), and may collect sensor information of various sensors (e.g., the acceleration sensor 261, the gyro sensor 263, the moisture sensor 265, and so on) and provide the processed information to the processor 210 (and/or the communication processor 271).

Referring to FIG. 7, the states relating to the movement of the electronic device 201 may be largely divided into two states (e.g., the movement state and the stationary state), and the two states may be subdivided to four states. According to an embodiment, the electronic device 201 may set the states of short stationary 710, short movement 720, long stationary 730, and long movement 740. According to an embodiment, the state of the electronic device 201 may be determined based at least in part on the information obtained from various sensors, through the controller 250.

According to an embodiment, if an input value 701 is generated by the acceleration sensor 261 in the short stationary state 710 of the electronic device 201, the short movement state 720 may be determined. If an input value 703 is generated by the acceleration sensor 261 over a specific time in the short movement state 720 of the electronic device 201, the long movement state 740 may be determined. According to an embodiment, if determining the long movement state 740, the controller 250 may transmit (or notify) relevant information to the processor 210 (e.g., the application processor).

According to an embodiment, if an input value 705 is not generated by the acceleration sensor 261 in the short stationary state 720 of the electronic device 201, the short stationary state 710 may be determined. If an input value 707 is not generated by the acceleration sensor 261 over a specific time in the short stationary state 710 of the electronic device 201, the long stationary state 730 may be determined. According to an embodiment, if determining the long stationary state 730, the controller 250 may transmit (or notify) relevant information to the processor 210 (e.g., the application processor).

According to an embodiment, if an input value 701 is generated by the acceleration sensor 261 in the long stationary state 730 of the electronic device 201, the short movement state 720 may be determined. Likewise, if an input value 703 is generated by the acceleration sensor 261 over a specific time in the short movement state 720, the long movement state 740 may be determined, to transmit (or notify) relevant information to the processor 210 (e.g., the application processor).

According to an embodiment, if an input value 711 is not generated by the acceleration sensor 261 in the long movement state 740 of the electronic device 201, the short stationary state 710 may be determined. Likewise, if an input value 707 is not generated by the acceleration sensor 261 over a specific time in the short stationary state 710, the long stationary state 730 may be determined, to transmit (or notify) relevant information to the processor 210 (e.g., the application processor).

According to various embodiments, based on information obtained from at least one sensor, if change in the information lasts for a specific time (e.g., if there is no movement change), the controller 250 may treat as the stationary information (e.g., the stationary information) of the electronic device 201. Accordingly, the control unit 250 may calculate as the stationary information if there is no sensor value for (or over) a specific time. The controller 250 may determine that the electronic device 201 moves or is stationary using such values, and provide a relevant result value to the processor 210.

According to an embodiment, the controller 250 may set a specific value for determining the movement or stationary state of the electronic device 201. According to an embodiment, the controller 250 may define a stationary detection time (e.g., a first setting value) n seconds to determine no movement, and a movement detection time (e.g., a second setting value) m seconds to determine the movement. According to an embodiment, the stationary detection time n may be defined to be over 1800 seconds (30 minutes) (e.g., n=1800 sec), and the movement detection time m may be defined to be over 60 seconds (1 minute) (e.g., m=60 sec). According to an embodiment, if detecting that the electronic device 101 moves at least for (or over) the movement detection time m, the controller 250 may transmit corresponding information to the processor 210 (e.g., the application processor).

According to various embodiments, the controller 250 may acquire not only the movement information of the electronic device 201 but also information of other sensors, and provide to the processor 210 (e.g., the application processor) based on a particular state. For example, if detecting moisture over a specific level by the moisture sensor 265, the controller 250 may provide to the processor 210. Additionally or alternatively, the electronic device 201 may include a gas sensor (not shown) and/or a thermal sensor (not shown), and in this case, may provide a relevant result to the processor 210, based on information detected by such sensors. In various embodiments, sensors such as the moisture sensor 213, the gas sensor (not shown), or thermal sensor (not shown) may be equipped to detect a state of a user's emergency of the electronic device 201.

According to various embodiments, if the electronic device 201 moves a specific distance based on the location information acquired by the positioning circuit 280, the controller 250 may determine the stationary movement, and provide related information to the processor 210 (e.g., the application processor). Such an operation may be operated only for a specific battery level or more based on the remaining battery capacity of the electronic device 201 based ono the considerable power consumption of the positioning circuit 280.

Figure 8:
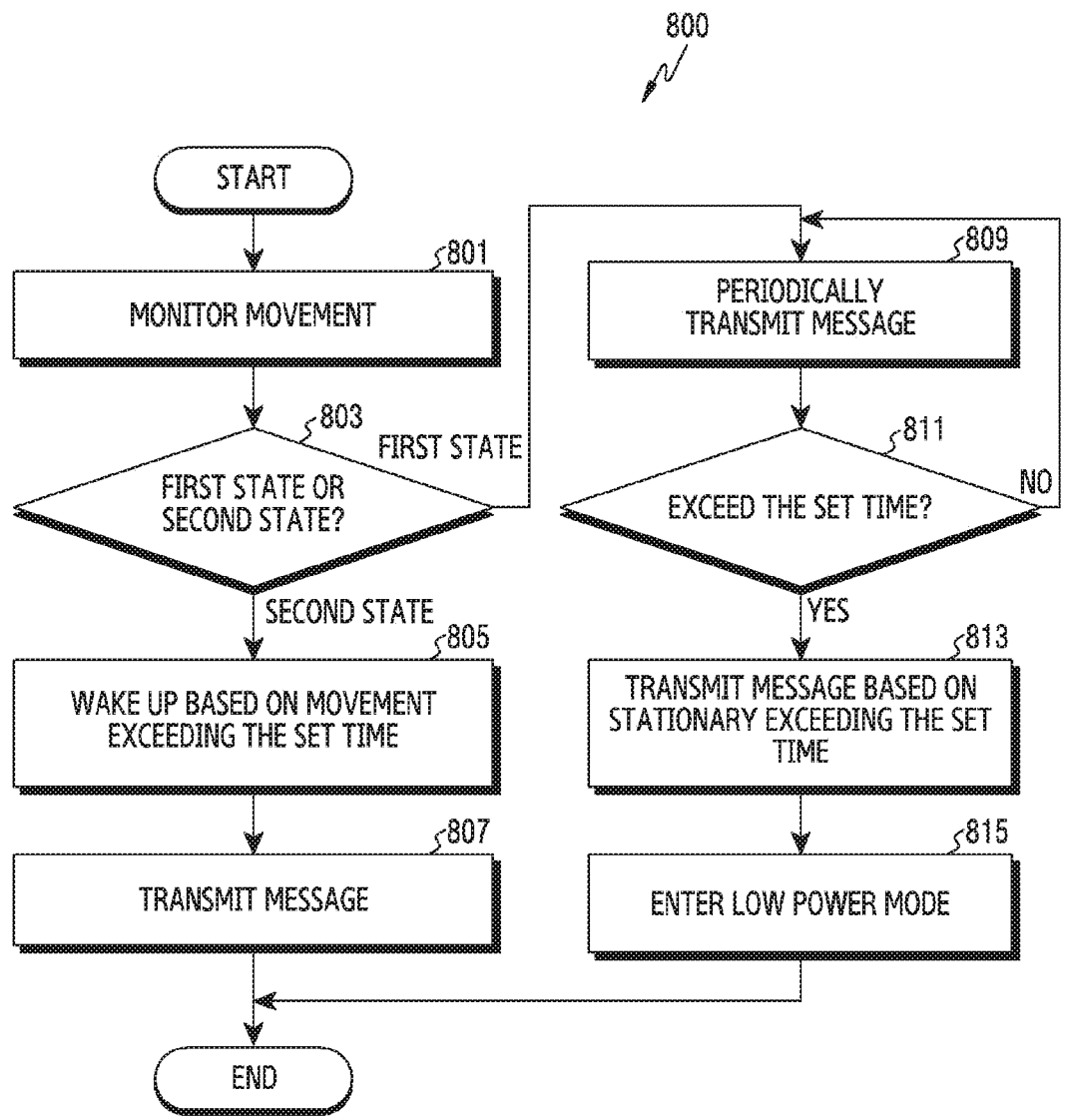
FIG. 8 is a flowchart illustrating an operating method of an electronic device according to various embodiments.

FIG. 8 is a flowchart 800 illustrating an operating method of an electronic device 201 according to various embodiments.

Referring to FIG. 8, in operation 801, the processor 210 (e.g., the application processor) of the electronic device 201 may monitor movement of the electronic device 201. According to an embodiment, the processor 210 may determine a monitoring result based on the monitoring result of the movement of the electronic device 201 by the state sensing circuit 240.

In operation 803, the processor 210 may determine the state of the electronic device 101, based on the monitoring result. According to an embodiment, based on the monitored movement of the electronic device 201, the processor 210 may determine whether the electronic device 201 corresponds to a first state or a second state.

According to an embodiment, the first state (e.g., the normal mode) may include a state in which the electronic device 201 transmits a message at first time intervals (e.g., periodic intervals or aperiodic intervals), and maintains the processor 210 in the low power or sleep mode for other times (e.g., the time other than the first time interval set in the message transmission). According to an embodiment, the second state (e.g., the low power mode) may include a state in which the processor 210 is in the low power mode or the sleep mode, and after the monitored movement exceeds a threshold (e.g., the state 740 of FIG. 7) for a first selected period of time, wakes up and transmits a message. According to an embodiment, the message may include information of a geographical area where the electronic device 201 is located. According to an embodiment, the geographical area information may include geofence information.

In operation 803, if determining the second state, the processor 210 may wake up based on the movement exceeding the set time, in operation 805. According to an embodiment, the processor 210 may determine the short movement state (e.g., see the state 720 of FIG. 7) according to an input value of the state sensing circuit 240 in the low power mode, and determine the long movement state (e.g., see the state 740 of FIG. 7) according to an input value over a specific time in the short movement state.

In operation 807, the processor 210 may transmit a message. According to an embodiment, the processor 210 may wake up the communication circuit 270, and transmit a message including information of the normal mode switch of the electronic device 101 and information for updating the location of the electronic device 201, to the geofence server based on the communication circuit 270.

In operation 803, if determining the first state, the processor 210 may periodically transmit a message, in operation 809. According to an embodiment, if determining the first state, the processor 210 may identify that the electronic device 201 is in the normal mode, and transmit a message at least on a periodic basis or at a request.

In operation 811, the processor 210 may determine whether the set time related to the stationary of the electronic device 201 is exceeded. According to an embodiment, the processor 210 may determine whether the electronic device 201 is in the stationary state exceeding the setting time based on the movement information of the state sensing circuit 240.

In operation 811, if determining that the set time is not exceeded (NO of operation 811), the processor 210 may proceed to operation 809 and process operations following operation 809.

In operation 811, if determining that the set time is exceeded (YES of operation 811), the processor 210 may transmit a message based on the stationary exceeding the set time, in operation 813. According to an embodiment, the processor 210 may determine the short stationary time (e.g., see 710 in FIG. 7) according to the input value of the state sensing circuit 240 in the normal mode, and determine the long stationary time (e.g., see 730 in FIG. 7) according to the input value over a specific time in the short stationary state. Based on determining the long stationary state, the processor 210 may transmit a message including the low power mode entry information of the electronic device 201 and the information for updating the location of the electronic device 201 through the communication circuit 270.

In operation 815, the processor 210 may enter the low power mode. According to an embodiment, the processor 210 may process the low power mode (or a power save mode) entry with respect to at least part of the communication circuit 270, and then enter the low power mode.

According to various embodiments, although not depicted, if the monitored movement does not exceed the threshold during a second selected time period, the processor 210 may switch from the first state to the second state. According to an embodiment, the processor 210 may determine the short movement state (e.g., see 720 in FIG. 7) according to the input value by the state sensing circuit 240 in the low power mode, and determine the short stationary state (e.g., see 710 in FIG. 7) if there is no input value over the specific time in the short movement state. The processor 210 may switch the electronic device 201 from the first state to the second state based on the determination result. According to an embodiment, the second selection period of time may be set longer than the first selected period of time. According to an embodiment, the first period may be set longer than the length of the second selected period of time.

According to various embodiments, the processor 210 may switch from the second state to the first state after the monitored movement exceeds the threshold for the first selected period of time.

According to various embodiments, the electronic device 201 may include the communication circuit 270 including the communications processor 271 and the RF circuit 273. According to various embodiments, at least part of the communication circuit 270 may stay in the low power mode (or the sleep mode) for other times of the first state under the control of the processor 201 and/or while the processor 210 electrically connected (coupled) to the communication circuit 270 is in the low power mode (or the sleep mode).

According to various embodiments, the state sensing circuit 240 (e.g., the controller 250) may provide at least one signal to the processor 210 to wake up the processor 210 from the low power mode (or the sleep mode). According to an embodiment, the processor 210 in the low power mode may wake up based on the at least one signal (e.g., sensor information) of the state sensing circuit 240 (e.g., the controller 250).

According to various embodiments, the state sensing circuit 240 (e.g., the controller 250) may provide at least one signal to at least one processor to wake up the processor 210 in the low power mode (or the sleep mode).

Figure 9:
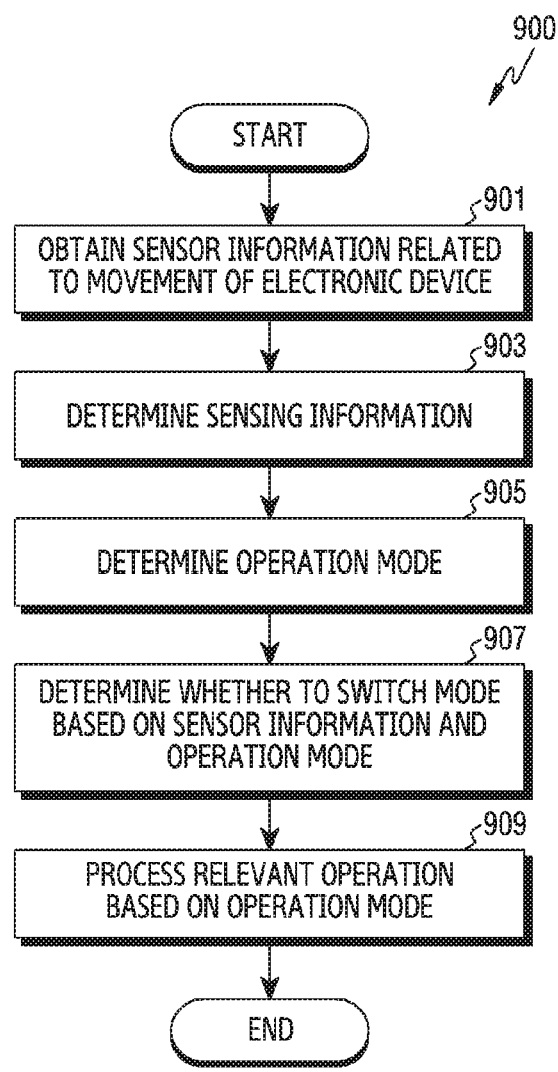
FIG. 9 is a flowchart illustrating an operating method of an electronic device according to various embodiments.

FIG. 9 is a flowchart 900 illustrating an operating method of an electronic device 201 according to various embodiments.

Referring to FIG. 9, in operation 901, the state sensing circuit 240 of the electronic device 201 may obtain sensor information related to movement of the electronic device 201. According to an embodiment, the state sensing circuit 240 may acquire the sensor information, based at least in part based on the operations of FIG. 7.

In operation 903, the state sensing circuit 240 may determine the sensor information. According to an embodiment, the state sensing circuit 240 may determine whether the sensor information corresponds to the movement information, or the stationary information. For example, the state sensing circuit 240 may determine whether the electronic device 201 is moving or stationary, based on the sensor information. According to an embodiment, the state sensing circuit 240 may provide a determination result to the processor 210.

In operation 905, the processor 210 may determine the operation mode of the electronic device 201. According to an embodiment, the processor 210 may determine whether at least part of the electronic device 201 is operating in the low power mode (e.g., the communication processor 271, the RF circuit 273, and so on in the sleep state), or in the normal mode. According to an embodiment, if the electronic device 201 is in the low power mode, the state sensing circuit 240 (e.g., the controller 250) may transmit an event (e.g., stationary or movement) to the processor 210 based on the sensor value. The processor 210 may wake up based on the event (e.g., the movement) of the state sensing circuit 240, and determine the operation mode of the electronic device 240 after the wake-up. According to an embodiment, if the electronic device 201 is in the normal mode, the processor 210 may determine to enter the low power mode based on the event (e.g., the stationary) of the state sensing circuit 240.

In operation 907, the processor 210 may determine whether to switch the mode of the electronic device 201, based at least on the sensor information and the operation mode.

According to an embodiment, if the sensor information is the movement information and the operation mode is the normal mode, the processor 210 may determine to maintain the mode (e.g., maintain the normal mode). According to an embodiment, if the sensor information is the movement information and the operation mode is the low power mode in at least part (e.g., the communication processor 271, the RF circuit 273, etc.), the processor 210 may determine to switch the mode (e.g., switch from the low power mode to the normal mode). According to an embodiment, if the sensor information is the stationary information and the current operation mode is the normal mode, the processor 210 may determine to switch the mode (e.g., switch from the normal mode to the low power mode).

In operation 909, the processor 210 may process a relevant operation based on the operation mode. According to an embodiment, based on the determination result (e.g., maintain the mode or switch the mode), the processor 210 may process the switch between the modes and the operation execution in a corresponding mode. According to an embodiment, if determining to switch from the low power mode to the normal mode, the processor 210 may wake up the communication processor 271, and turn on the RF circuit 273 based on the communication processor 271. According to an embodiment, if determining to switch from the normal mode to the low power mode, the processor 210 may switch the communication processor 271 to the low power mode (e.g., the power sleep mode). According to an embodiment, if determining to switch from the normal mode to the low power mode, the processor 210 may turn off the RF circuit 273 based on the communication processor 271.

Figure 10:
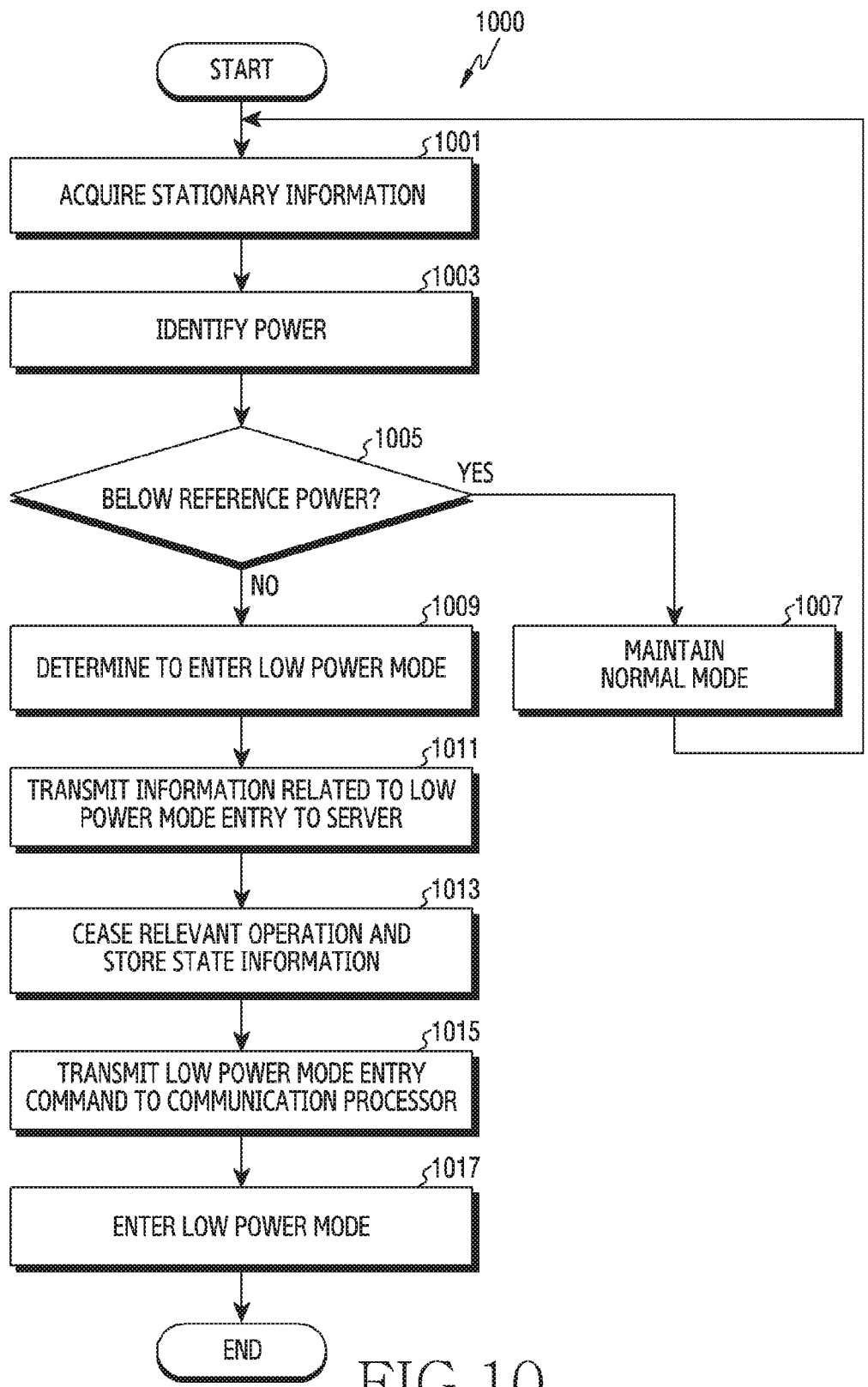
FIG. 10 is a flowchart illustrating an operating method of an electronic device according to various embodiments.

FIG. 10 is a flowchart 1000 illustrating an operating method of an electronic device 201 according to various embodiments.

In various embodiments, FIG. 10 may depict an example of an operation scenario of the electronic device 201 which enters from the normal mode to the low power mode.

Referring to FIG. 10, in operation 1001, the processor 210 (e.g., the application processor) of the electronic device 201 may acquire stationary information related to the electronic device 201, from the controller 250 (e.g., the sensor hub, the MPU, etc.) (or from the state sensing circuit 240) which manages sensors for measuring or detecting the operation state of the electronic device 201.

In operation 1003, the processor 210 may identify the power of the electronic device 201, based on acquiring the stationary information.

In operation 1005, the processor 210 may determine whether the identified power is below reference power. In various embodiments, the reference power indicates reference power for the electronic device 201 to determine whether to enter the low power mode based on the stationary information, and may be set to specific power before the discharge (e.g., the power to be discharged) of the electronic device 201. For example, the processor 210 may determine whether to enter the low power mode, based on remaining power of the electronic device 201 in the stationary information acquisition.

In operation 1005, if determining that the identified power is below the reference power (YES of operation 1005), for example, if the identified power is the power to be discharged, the processor 210 may maintain the normal mode, in operation 1007. For example, although the stationary information is acquired, if determining the power of the electronic device 201 below the reference power, the processor 210 may not enter the low power mode.

In operation 1005, if determining that the identified power is not below the reference power (NO of operation 1005), for example, if the identified power exceeds the power to be discharged, the processor 210 may determine the low power mode entry, in operation 1009 For example, the processor 210 may determine the low power mode entry of the electronic device 201, based on the stationary information.

In operation 1011, the processor 210 may transmit information related to the low power mode entry to a server (e.g., the geofence server 301).

In operation 1013, the processor 210 may stop the operation at least in part based on the low power mode entry of the electronic device 201, and store state information of a current status of the electronic device 201. According to an embodiment, the processor 210 may stop the operation of the elements (e.g., the application (or software) and/or hardware, etc.) for operating in the low power mode. According to an embodiment, the processor 210 may pause the positioning operation of the processor 210, the operation for determining the geofence entry/exit, the session process operation with the server, and so on, and store the status that the state of the electronic device 201 is the low power mode state. According to an embodiment, the processor 210 may store location information of a current location (e.g., a final location) of the electronic device 201, and geofence information related to whether to enter/exit the geofence.

In operation 1015, the processor 210 may transmit a low power mode entry command to the communication processor 271. According to an embodiment, in response to the low power mode entry command of the processor 210, the communication processor 271 may control to turn off the RF circuit 273 and enter the low power mode (e.g., the power sleep mode).

In operation 1017, the processor 210 may enter the low power mode.

Figure 11:
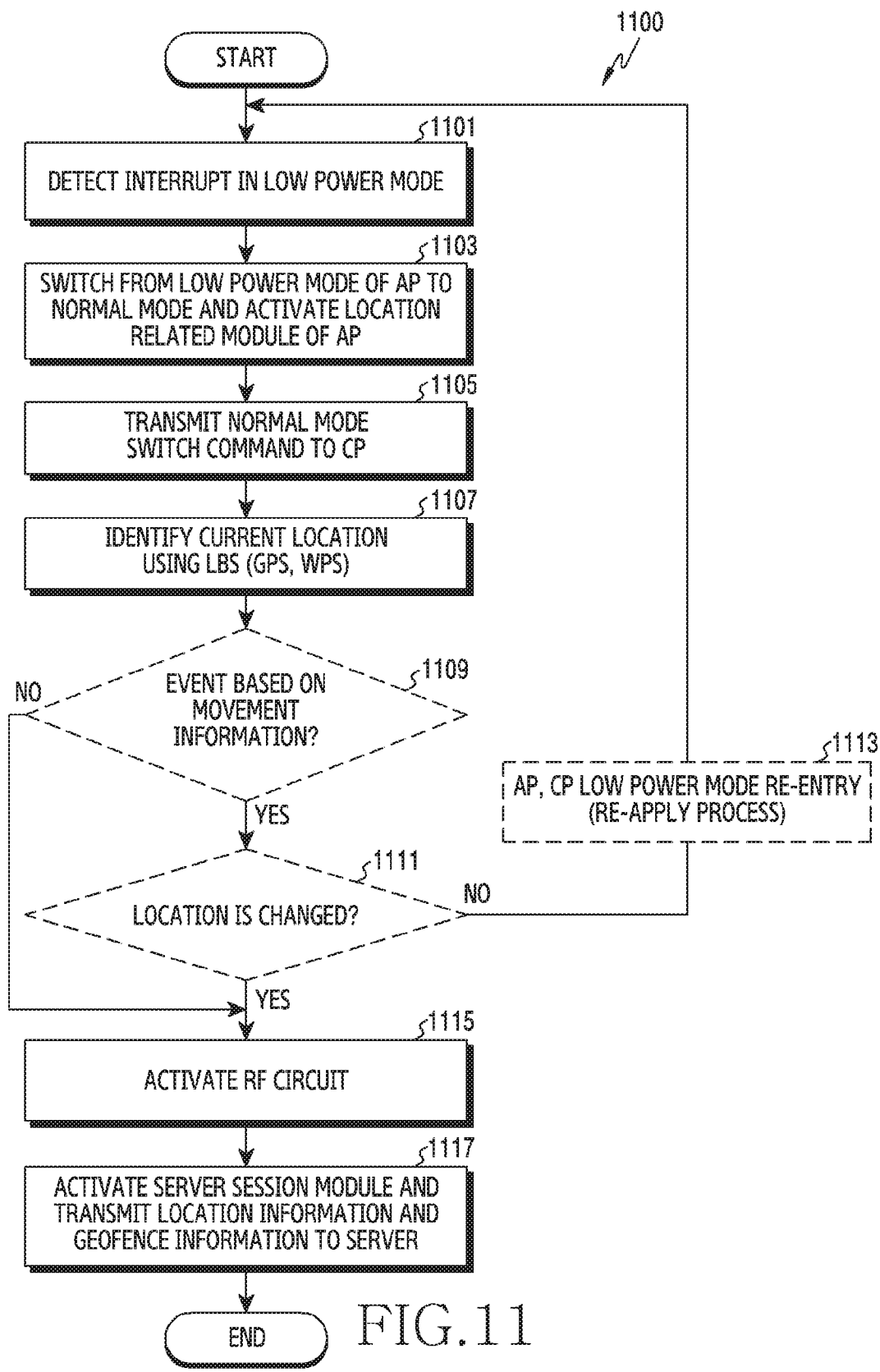
FIG. 11 is a flowchart illustrating an operating method of an electronic device according to various embodiments.

FIG. 11 is a flowchart 1100 illustrating an operating method of an electronic device 201 according to various embodiments.

In various embodiments, FIG. 11 may depict an example of an operation scenario in which the electronic device 201 releases the low power mode (e.g., wakes up in the low power mode and switches to the normal mode).

Referring to FIG. 11, in operation 1101, the AP 210 of the electronic device 201 may detect an interrupt in the low power mode. According to an embodiment, the application processor 210 may receive an event based on at least one of various modules of the electronic device 201. According to an embodiment, the application processor 210 may receive at least one event of receiving movement information or moisture evasion information from the state sensing circuit 240 or the controller 250 (e.g., the sensor hub, the MPU, etc.), receiving discharge warning information from the power management module 620, receiving the power supply from outside to charge the power management module 620, or receiving a button input. According to an embodiment, if the electronic device 201 operates in the low power mode, the state sensing circuit 240 (or the controller 250) may forward at least one event to the application processor 210 based on a sensor value, and the application processor 210 may wake up based on the at least one event.

In operation 1103, the application processor 210 may switch from the low power mode to the normal mode, and activate a location related module (e.g., the positioning circuit 280) of the application processor 210. According to an embodiment, the AP 210 may wake up, in response to receiving the event from the controller 250.

In operation 1105, the application processor 210 may transmit a normal mode switch command to the CP 271. For example, the application processor 210 may request the communication processor 271 to wake up.

In operation 1107, the application processor 210 may identify a current location of the electronic device 201 using the LBS (e.g., GPS, WPS, Cellular, etc.).

In operation 1109, the application processor 210 may determine whether the received event is an event based on the movement information. For example, the application processor 210 may determine whether the event received in operation 1101 corresponds to the movement information received from the state sensing circuit 240 (e.g., the controller 250 (e.g., the sensor hub, the MPU, etc.)).

In operation 1109, if it is not the event based on the movement information (NO of operation 1109), the application processor 210 may proceed to operation 115 and process to perform operations following operation 1115.

In operation 1109, if it is the event based on the movement information (YES of operation 1109), the application processor 210 may determine whether the location of the electronic device 201 is changed, in operation 1111. According to an embodiment, the processor 210 may perform the positioning function on the current location of the electronic device 201 using the LBS (e.g., GPS, WPS, Cellular, etc.).

In operation 1111, in response to no change in the location of the electronic device 201 (NO of operation 1111), the application processor 210 may process the application processor 210 and the communication processor 271 to re-enter the low power mode, in operation 1113. For example, the application processor 210 may re-perform the process for re-entering the low power mode or the sleep mode, and proceed to operation 1101, to perform operations following operation 1101. In various embodiments, operation 1109, operation 1111 and operation 1113 are the operations executable additionally or alternatively, and the application processor 210 may perform operation 1115 immediately after operation 1107.

In operation 1109 or operation 1111, in response to receiving the event (YES of operation 1109), or in response to identifying the change in the location of the electronic device 201 (YES of operation 1111), the application processor 210 may process to activate the RF circuit 273, in operation 1115. For example, the application processor 210 may process to turn on the RF circuit 273 by the communications processor 271.

In operation 1117, the application processor 210 may activate a server session module, and transmit location information of the electronic device 201 and geofence information to a server (e.g., the geofence server 301). For example, the AP 210 may resume the session process operation with the server over the LPWAN, and transmit the location information of the electronic device 201 and the geofence information to the server through the RF circuit 273, based on the session establishment with the server.

Figure 12:
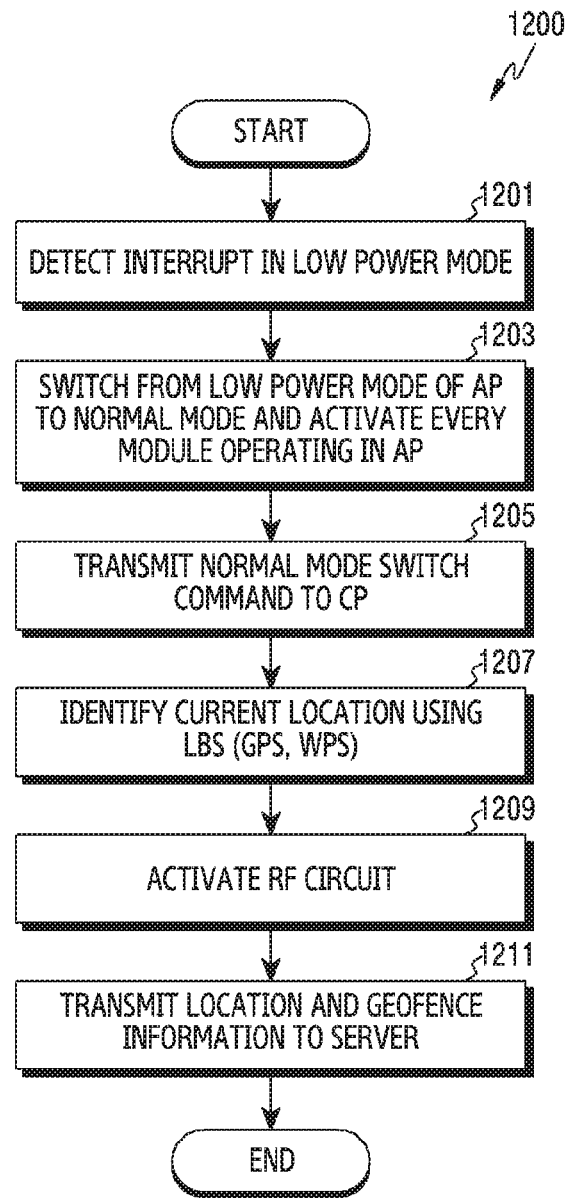
FIG. 12 is a flowchart illustrating an operating method of an electronic device according to various embodiments.

FIG. 12 is a flowchart 1200 illustrating an operating method of an electronic device 201 according to various embodiments.

In various embodiments, FIG. 12 may depict an example of an operating scenario in which the electronic device 201 wakes up in the low power mode and provides location information by switching to the normal mode.

Referring to FIG. 12, in operation 1201, the AP 210 of the electronic device 201 may detect an interrupt in the low power mode. According to an embodiment, the application processor 210 may receive at least one event of receiving movement information or moisture evasion information from the state sensing circuit 240 or the controller 250 (e.g., the sensor hub, the MPU, etc.), receiving discharge warning information from the power management module 620, receiving power supply from outside to charge the power management module 620, or receiving a button input. According to an embodiment, if the electronic device 201 operates in the low power mode, the state sensing circuit 240 (or the controller 250) may forward at least one event to the application processor 210 based on a sensor value, and the application processor 210 may wake up based on the at least one event.

In operation 1203, the application processor 210 may switch from the low power mode to the normal mode, and activate every module which operates in the application processor 210. According to an embodiment, the application processor 210 may activate the positioning circuit 280.

In operation 1205, the application processor 210 may transmit a normal mode switch command to the CP 271. For example, the application processor 210 may request the CP 271 to wake up.

In operation 1207, the application processor 210 may identify a current location of the electronic device 201 using the LBS (e.g., GPS, WPS, Cellular, etc.).

In operation 1209, the application processor 210 may process to activate the RF circuit 273. For example, the application processor 210 may process to turn on the RF circuit 273 by the communications processor 271.

In operation 1211, the application processor 210 may transmit location information of the electronic device 201 and geofence information. According to an embodiment, the application processor 210 may transmit the location information based on the identified location information and the geofence information to the server through the RF circuit 273.

Additionally or alternatively, according to various embodiments, if determining no movement of the state sensing circuit 240 (e.g., the controller 250) for a long time, and if determining that the electronic device 201 does not update with the server 301 (e.g., the geofence server) for a long time, the application processor 210 may update the location to the server 301 by switching to the normal mode and return to the low power mode. The server 301 may update of the location of the second electronic device 201, and if there is no change in the location of the second electronic device 201 (e.g., if there is no change with the existing location), the server 301 may not notify the location of the second electronic device 201, to the first electronic device 101.

Figure 13:
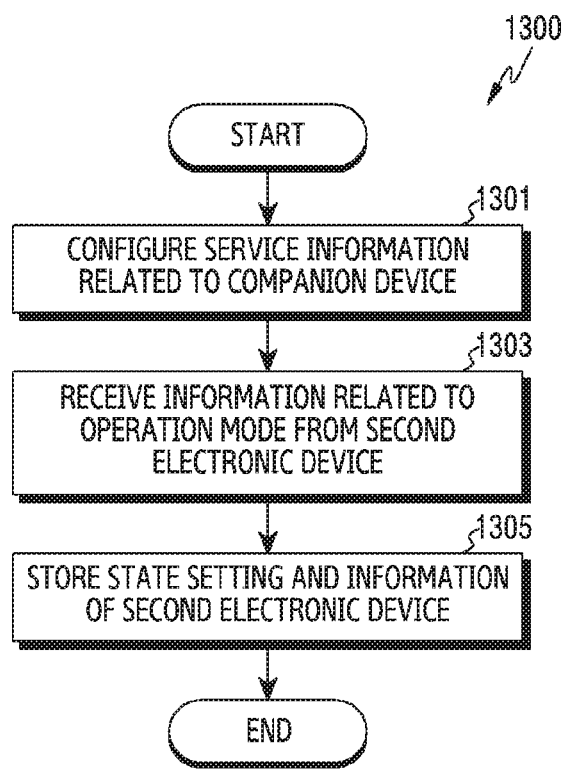
FIG. 13 is a flowchart illustrating an operating method of a server according to various embodiments.

FIG. 13 is a flowchart 1300 illustrating an operating method of a server 301 according to various embodiments.

In various embodiments, FIG. 13 may depict an example of an operation scenario in which the server 301 (e.g., the geofence server) sets and manages information related to companion devices.

Referring to FIG. 13, in operation 1301, the server 301 (or a processor (not shown) of the server 301)) may configure service information related to the companion device. According to an embodiment, based on a request of the first electronic device 101, the server 301 may register and manage the first electronic device 101 and the second electronic device 201, as their companion device.

In operation 1303, the server 301 may receive information related to the operation mode of the second electronic device 201, from the second electronic device 201. According to an embodiment, in response to receiving information informing the low power mode switch of the second electronic device 201, the server 301 may detect a state change of the second electronic device 201. According to an embodiment, in response to receiving the information informing the normal mode switch of the second electronic device 201, the server 301 may detect a state change of the second electronic device 201.

In operation 1305, the server 301 may store state setting and the state information of the second electronic device 201. According to an embodiment, the state setting of the second electronic device 201 may be set based on a first state or a second state. In various embodiments, the first state may be a setting value indicating that the second electronic device 201 is in the normal mode state. In various embodiments, the second state may be a setting value indicating that the second electronic device 201 is in the low power mode state. According to an embodiment, the server 301 may store the state information based on last location information detected from the second electronic device 201, and geofence information.

In various embodiments, based on the change of the state information of the electronic device 201, the server 301 may update previously stored state information based on the changed information. In various embodiments, based on the status setting and the state information of the second electronic device 201, the server 301 may process an operation corresponding to a location information request for the second electronic device 201 of the first electronic device 101. This shall be described later by referring to FIG. 14.

Figure 14:
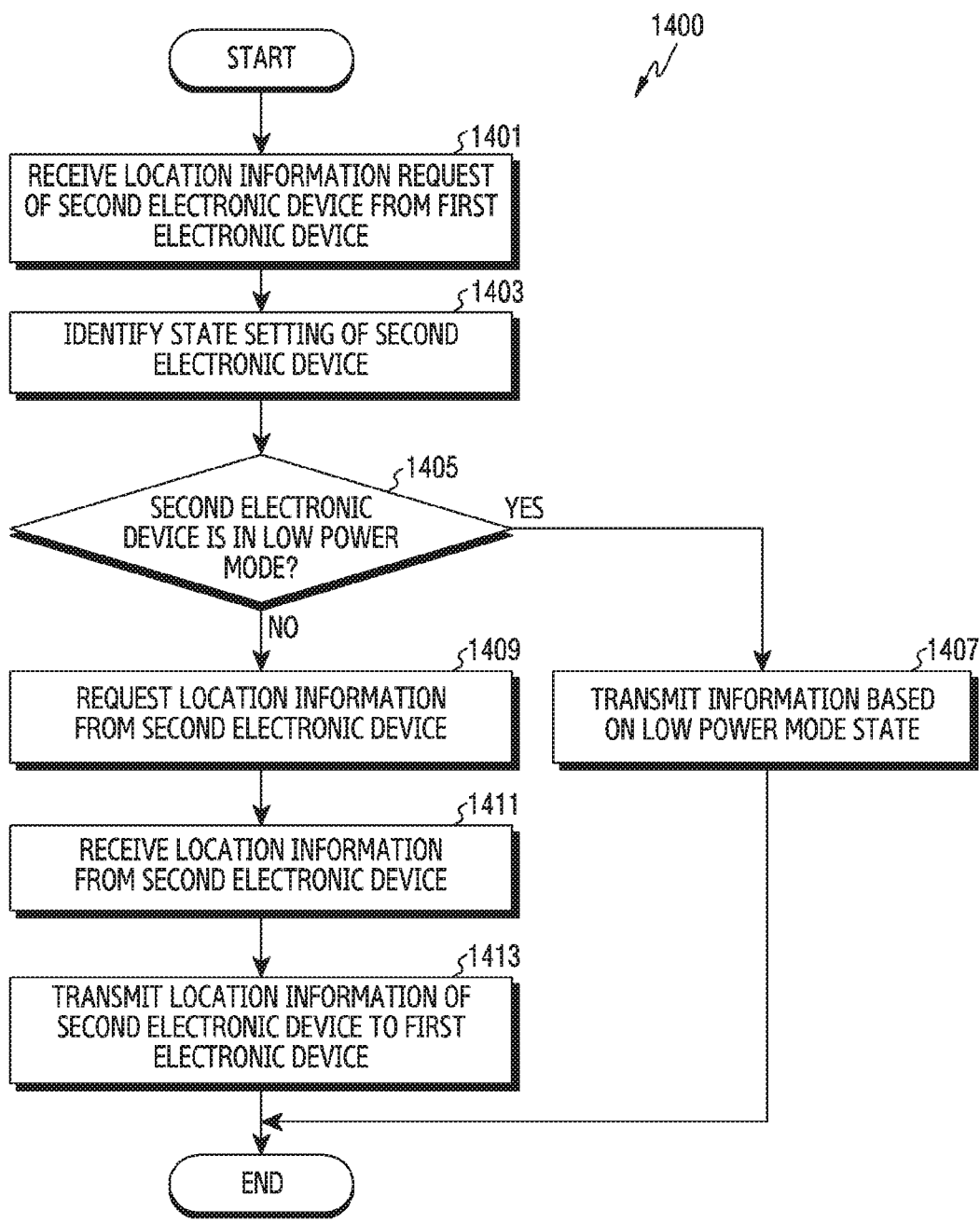
FIG. 14 is a flowchart illustrating an operating method of a server according to various embodiments.

FIG. 14 is a flowchart 1400 illustrating an operating method of a server 301 according to various embodiments.

In various embodiments, FIG. 14 may depict an example of an operation scenario in which, in response to receiving a location information request for the second electronic device 201 from the first electronic device 101, the server 301 (e.g., the geofence server) provides location information of the second electronic device 201 to the first electronic device 101.

Referring to FIG. 14, in operation 1401, the server 301 (e.g., the geofence server) (or a processor (not shown) of the server 301) may receive a request for location information of the second electronic device 201, from the first electronic device 101.

In operation 1403, the server 301 may identify state setting of the second electronic device 201. According to an embodiment, the server 301 may identify whether the state setting of the second electronic device 201 corresponds to the first state or corresponds to the second state.

In operation 1405, the second electronic device 201 may determine whether it is in the low power mode. According to an embodiment, the server 301 may determine whether the second electronic device 201 is in the first state or the second state, by checking a state setting value which is set for the second electronic device 201. According to an embodiment, by checking the state setting value which is set for the second electronic device 201, if identifying the second state, the server 301 may determine that the second electronic device 201 is in the low power mode.

In operation 1405, if determining that the second electronic device 201 is in the low power mode (YES of operation 1405), in operation 1407, the server 301 may transmit information based on the low power mode state to the first electronic device 101. According to an embodiment, the server 301 may transmit to the first electronic device 101 information notifying the stationary state of the second electronic device 201, information of the last location of the second electronic device 201, or geofence information of the last geofence entry/exit of the second electronic device 201.

In operation 1405, if determining that the second electronic device 201 is not in the low power mode (NO of operation 1405), for example, if determining that the second electronic device 201 is in the normal mode, in operation 1409, the server 301 may request the second electronic device 201 to transmit location information. According to an embodiment, based on receiving the location information request for the second electronic device 201 of the electronic device 101, the server 301 may request the location information from the second electronic device 201.

In operation 1411, the server 301 may receive the location information from the second electronic device 201. According to an embodiment, in response to the location information transmission request of the server 201, the second electronic device 201 may transmit the location information of the second electronic device 201 to the server 301.

In operation 1413, in response to the location information reception from the second electronic device 201, the server 301 may transmit the location information of the second electronic device 201 to the first electronic device 101.

According to various embodiments, after receiving information notifying that the second electronic device 201 is switched to the low power mode, the server 301 may transmit last location information before the second electronic device 201 enters the low power mode, rather than actually measured location information of the second electronic device 201, in obtaining an on demand location requested by the first electronic device 101 which is the companion device of the second electronic device 201.

According to an embodiment, if the second electronic device 201 is released from the low power mode (e.g., is switched to the normal mode), the server 301 may update the location of the second electronic device 201, and transmit geofence setting values corrected in the first electronic device 101 to the second electronic device 201.

Figure 15:
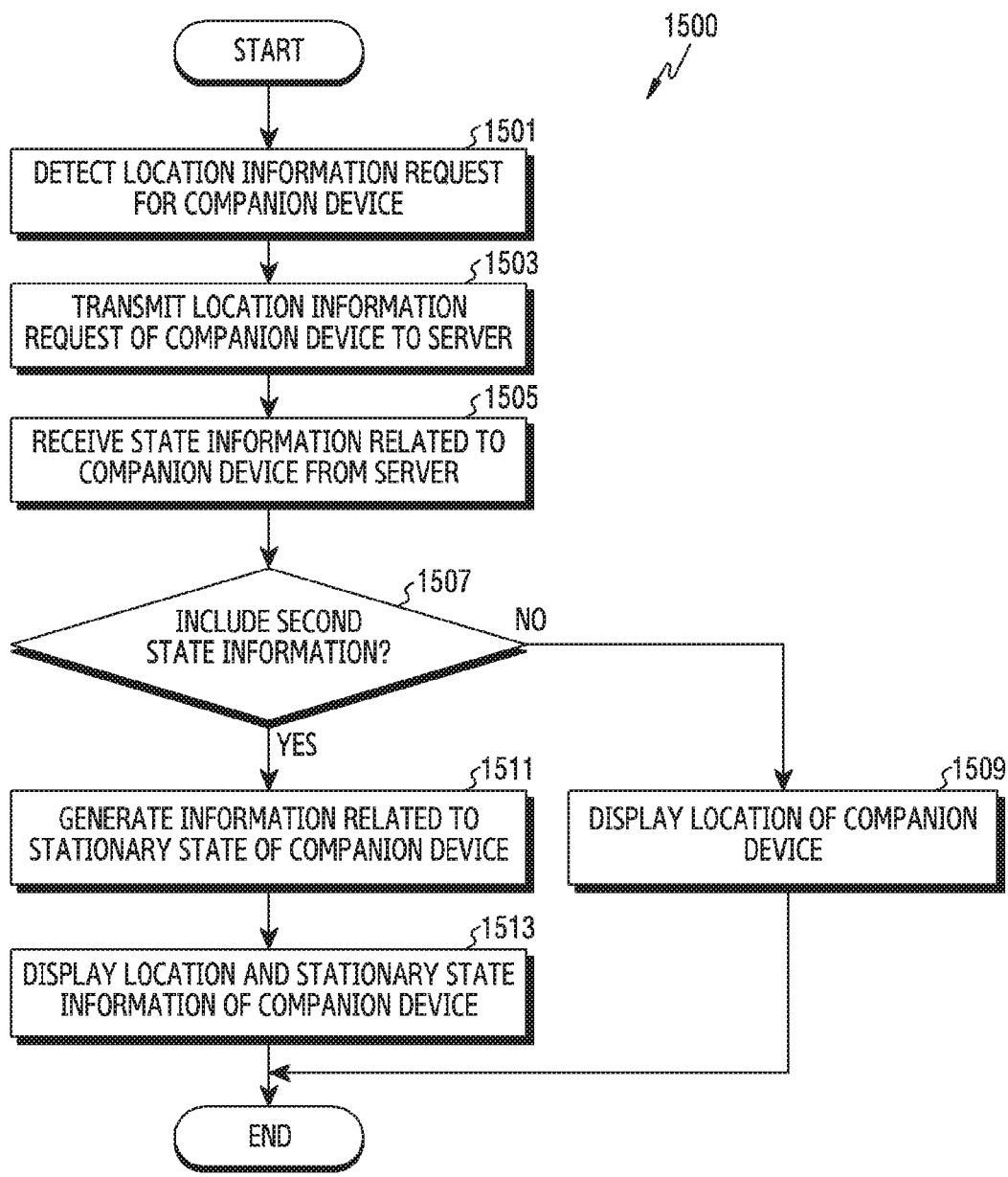
FIG. 15 is a flowchart illustrating an operating method of an electronic device according to various embodiments.
Figure 16:
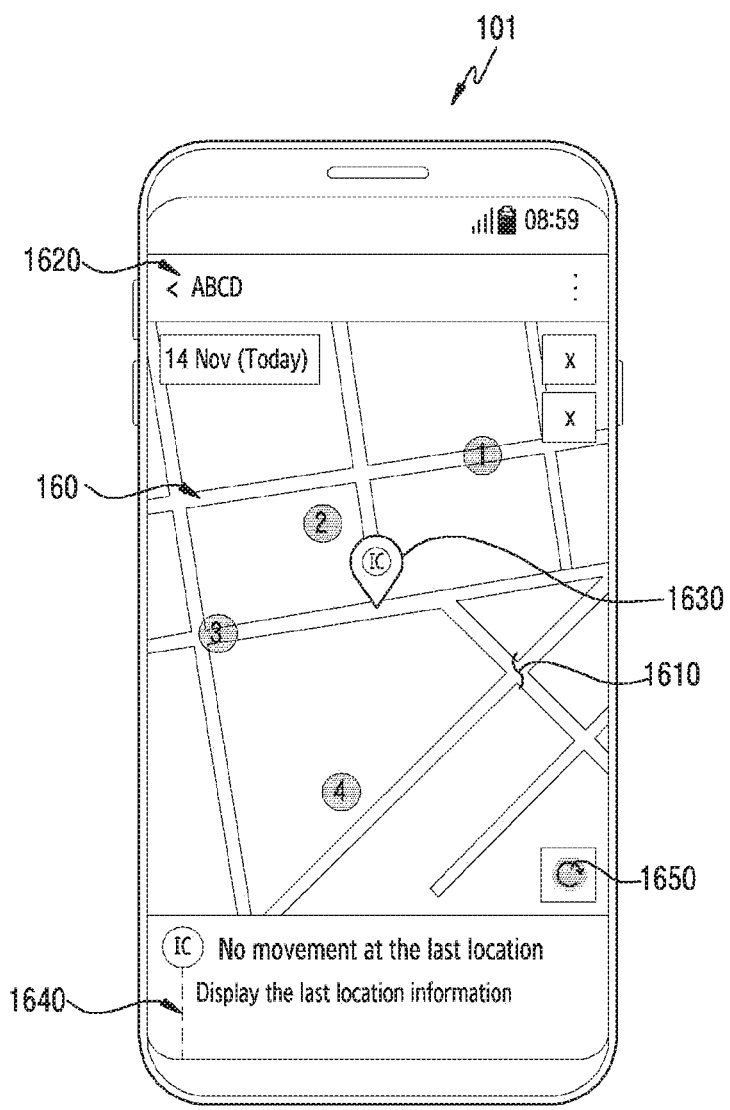
FIG. 16 is a diagram illustrating a screen example provided in relation to a geofence service in an electronic device according to various embodiments.

FIG. 15 is a flowchart 1500 illustrating an operating method of an electronic device 101 according to various embodiments. FIG. 16 is a diagram illustrating a screen example provided in relation to a geofence service in an electronic device 101 according to various embodiments.

In various embodiments, FIG. 15 may depict an example of an operation scenario in which, if the companion device (e.g., the second electronic device 201) is in the low power mode, the electronic device 101 provides location information related to the second electronic device 201 based on information provided from the geofence server 301.

Referring to FIG. 15, in operation 1501, the processor 120 of the electronic device 101 may detect a location information request for the companion device. According to an embodiment, the processor 120 may detect the location information request for the companion device (e.g., the second electronic device 201), based at least in part on a location information request by the user, related application (e.g., an application related to the geofence service, etc.) execution, or a cycle which is set in the related application. According to an embodiment, the processor 120 may determine as an interrupt for obtaining the location information of the second electronic device 201, based at least on receiving the location information request by the user for the companion device, detecting the execution of the relevant application, or automatically requesting from the relevant application on a periodic basis.

In operation 1503, in response to detecting the location information request, the processor 120 may transmit a location information request of the companion device to the geofence server 301.

In operation 1505, in response to the location information request for the second electronic device 201, the processor 102 may receive state information related to the second electronic device 201, from the geofence server 301.

In operation 1507, based on a result of identifying the received state information, the processor 120 may determine whether the state information includes first state information, or second state information. According to an embodiment, the processor 120 may determine whether the state information of the second electronic device 201 includes a setting value of the second state indicating that the second electronic device 201 is in the low power mode.

In operation 1507, if determining that the state information does not include the setting value according to the second state (NO in operation 1507), in operation 1509, the processor 120 may display a location of the companion device (e.g., the second electronic device 201) on the display device 160 of the electronic device (e.g., the first electronic device 101). According to an embodiment, the processor 120 may display and provide the user with a marker at the location corresponding to the location information of the companion device received from the geofence server 301 on an execution screen (e.g., a map screen) of an application related to the geofence service.

In operation 1507, if determining that the state information includes the setting value according to the second state (YES in operation 1507), in operation 1511, the processor 120 may generate information related to the stationary state of the companion device (e.g., the second electronic device 201).

In operation 1513, the processor 120 may display information related to the location and the stationary state of the companion device (e.g., the second electronic device 201) on the display device 160 of the electronic device (e.g., the first electronic device 101). According to an embodiment, the processor 120 may display and provide the user with a marker at the location corresponding to the location information of the companion device received from the geofence server 301 on the execution screen (e.g., the map screen) of the application related to the geofence service. Additionally, in response to the stationary information of the companion device, the processor 120 may display and provide the user with the stationary state information of the companion device based on at least one object. This example is shown in FIG. 16.

As shown in FIG. 16, FIG. 16 may depict an example of an execution screen of a geofence service application displayed on the display device 160 of the electronic device 101. According to an embodiment, FIG. 16 may depict an example in which information relating to the companion device is provided to the electronic device 101 through a set UI, with the companion device (e.g., the second electronic device 201) of the electronic device 101 in the low power mode.

Referring to FIG. 16, the UI for the geofence service may include one or more regions for providing a map 1610, companion device information 1620 (e.g., a name (e.g., ABCD)), guide information 1640 for the companion device, and so on. According to an embodiment, a marker 1630 indicating the location of the companion device may be displayed at a location corresponding to the location information of the companion device on the map 1610.

According to an embodiment, the UI for the geofence service may include an object 1650 (e.g., an icon, a software button, etc.) for requesting (or updating) the location of the companion device in an area (e.g., right bottom, left bottom, etc.) on the screen in an overlay manner. According to an embodiment, in response to the selection of the object 1650, the electronic device 101 may request the location information of the companion device (e.g., the second electronic device 201) from the geofence server 301. In response to the location information request, the electronic device 101 may provide the location and/or related information of the companion device based at least on information received from the geofence 301.

According to an embodiment, if the companion device (e.g., the second electronic device 201) is in the low power mode, the electronic device 101 may obtain at least part of the location information of the companion device, the stationary information of the companion device, or the geofence information of the companion device from the geofence server 301.

According to an embodiment, the electronic device 101 may displays the marker 1630 at the location corresponding to the location information of the companion device, and in response to the stationary information of the companion device, display information 1640 related to the stationary state of the companion device. The stationary state information 1640 of the companion device may be provided through, for example, the set area or, additionally or alternatively, through a popup window (not shown). The stationary state information 1640 may guide, for example, no movement of the companion device detected, and the final (last) location before the low power mode entry of the companion device. Additionally or alternatively, the stationary state information 1640 may further include information notifying the latest location information immediately upon the movement detection of the companion device.

Figure 17A:
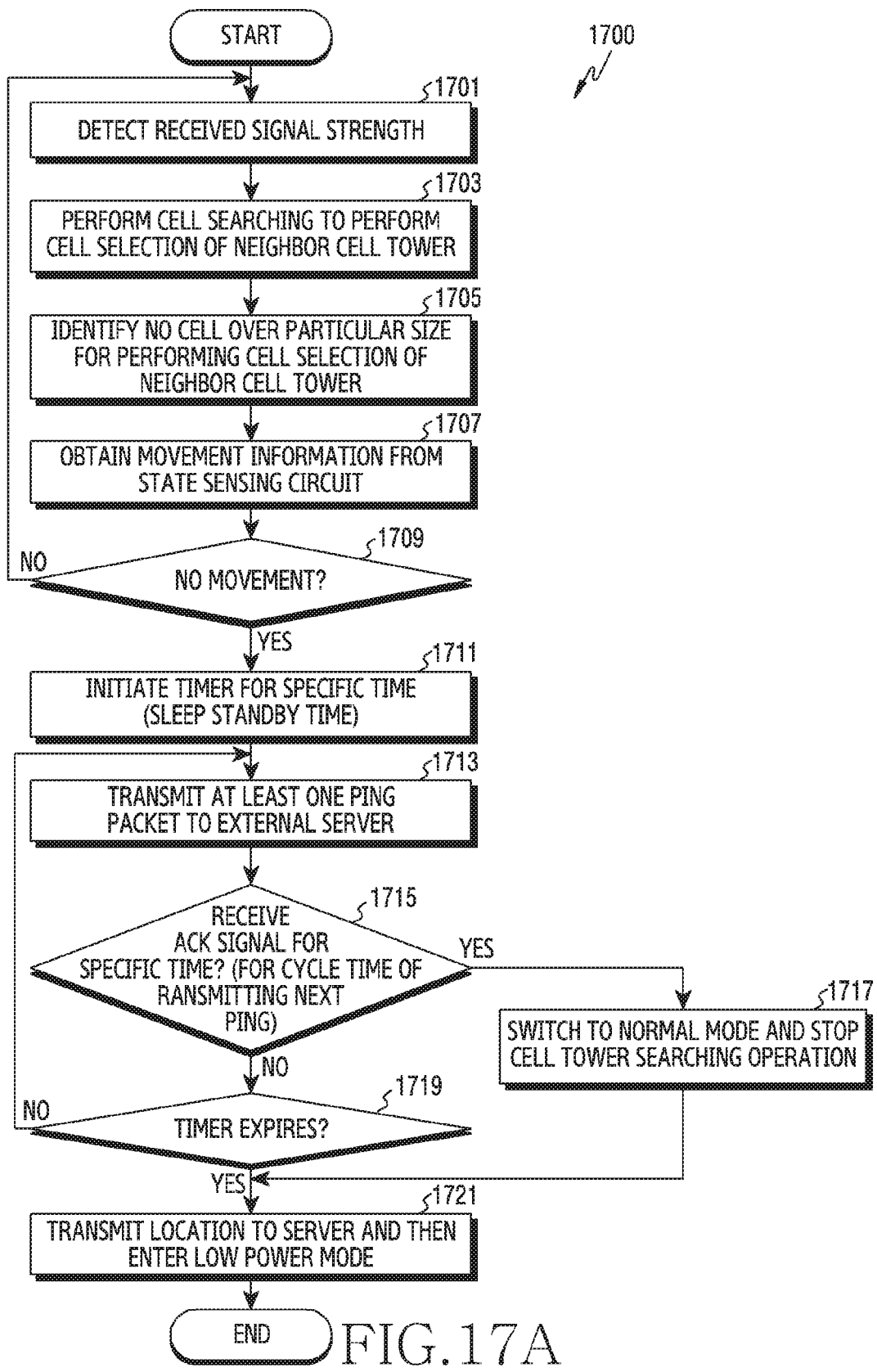
FIG. 17A and FIG. 17B are flowcharts illustrating an operating method of an electronic device according to various embodiments.

FIG. 17A is flowchart 1700 illustrating an operating method of an electronic device 201 according to various embodiments.

FIG. 17A may, according to various embodiments, operate a first timer of the electronic device 201, transmit ping (or a ping packet), stand by (e.g., a second timer) for a specific time to receive a response (e.g., ACK), and then retransmit ping. FIG. 17A may depict an operation example of a scenario in which the electronic device 201 switches to the normal mode if receiving the response (ACK) for once before the first timer expires.

Referring to FIG. 17A, in operation 1701, the processor 271 (e.g. the communication processor) of the electronic device 201 may detect that a received signal from the LPWAN falls below a particular strength. According to an embodiment, the processor 271 may monitor the received signal with respect to at least one of data or a control signal transmitted from a current serving cell of an NB-IoT network, and determine whether the received signal falls below the particular strength based on a monitoring result.

In operation 1703, the processor 271 may perform cell searching to perform cell selection of a neighbor cell tower (or a cell site).

In operation 1705, the processor 271 may determine a cell over a particular size for performing the cell selection of the neighbor cell tower based on a cell searching result. FIG. 17 may give an example where there is no cell over the particular size for performing the cell selection. Thus, the processor 271 may identify that there is no cell for performing the cell selection of the neighbor cell tower as the result of the cell searching.

In operation 1707, the processor 271 may obtain movement information from the state sensing circuit 240.

In operation 1709, the processor 271 may determine whether there is movement of the electronic device 201, based on the obtained movement information.

In operation 1709, if there is the movement of the electronic device 201 (NO of operation 1709), the processor 271 may proceed to operation 1701, to process operation following operation 1701.

In operation 1709, if there is no movement of the electronic device 201 (YES of operation 1709), the processor 271 may initiate a timer for a specific time (e.g., a sleep time).

In operation 1713, the processor 271 may periodically transmit at least one ping packet to an external server (e.g., a server address (e.g., a uniform resource locator (URL) address or an Internet protocol (IP) address)) during the timer time.

In operation 1715, the processor 271 may determine whether an ACK signal is received for a specific time. According to an embodiment, the specific time may be a cycle time for transmitting a next ping packet.

In operation 1715, if the ACK signal is received during the specific time (YES of operation 1715), in operation 1717, the processor 271 may switch to the normal mode and stop the cell tower searching operation.

In operation 1715, if the ACK signal is not received during the specific time (NO of operation 1715), in operation 1719, the processor 271 may determine whether the timer expires.

In operation 1719, if not determining that the timer expires (NO of operation 1719), the processor 271 may proceed to operation 1713 and process to perform operation following operation 1713.

In operation 1719, if determining that the timer expires (YES of operation 1719), in operation 1721, the processor 271 may transmit a current location of the electronic device 201 to the server and enter the low power mode.

Figure 17B:
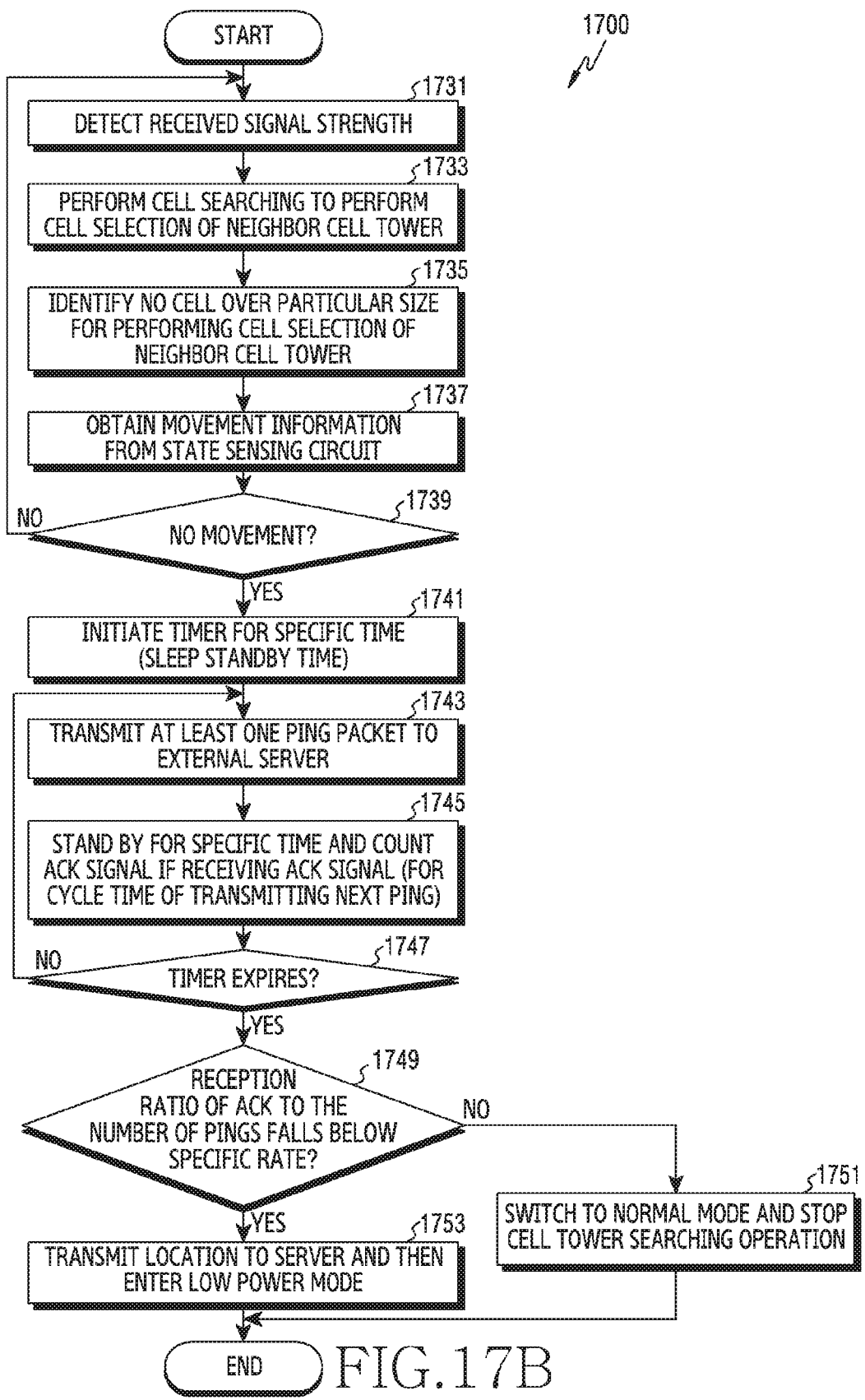

FIG. 17B is flowchart 1700 illustrating an operating method of the electronic device 201 according to various embodiments.

FIG. 17B may, according to various embodiments, operate the first timer of the electronic device 201, transmit the ping (or the ping packet), stand by (e.g., the second timer) for the specific time to receive a response (e.g., ACK), and then retransmit the ping, as in FIG. 17A. Additionally or alternatively, FIG. 17B may depict an operation example of a scenario of switching to the normal mode or the low power mode by comparing the transmitted ping with the received response (ACK) if the first timer expires, rather than terminating even if receiving the response (ACK).

Referring to FIG. 17B, operation 1731 through operation 1741 of FIG. 17B may be operations corresponding to operation 1701 to operation 1711 of FIG. 17A, as mentioned in the descriptions in reference to FIG. 17A, and detailed explanations on operation 1731 through operation 1741 are omitted in FIG. 17B.

In operation 1743, the processor 271 may transmit at least one ping packet to the external server (e.g., the server address (e.g., the URL address or the IP address)), and count a ping signal.

In operation 1745, the processor 271 may stand by for a specific time, and if receiving an ACK signal during a specific time, may count the ACK signal. According to an embodiment, the specific time may be a cycle time for transmitting a next ping packet.

In the operation 1747, the processor 271 may determine whether the timer expires.

In the operation 1747, if not determining that the timer expires (NO of operation 1747), the processor 271 may proceed to operation 1743 and process to perform operation following operation 1743.

In operation 1747, if determining that the timer expires (YES of operation 1747), in operation 1749, the processor 271 may identify a response (e.g., an ACK packet) received in response to the transmitted ping packet. According to an embodiment, the electronic device 271 may transmit a transmission control protocol (TCP)/IP packet, receive an ACK signal, and thus examine the state of the current cell tower by receiving a downlink signal of actual data. According to various embodiments, the response may be identified by receiving one ACK as shown in the example of FIG. 17A, may be identified by receiving a plurality of ACKs as shown in the example of FIG. 17B. In FIG. 17B, if comparing the plurality of the pings with the number of ACKs and exceeding a specific rate according to the reception rate, the current cell may be determined as the normal state and thus the switch of the low power mode may be stopped and the neighbor cell tower search may be stopped.

In operation 1749, if determining the state of response and determining that the reception ratio of the response to the number of the ping packets is not below a specific rate (NO of operation 1749), in operation 1751, the processor 271 may switch to the normal mode and stop the cell tower searching operation.

In operation 1749, if determining the state of the response and determining that the reception ratio of the response to the number of the ping packets falls below the specific rate (YES of operation 1749), in operation 1753, the processor 271 may transmit the current location of the electronic device 201 to the server and enter the low power mode.

According to various embodiments, as shown in FIG. 17A and FIG. 17B, if the strength of the receive signal of the cell tower currently serving falls below a threshold, the electronic device 201 using the NB-IoT network may perform the cell reselection operation. The cell reselection operation may be an operation which searches neighbor cells, selects a cell tower of a dominant received signal strength from the searched cells, and thus changes the serving cell.

According to an embodiment, the cell reselection operation may generally occur near a boundary of coverage of the cell tower, in an idle state having no communication of the electronic device 201. However, since the coverage of the cell tower is small according to characteristics of the NB-IoT network, the cell reselection operation may occur more frequently. In addition, a situation where power consumption abruptly arises may occur because the electronic device 201 does not select the cell without discovering the dominant cell and performs the search repeatedly.

According to an embodiment, the electronic device 201, which is a low-power device, may need to avoid the abrupt power consumption. If the cell tower is not searched (once) and the electronic device 201 does not move, the state of the cell towers does not change, and accordingly, if there is no movement, it may be advantageous for the electronic device 201 to enter the low power state of turning off the RF circuit 273. Hence, if entering a corresponding situation as stated above and determining no movement during a specific time (e.g., 5 minutes, 7 minutes, or 10 minutes), the electronic device 201 turns off the RF circuit 273 and switches to the low power state.

According to various embodiments, in that the current RX signal strength is small, a surrounding communication channel environment may abruptly change and the signal may temporarily get small. Hence, if identifying the RX signal while determining whether there is movement for the specific time and normally obtaining the RX signal, the electronic device 201 may stop switching to the low power and may not perform the cell search operation.

Figure 18:
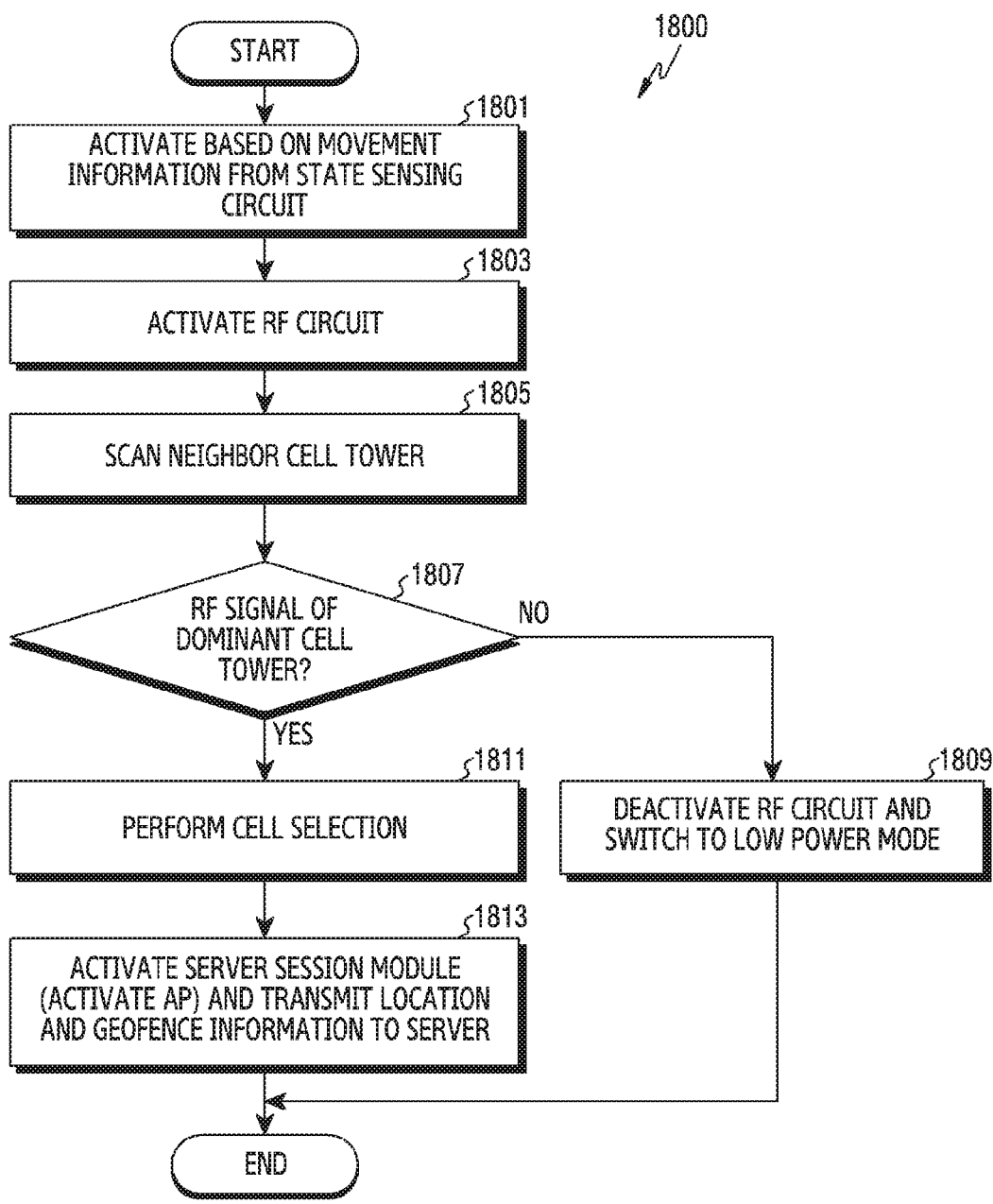
FIG. 18 is a flowchart illustrating an operating method of an electronic device according to various embodiments.

FIG. 18 is a flowchart 1800 illustrating an operating method of an electronic device 201 according to various embodiments.

FIG. 18 may depict an example of an operation scenario in which the electronic device 201 determines, based on movement information, that it moved from an area of previous cell towers to other cell tower area, and thus releases the low power mode by re-searching a neighbor cell tower.

Referring to FIG. 18, in operation 1801, the processor 271 (e.g., the communication processor) of the electronic device 201 may be activated based on the movement information from the state sensing circuit 240. According to an embodiment, the application processor 210 may be activated based on the movement information from the state sensing circuit 240, and the processor 271 (e.g., the communication processor) may be activated by the application processor 210. According to an embodiment, the processor 271 may be directly connected to the state sensing circuit 240, and directly activate based on the movement information from the state sensing circuit 240.

In operation 1803, the processor 271 may activate the RF circuit 273 based on the activation.

In operation 1805, the processor 271 may perform a neighbor cell tower scan operation.

In operation 1807, the processor 271 may determine whether there is an RX signal of a dominant cell tower.

In operation 1807, if determining no dominant RX signal (NO of operation 1807), in operation 1809, the processor 271 may process to deactivate the RF circuit 273 and switch to the low power mode.

In operation 1807, if determining the dominant RX signal (YES of operation 1807), in operation 1811, the processor 271 may perform the cell selection operation.

In operation 1813, the processor 271 may activate the server session module by activating the application processor 210, and transmit location information of the electronic device 201 and geofence information to the server. For example, the application processor 210 may resume the session process operation with the server over the LPWAN, and transmit the location information of the electronic device 201 and the geofence information to the server through the RF circuit 273, based on session establishment with the server.

Figure 19:
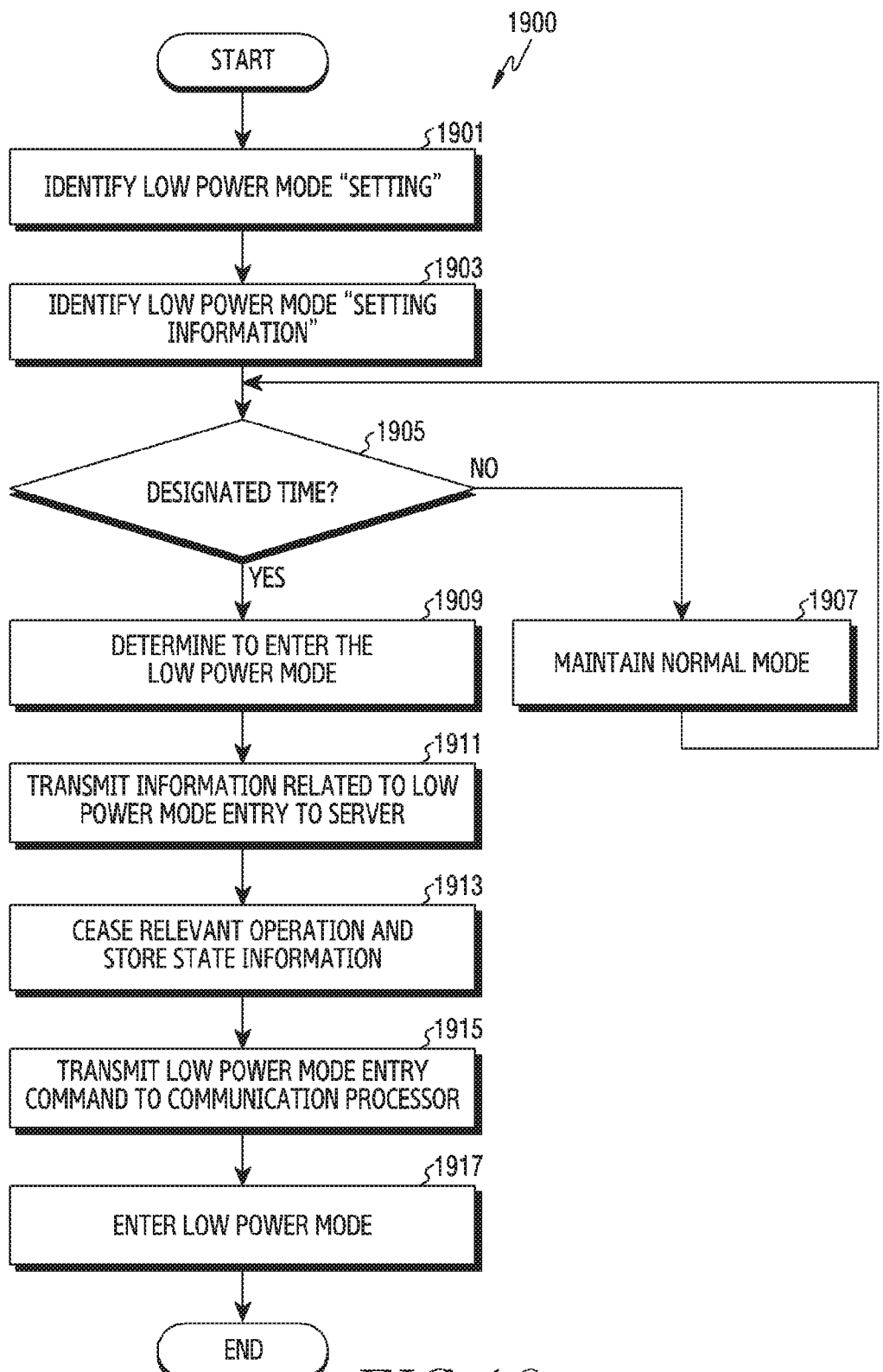
FIG. 19 is a flowchart illustrating an operating method of an electronic device according to various embodiments.

FIG. 19 is a flowchart 1900 illustrating an operating method of an electronic device 201 according to various embodiments.

In various embodiments, FIG. 19 may depict an example of an operation scenario in which the electronic device 201 enters from the normal mode to the low power mode according to setting information of the designated low power mode (or the sleep mode).

The electronic device 201 may be configured to maintain the low power mode or the sleep mode for a set time. For the set time in the low power mode, for example, the processor 210 (e.g., the application processor) may stop operations of at least some elements (e.g., application (or software) and/or hardware) of the electronic device 201 to operate in the low power mode. In the low power mode, for example, the processor 210 and/or the communication processor (e.g., the communication processor 271 of FIG. 2A) may be stopped in operation or powered off for a set time, the low power mode is maintained, and only a controller (e.g., the controller 250 of FIG. 2A) may operate unless a designated situation occurs. The off state of no power supply to the electronic device 201 except for designated elements such as the controller 250 and sensors (e.g., the sensor 260 of FIG. 2A) may be maintained for the time set in the low power mode. The low power mode setting and input or selection of the setting information may be set directly at the electronic device 201 or at an external electronic device (e.g., the electronic device 101 of FIG. 1), and related setting information may be received from the electronic device 201 via a server (e.g., the geofence server 301) and stored and set in a memory (e.g., the memory 220 of FIG. 2A). According to an embodiment, although the low power mode is set, if detailed setting information is not inputted or selected, the designated setting information may be applied.

Referring to FIG. 19, in operation 1901, the processor 210 (e.g., the application processor) of the electronic device 201 may identify whether the electronic device 201 is set to the low power mode.

In operation 1903, based on identifying the low power mode, the processor 210 may identify low power mode setting information of the electronic device 201. The low power mode setting information may include setting information such as a date, a day and/or a time of the low power mode setting and whether it is repeated, and accordingly the processor 210 may identify a time for starting the low power mode.

In operation 1905, the processor 210 may identify the start time of the low power mode or a designated time if necessary for entering the low power mode before the start time of the low power mode. For example, if the low power mode is set to start from 10 PM on a particular day, it may be designated to enter from the normal mode to the low power mode at 9:50 PM 10 minutes earlier. The time for starting to enter the low power mode may be pre-designated or changed.

In operation 1905, before the time for starting the entry to the low power mode (NO of operation 1905), the processor 210 may maintain the normal mode in operation 1907.

In operation 1905, if determining the time for starting the entry to the low power mode (YES of operation 1905), the processor 210 may determine the low power mode entry of the electronic device 201 in operation 1909.

In operation 1911, the processor 210 may transmit information related to the low power mode entry to a server (e.g., the geofence server 301). The processor 210 may transmit a message including the low power mode entry information to the server 301 using a communication module (e.g., the communication circuit 270 of FIG. 2A). The message may include information of a geographical area where the electronic device 201 is located.

In operation 1913, the processor 210 may cease at least some operation based on the low power mode entry of the electronic device 201, and store state information related to a current status of the electronic device 201. According to an embodiment, the processor 210 may cease operations of at least some elements (e.g., an application (or software) and/or hardware) of the electronic device 201 to operate in the low power mode. According to an embodiment, the processor 210 may pause the positioning operation of the processor 210, the operation for determining whether to enter/exit the geofence, and/or the session process operation with the server, and store the status that the state of the electronic device 201 is the low power mode state. According to an embodiment, the processor 210 may store location information related to a current location (e.g., the final location) of the electronic device 201 and/or geofence information related to whether to enter/exit the geofence.

In operation 1915, the processor 210 may transmit a low power mode entry command to the communication processor 271. According to an embodiment, in response to the low power mode entry command of the processor 210, the communication processor 271 may control to turn off the RF circuit 273, and enter the low power mode.

In operation 1917, the electronic device 201 (or the processor 210) may enter the low power mode. The processor 210 and/or the communication processor 271 in the low power mode may turn off and then switch to the sleep state.

Figure 20:
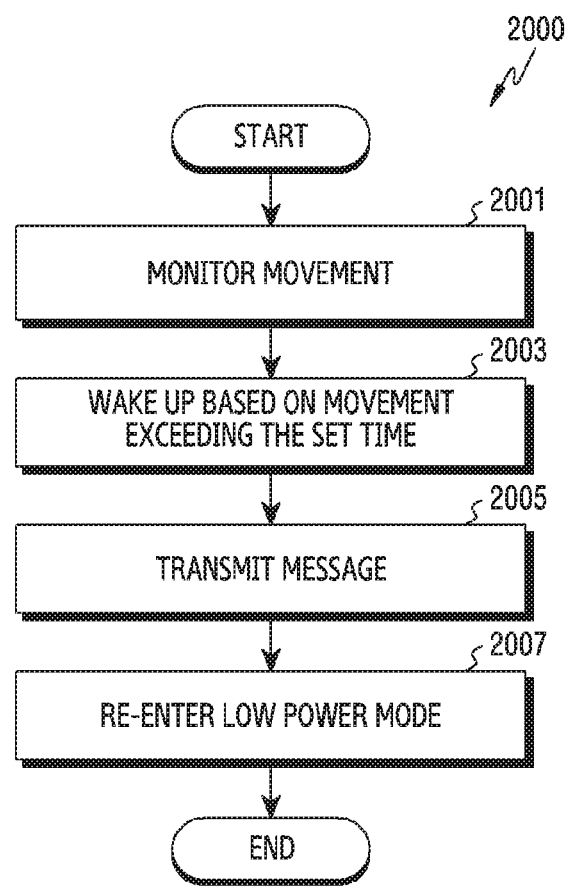
FIG. 20 is a flowchart illustrating an operating method of an electronic device according to various embodiments.

FIG. 20 is a flowchart 2000 illustrating an operating method of an electronic device 201 according to various embodiments. In various embodiments, FIG. 20 may depict an example of a scenario in which the electronic device 201 stays in the low power mode for a set time, performs a designated operation if a designated event occurs, and returns to and maintains the low power mode.

Referring to FIG. 20, in operation 2001, the state sensing circuit 240 (e.g., the controller 250) may monitor movement of the electronic device 201 under the low power mode. According to an embodiment, the state sensing circuit 240 may monitor the movement of the electronic device 201.

In operation 2003, while the electronic device 201 is in the set low power mode, the state sensing circuit 240 may wake up the processor 210 based on movement exceeding a set time according to the monitoring result. Herein, the movement exceeding the set time according to the monitoring result is an example, and the condition for waking up the processor 210 may include, for example, battery exhausted state occurrence, location positioning request from the user, or designated environmental situation occurrence such as vibration.

According to various embodiments, the state sensing circuit 240 may provide at least one signal to the processor 210 to wake up the processor 210 from the low power mode. According to an embodiment, the processor 210 in the low power mode may wake up based on the at least one signal (e.g., sensor information) of the state sensing circuit 240.

According to an embodiment, the state sensing circuit 240 in the low power mode may determine the short movement state (e.g., see 720 of FIG. 7), and may determine the long movement state (e.g., see 740 of FIG. 7) according to an input value over a specific time in the short movement state.

In operation 2005, if necessary, the processor 210 in the wake-up state may wake up the communication circuit 270, and transmit a message information for updating the location of the electronic device 201 to a geofence server based on the communication circuit 270.

In operation 2007, the processor 210 may transmit the message and then re-enter the low power mode. According to an embodiment, the processor 210 may process the low power mode (or the power save mode) entry with respect to at least part of the communication circuit 270, and then enter the low power mode.

Figure 21:
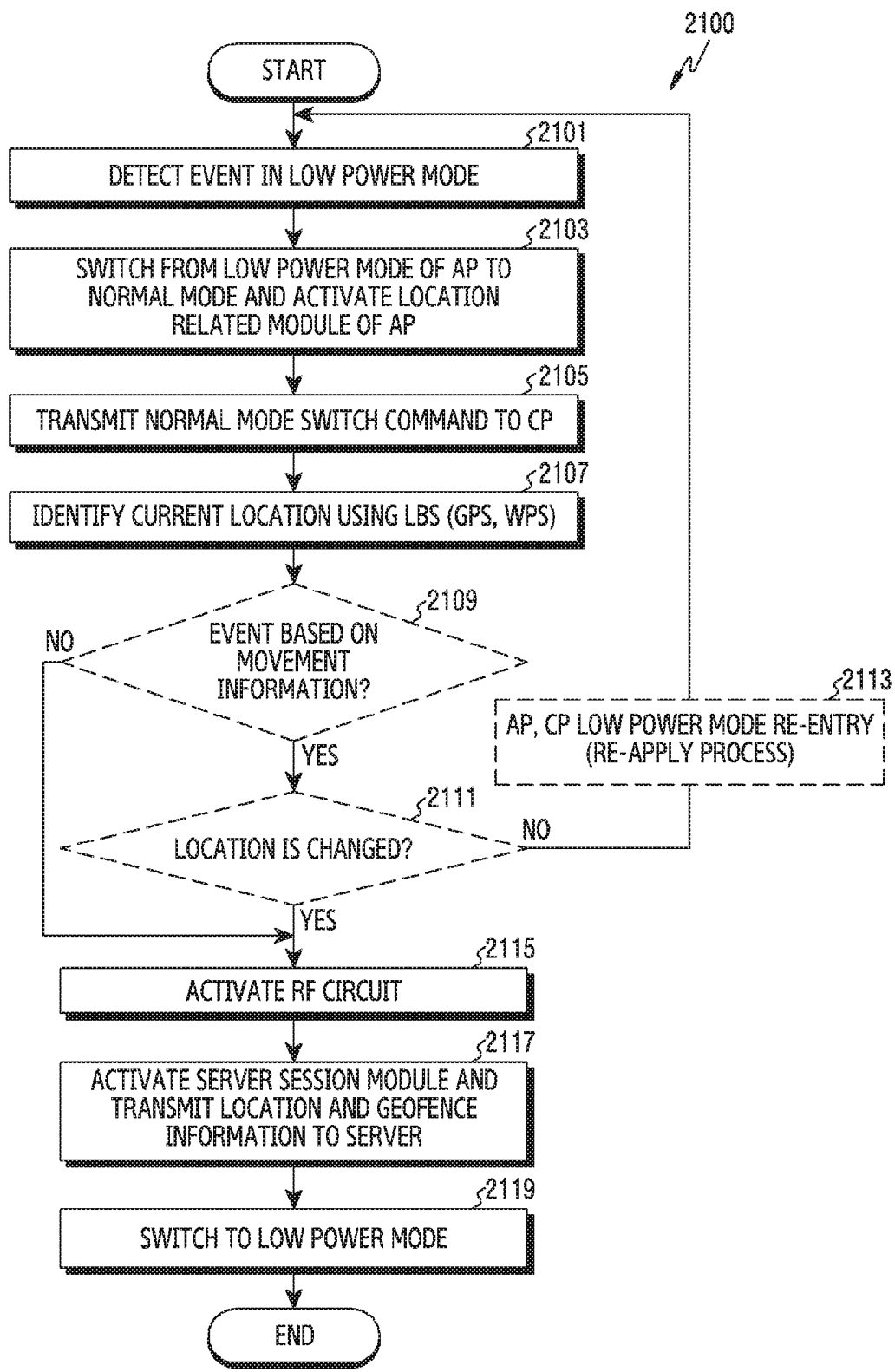
FIG. 21 is a flowchart illustrating an operating method of an electronic device according to various embodiments.

FIG. 21 is a flowchart 2100 illustrating an operating method of an electronic device 201 according to various embodiments. In various embodiments, FIG. 21 may depict an example of operations in which the electronic device 201 stays in the low power mode for a set time, performs a designated operation if a designated event occurs, and returns to and maintains the low power mode.

Referring to FIG. 21, in operation 2101, for example, no power may be supplied to the processor 210 (e.g., the AP) of the electronic device 201 in the set low power mode. According to an embodiment, the state sensing circuit 240 or the controller 250 (e.g., the sensor hub, the MPU, etc.) may receive at least one event of detecting movement information or moisture evasion information, receiving discharge warning information from the power management module 620, receiving the power from outside to charge the power management module 620, or receiving a button input. According to an embodiment, if the electronic device 201 operates in the low power mode, the state sensing circuit 240 (or the controller 250) may notify the event detection to the power management module 620 and/or the processor 210 based on the sensor value, and make the power management module 620 supply the power to the processor 210. The processor 210 may wake up based on the at least one event.

In operation 2103, the processor 210 may switch from the low power mode to the normal mode, and activate a location related module (e.g., the positioning circuit 280) of the processor 210. According to an embodiment, the processor 210 may wake up, in response to receiving the event from the controller 250.

In operation 2105, the processor 210 may transmit a normal mode switch command to the CP 271. For example, the processor 210 may request the communication processor 271 to wake up.

In operation 2107, the processor 210 may identify a current location of the electronic device 201 using the LBS (e.g., GPS, WPS, Cellular, etc.).

In operation 2109, the processor 210 may determine whether the received event is an event based on the movement information. For example, the processor 210 may determine whether the event received in operation 2101 corresponds to the movement information received from the state sensing circuit 240 (e.g., the controller 250 (e.g., the sensor hub, the MPU, etc.)).

In operation 2109, if it is not the event based on the movement information (NO of operation 2109), the processor 210 may process to operation 2115 and perform operation following operation 2115.

In operation 2109, if it is the event based on the movement information (YES of operation 2109), the processor 210 may determine whether the location of the electronic device 201 is changed, in operation 2111.

In operation 2111, in response to no change in the location of the electronic device 201 (NO of operation 2111), the processor 210 may process the processor 210 and the communication processor 271 to re-enter the low power mode, in operation 2113. For example, the processor 210 may re-perform the low power mode or the process for re-entering the low power mode, and proceed to operation 2101 to perform operation following operation 2101. In various embodiments, operation 2109, operation 2111 and operation 2113 are the operations executable additionally or alternatively, and the processor 210 may perform operation 2115 immediately after operation 2107.

In operation 2109 or operation 2111, in response to receiving the event (YES of operation 2109), or in response to identifying the change in the location of the electronic device 201 (YES of operation 2111), in operation 2115, the processor 210 may process to activate the RF circuit 273. For example, the processor 210 may process to turn on the RF circuit 273 by the communications processor 271.

In operation 2117, the processor 210 may activate a server session module, and transmit location information of the electronic device 201 and geofence information to a server (e.g., the geofence server 301), through the communication circuit 270. For example, the processor 210 may resume the session process operation with the server over the LPWAN, and transmit the location information of the electronic device 201 and the geofence information to the server through the RF circuit 273, based on session establishment with the server.

In operation 2119, the processor 210 may switch to the low power mode. For example, the processor 210 may transmit the location information and the geofence information and then re-enter the low power mode. According to an embodiment, the processor 210 may process the low power mode (or the power save mode) entry with respect to at least part of the communication circuit 270, and then enter the low power mode.

Figure 22:
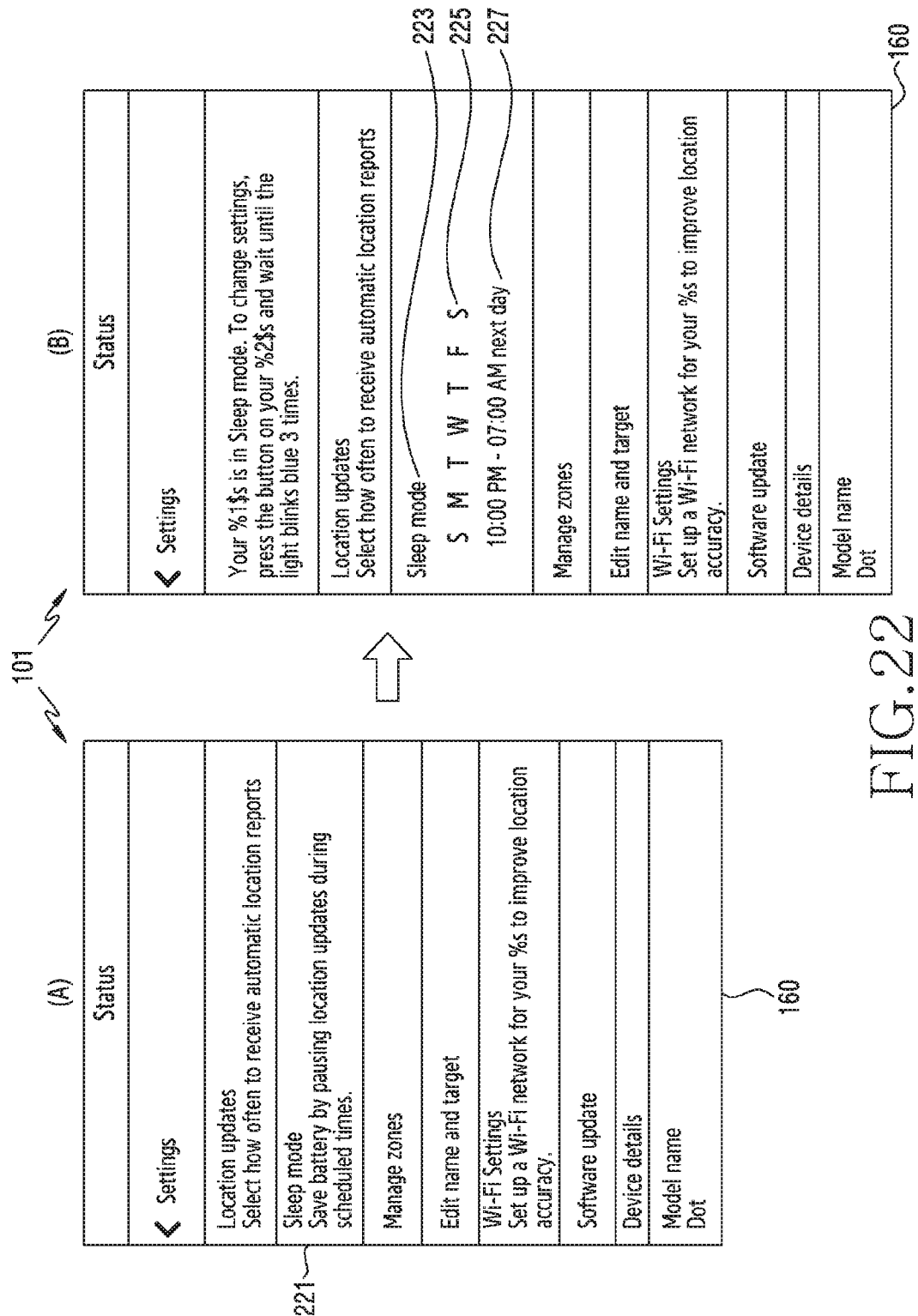
FIG. 22 and FIG. 23 are diagrams illustrating an example of setting a low power mode in an electronic device according to various embodiments.
Figure 23:
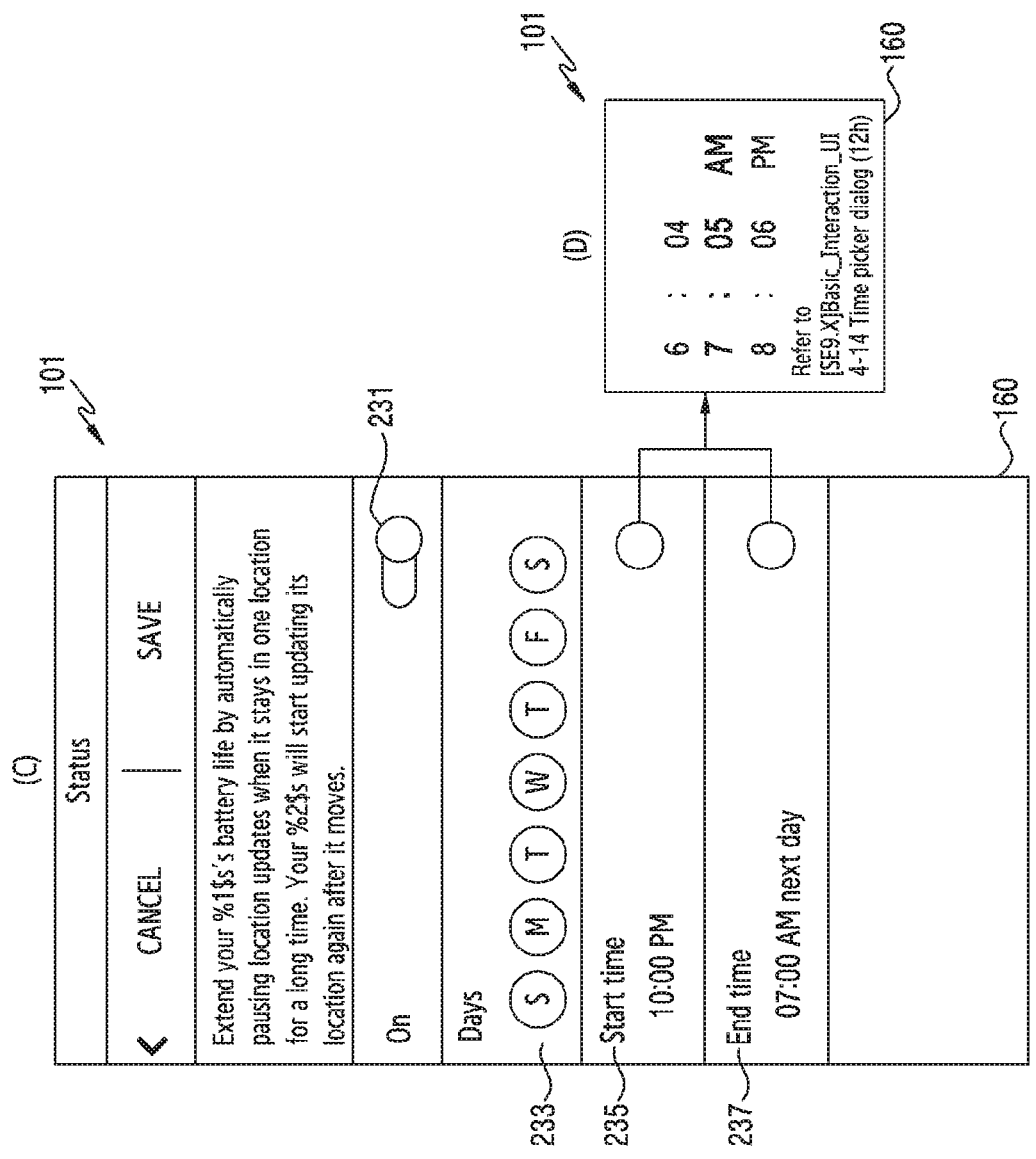

FIG. 22 and FIG. 23 are diagrams illustrating an example of setting a low power mode in an electronic device according to various embodiments. FIG. 22 and FIG. 23 may depict an example of providing a low power mode setting menu related to a companion device through a UI to the electronic device 101, to set the low power mode for the companion device (e.g., the second electronic device 201) of the electronic device 201. The low power mode setting information described in FIG. 22 and FIG. 23 may be transmitted from the companion device (e.g., the second electronic device 201) via a server (e.g., the geofence server 301).

Referring to FIG. 22, a processor (e.g., the processor 210 of FIG. 1) of the electronic device 101 may display a sleep mode setting menu 221 in an item of a settings screen A of a display (e.g., the display 160 of FIG. 1). If, for example, touching and selecting the sleep mode setting menu 221 in the settings screen A, the processor 120 may switch to and display a sleep mode setting menu B on the display. The sleep mode setting menu B may display sleep mode setting information 223. The sleep mode setting information may include the sleep mode setting information, for example, a sleep mode setting day 225, and start time and end time 227.

Referring to FIG. 23, for example, if the sleep mode setting menu 221 or 223 is selected in the sleep mode settings screen A or B of FIG. 22, the processor 120 of the electronic device 101 may display a details menu screen C for the sleep mode setting on the display 160. The sleep mode setting details menu screen C may include, for example, a sleep mode setting on/off details menu 231, a day selection details menu 233, a start time selection details menu 235 and an end time selection details menu 237. If selecting the corresponding details menu 235 or 237, the start time and the end time may display a popup window D to select and set hour and minutes in, for example, a dial manner.

FIG. 24 through FIG. 29 are diagrams illustrating a screen example provided in relation to a geofence service in an electronic device according to various embodiments.

Figure 24:
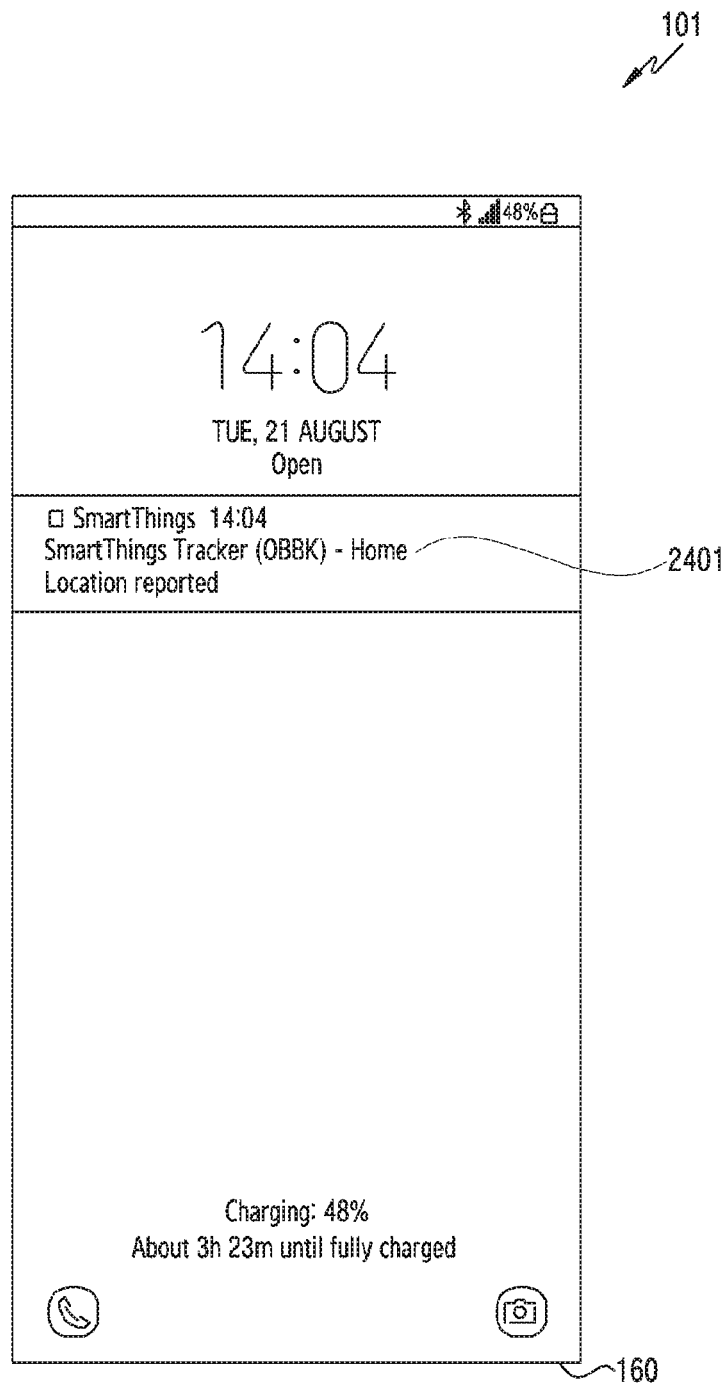
FIG. 24 through FIG. 31 are diagrams illustrating a screen example provided in relation to a geofence service in an electronic device according to various embodiments.
Figure 25:
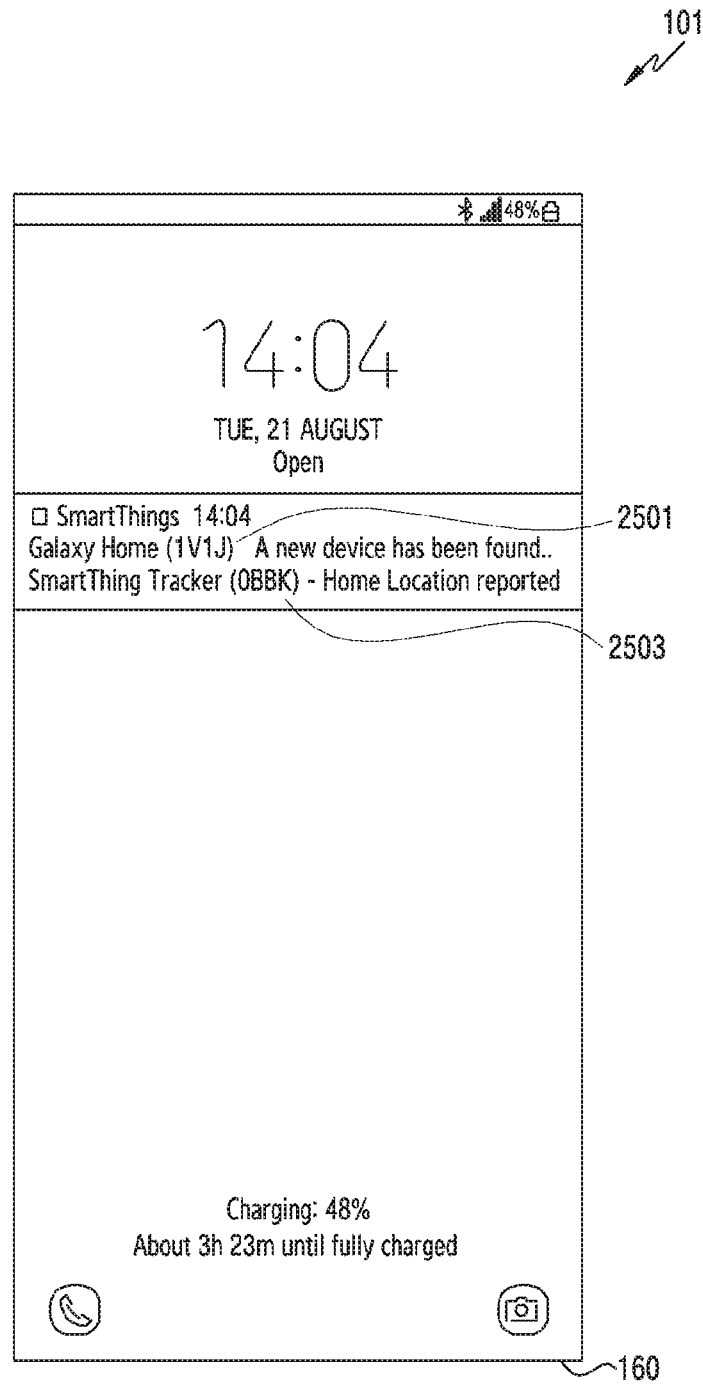

FIG. 24 and FIG. 25 depict an example for providing location information of a companion device (e.g., the second electronic device 201) on the display device 160 of the electronic device 101. Referring to FIG. 24, if receiving a report of the location information of the companion device according to the above-mentioned positioning based technology (e.g., the geofence) service, the electronic device 101 may display, for example, a notification 2401 including information for identifying the corresponding companion device, the location, and a report time on a lock screen. Referring to FIG. 25, if receiving two or more notifications 2501 and 2503, it may display the corresponding notifications at a geofence service notification item in reception order or in reverse order.

Figure 26:
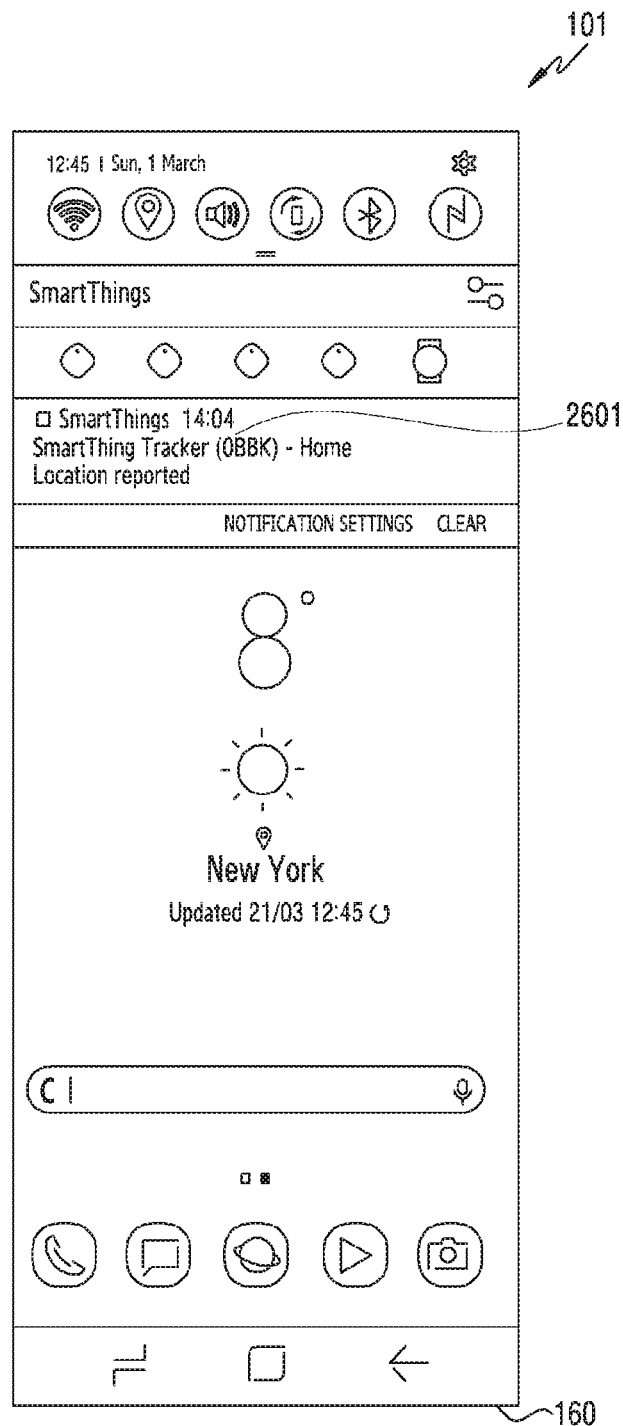
Figure 27:
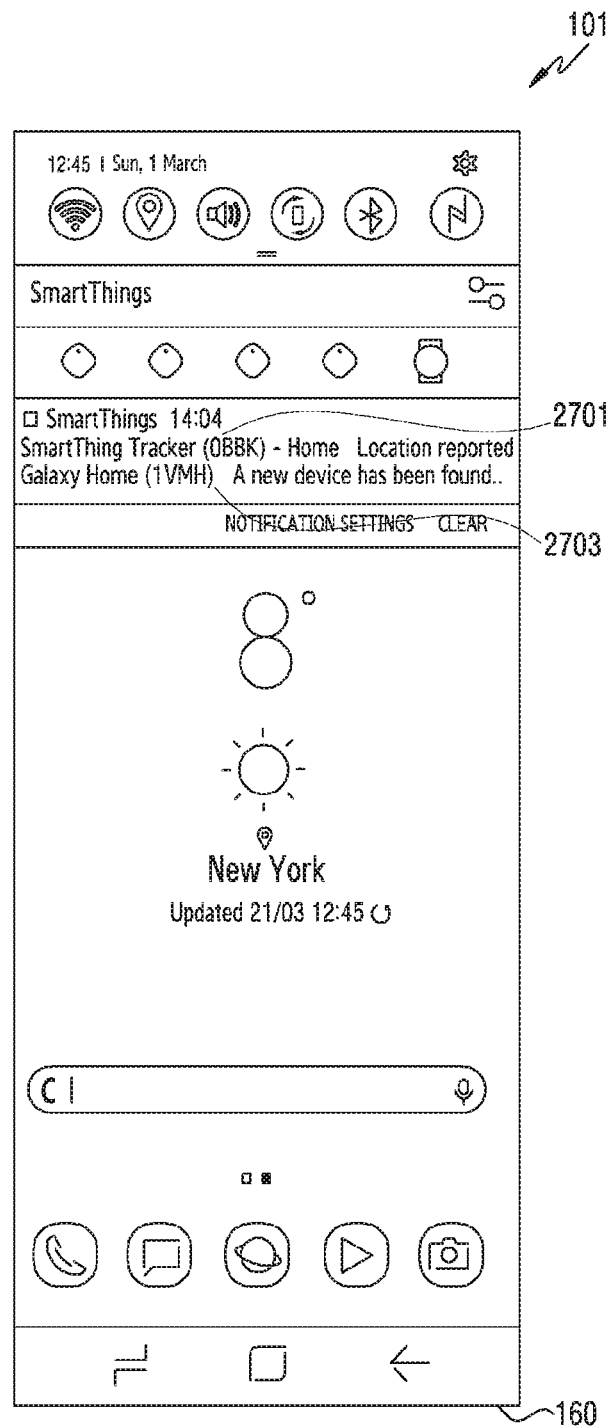

FIG. 26 and FIG. 27 depict another example for providing location information of a companion device (e.g., the second electronic device 201) on the display device 160 of the electronic device 101. Referring to FIG. 26, if receiving a report of the location information of the companion device according to the geofence service, for example, if the electronic device 101 is operating, the electronic device 101 may display a notification 2601 including information for identifying the corresponding companion device, the location, and a report time on a pulldown menu or a quick view screen identified according to a touch input (e.g., a swipe operation or a drag operation) from a screen top toward the bottom on a main screen. Referring to FIG. 27, if receiving two or more notifications 2701 and 2703 of the location information of the companion device according to the geofence service, the electronic device 101 may display the corresponding notifications at a geofence service notification item in reception order or in reverse order.

Figure 28:
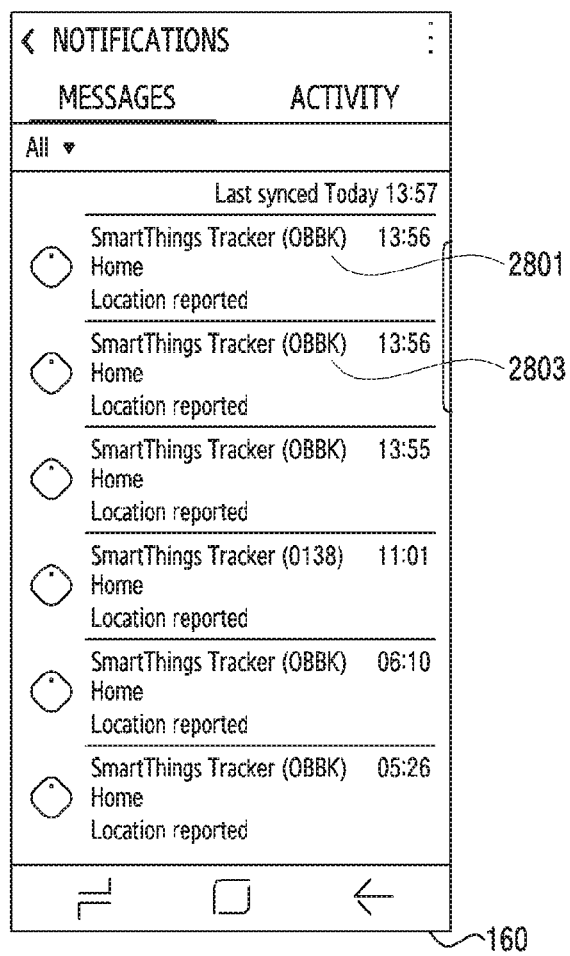

FIG. 28 displays a notification check menu provided from an application (e.g., a geofence application) for providing a geofence service according to various embodiments. If a notification received according to the geofence service disappears from a pull-down menu or a quick view menu in the electronic device 101, the received notifications may be identified by selecting the notification check menu on the geofence application.

Figure 29:
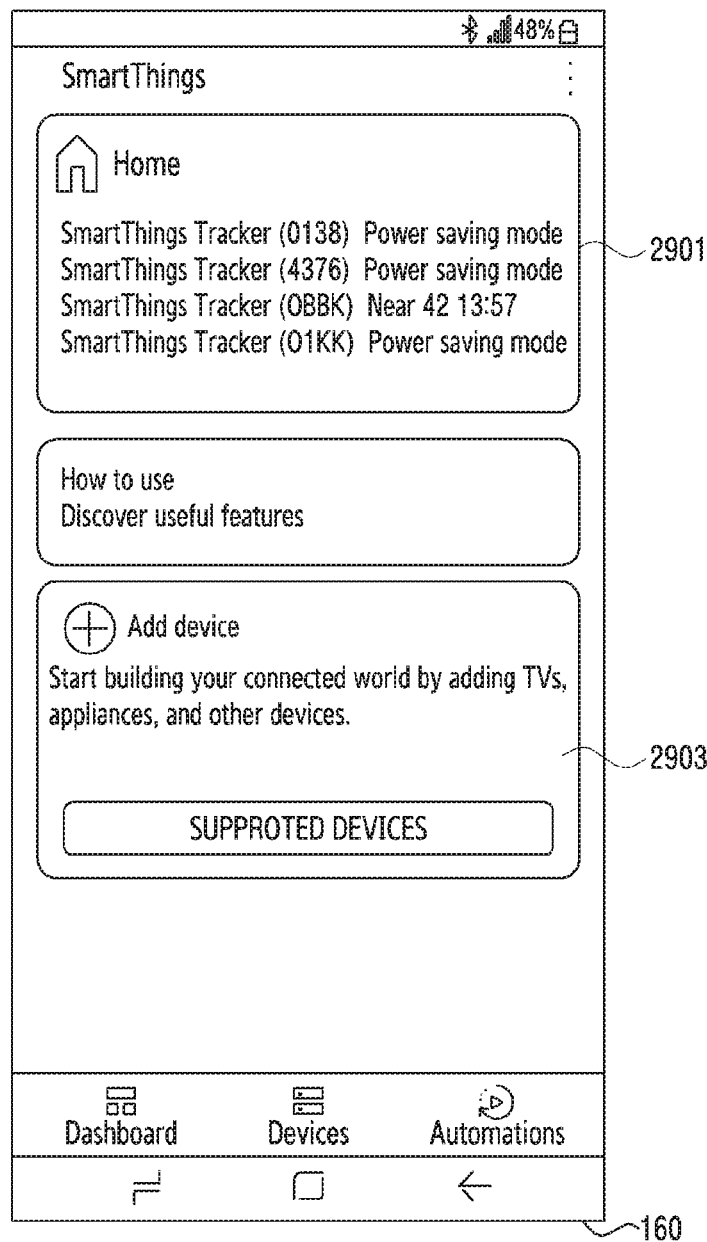
Figure 30:
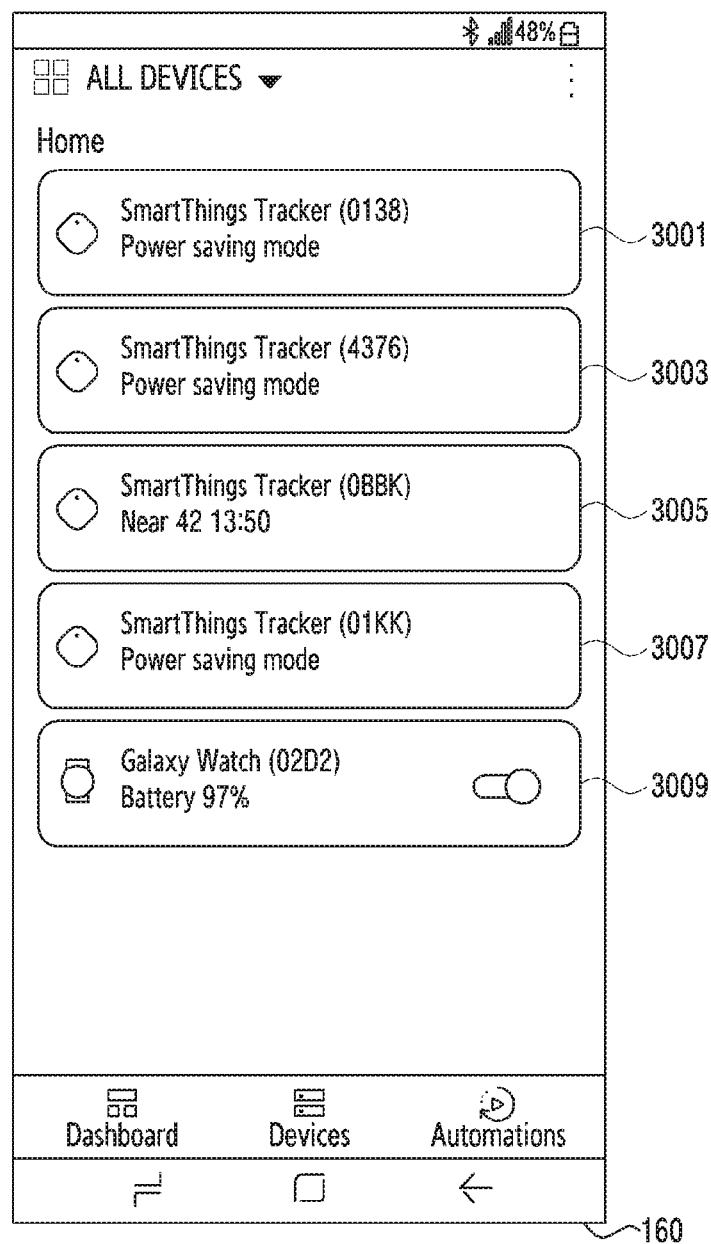

FIG. 29 and FIG. 30 depict an execution screen of a geofence application according to various embodiments. Referring to FIG. 29, a main screen of the geofence application execution screen may display an area 2901 for identifying a state of a registered companion device and an area 2903 for providing a function to register an additional companion device. In the main screen of the geofence application execution screen of FIG. 29, the area 2901 for identifying the state of the companion device may briefly display states of companion devices. If the user, for example, touches and selects the area 2901 for identifying the state of the companion device, it may switch to a screen which displays the state of each companion device in more detail as shown in FIG. 30. A state screen 3001, 3003, 3005, 3007 and 3009 of each companion device may display in further detail battery information or information notifying the low power mode, and information indicating a location and a report time of each companion device.

Figure 31:
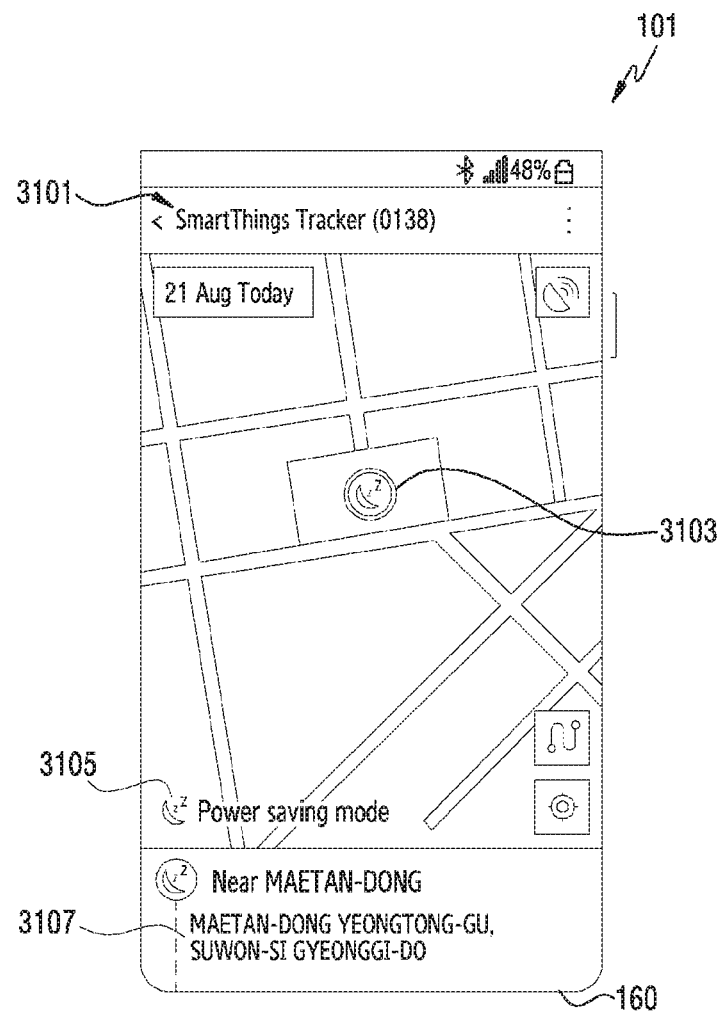

Referring to FIG. 31, an electronic device (e.g., the electronic device 101) may display a location of a companion device (e.g., the second electronic device 201) on the display device 160. According to an embodiment, the processor 120 may display and provide the user with a marker at the location corresponding to the location information of the companion device received from the geofence server 301 on an execution screen (e.g., a map screen) of an application related to the geofence service.

The execution screen (e.g., the map screen) of the application related to the geofence service may be displayed by, for example, selecting a menu of a main screen or selecting a menu in an application execution main screen for the geofence service. For example, it may be displayed by selecting one (e.g., 3001) of the state screens 3001, 3003, 3005, 3007 and 3009 of each companion device of FIG. 30. The map screen may include one or more areas which provide companion device information 3101 (e.g., a name or an identification number) (e.g., SmartThings Tracker (0138) of FIG. 31), and guide information for the companion device on the map screen. According to an embodiment, a maker 3103 indicating the location information of the companion device may be displayed at the location corresponding to the location information of the companion device on the map screen. In addition, information 3105 indicating the state of the companion device may be displayed at the bottom of the map scree. Further, location information 3107 of the companion device may be displayed in further detail at the bottom of the map screen.

As stated above, an operating method of an electronic device (e.g., the second electronic device 201) according to various embodiments may include monitoring movement of the electronic device 201, determining a first state or a second state of the electronic device 201, based on the monitored movement, and performing one of the first state or the second state determined based on the monitored movement, wherein, in the first state, the electronic device 201 may transmit a message at first intervals, and maintain the processor 210 in a low power or sleep mode during other times, and in the second state, the processor 210 may be in the low power or sleep mode, and wake up and transmit the message after the monitored movement exceeds a threshold for a first selected period of time.

According to various embodiments, the method further may include, if the monitored movement does not exceed the threshold for a second selected period of time, switching from the first state to the second state.

According to various embodiments, the second selected period of time is longer than the first selected period of time.

According to various embodiments, the first interval may be set to be longer than the length of the second selected period of time.

According to various embodiments, the method may further include, after the monitored movement exceeds the threshold for the first selected period of time, switching from the second state to the first state.

According to various embodiments, the second state may be maintained for a set time, and may further include, within the set time, after transmitting the message based on the wake-up, re-entering the low power or sleep mode.

According to various embodiments, the electronic device 201 may include a communication processor 271 and an RF circuit 273, and include a communication circuit 270 which provides wireless communication using an LPWAN and an application processor 210, wherein at least part of the communication circuit 270 may be configured to operate in the low power or sleep mode, for the other times of the first state, and/or while the application processor 210 electrically connected to the communication circuit 270 is in the low power or sleep mode.

According to various embodiments, the electronic device 201 may include a state sensing circuit 240 which monitors the movement of the electronic device 201, and monitoring the movement may include waking up, based on at least one signal provided from the state sensing circuit 240, while the application processor 210 operates in the low power or sleep mode, and monitoring the movement based on the wake-up.

According to various embodiments, the message may include information related to a geographical area where the electronic device is located, and the information may include information related to a geofence.

According to various embodiments, the second state may be maintained for a set time, and within the set time, after transmitting the message based on the wake-up, the processor may re-enter the low power or sleep mode.

The various embodiments disclosed in the specification and drawings merely present specific examples to easily explain technical details of the present invention and to ease the understanding of the present invention, and do not limit the range of the present invention. Therefore, the scope of the present invention should be construed as encompassing all modifications or modified forms derived based on the technical idea of the present invention as well as the disclosed embodiments.

The invention claimed is:

1. An electronic device comprising:
   a communication circuit configured to provide wireless communication using a low power wide area network (LPWAN);
   a state sensing circuit for monitoring movement of the electronic device;
   a positioning circuit for detecting a location of the electronic device;
   a processor electrically connected to the communication circuit, the state sensing circuit, and the positioning circuit;
   a memory electrically connected to the processor, and storing instructions which cause the processor to transmit at least one message comprising the location using the communication circuit; and
   a battery for supplying power to the communication circuit, the state sensing circuit, the positioning circuit, the processor, and the memory,
   wherein the electronic device is configured to operate in one of a normal mode or a low power mode based on the monitored movement,
   wherein, in the normal mode of the electronic device, the electronic device transmits a message at first intervals, and maintains the processor in a low power or sleep mode during other times, and
   in the low power mode of the electronic device, the processor is in the low power or sleep mode, and wakes up and transmits the message in response to the monitored movement exceeds a threshold for a first selected period of time.

2. The electronic device of claim 1, wherein, if the monitored movement does not exceed the threshold for a second selected period of time, the electronic device is configured to switch from the normal mode to the low power mode.

3. The electronic device of claim 2, wherein the second selected period of time is longer than the first selected period of time, and the first intervals are set to be longer than the length of the second selected period of time.

4. The electronic device of claim 1, wherein, after the monitored movement exceeds the threshold for the first selected period of time, the electronic device is configured to switch from the low power mode to the normal mode.

5. The electronic device of claim 1, wherein the communication circuit comprises:
   a communication processor and a radio frequency (RF) circuit,
   wherein at least part of the communication circuit is configured to operate in the low power or sleep mode, for the other times of the normal mode, and/or while the processor electrically connected to the communication circuit is in the low power or sleep mode.

6. The electronic device of claim 1, wherein the state sensing circuit comprises:
   at least one of an acceleration sensor, a gyro sensor, or a moisture sensor and a controller,
   wherein the controller is configured to provide at least one signal to the processor to wake up the processor from the low power or sleep mode.

7. The electronic device of claim 1, wherein the low power mode is maintained for a set time,
wherein, within the set time, the processor transmits the message based on the wake-up, and then re-enters the low power or sleep mode.

8. The electronic device of claim 1, wherein the message includes information related to a graphical area where the electronic device is located, and the information comprises information related to a geofence.

9. An operating method of an electronic device, comprising:
monitoring movement of the electronic device;
determining a normal mode or a low power mode of the electronic device, based on the monitored movement; and
performing one of the normal mode or the low power mode of the electronic device determined based on the monitored movement,
wherein, in the normal mode of the electronic device, the electronic device transmits a message at first intervals, and maintains the processor in a low power or sleep mode during other times, and
in the low power mode of the electronic device, the processor is in the low power or sleep mode, and wakes up and transmits the message in response to the monitored movement exceeds a threshold for a first selected period of time.

10. The method of claim 9, further comprising:
if the monitored movement does not exceed the threshold for a second selected period of time, switching from the normal mode to the low power mode.

11. The method of claim 10, wherein the second selected period of time is longer than the first selected period of time, and the first intervals are set to be longer than the length of the second selected period of time.

12. The method of claim 9, further comprising:
after the monitored movement exceeds the threshold for the first selected period of time, switching from the low power mode to the normal mode.

13. The method of claim 9, wherein the electronic device comprises a communication processor and a radio frequency (RF) circuit, a communication circuit for wireless communication using a low power wide area network (LPWAN) and an application processor,
wherein at least part of the communication circuit is configured to operate in the low power or sleep mode, for the other times of the normal mode, and/or while the application processor electrically connected to the communication circuit is in the low power or sleep mode.

14. The method of claim 13, wherein the electronic device comprises a state sensing circuit which monitors the movement of the electronic device, and
monitoring the movement comprises:
waking up, based on at least one signal provided from the state sensing circuit, while the application processor operates in the low power or sleep mode; and
monitoring the movement based on the wake-up.

15. The method of claim 9, wherein the message comprises information related to a geographical area where the electronic device is located, and
the information comprises information related to a geofence.

16. The method of claim 9, wherein the low power mode is maintained for a set time, and comprising:
within the set time, after transmitting the message based on the wake-up, re-entering the low power or sleep mode.

17. An electronic device comprising:
a communication circuit configured to provide wireless communication using a low power wide area network (LPWAN);
a state sensing circuit for monitoring movement of the electronic device;
a positioning circuit for detecting a location of the electronic device; and
a processor,
wherein the processor is configured to:
obtain sensor information based on the state sensing circuit,
in response to the sensor information being stationary information, transmit location information of the electronic device and geofence information to a server, and then process low power mode entry,
wake up, in response to obtaining the sensor information based on the state sensing circuit in the low power mode,
after the processor wakes up, determine an operation mode of the electronic device, based at least on the sensor information, and
process a related operation based on the determined operation mode,
wherein determining the operation mode of the electronic device comprises:
if the sensor information is movement information, determining to switch from the low power mode to a normal mode, waking up the communication circuit by transmitting a normal mode switch command to the communication circuit, and transmitting the location information of the electronic device to the server through the communication circuit, and
if the sensor information is stationary information, determining to maintain the low power mode, and processing the low power mode re-entry process.

18. The electronic device of claim 17, wherein the processor is configured to:
maintain the low power mode for a set time; and
if the sensor information obtained within the set period of time, transmit the message based on the wake-up, and then re-enter the low power mode.

* * * * *